(12) United States Patent
Busacca et al.

(10) Patent No.: US 12,418,050 B2
(45) Date of Patent: *Sep. 16, 2025

(54) THREE-DIMENSIONAL BATTERIES WITH COMPRESSIBLE CATHODES

(71) Applicant: Enovix Corporation, Fremont, CA (US)

(72) Inventors: Robert S. Busacca, Oakland, CA (US); Murali S. Ramasubramanian, Fremont, CA (US); Bruno A. Valdes, Sunnyvale, CA (US); James D. Wilcox, Pleasanton, CA (US); Christopher J. Spindt, Menlo Park, CA (US); Geoffrey Matthew Ho, San Ramon, CA (US); John F. Varni, Campbell, CA (US); Kim Han Lee, Pleasanton, CA (US); Richard J. Contreras, Campbell, CA (US); Thomas John Schuerlein, Pleasanton, CA (US); Ashok Lahiri, Cupertino, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,062

(22) Filed: Dec. 28, 2023

(65) Prior Publication Data

US 2024/0213541 A1 Jun. 27, 2024

Related U.S. Application Data

(60) Continuation of application No. 17/363,148, filed on Jun. 30, 2021, now Pat. No. 11,901,514, which is a
(Continued)

(51) Int. Cl.
*H01M 10/058* (2010.01)
*H01M 10/04* (2006.01)
(Continued)

(52) U.S. Cl.
CPC ....... *H01M 10/058* (2013.01); *H01M 10/049* (2013.01); *H01M 10/0525* (2013.01);
(Continued)

(58) Field of Classification Search
CPC ............. H01M 10/058; H01M 10/049; H01M 10/0525; H01M 10/054; H01M 50/489;
(Continued)

(56) References Cited

U.S. PATENT DOCUMENTS

| 3,563,805 A | 2/1971 | Deierhoi, Jr. |
| 4,396,689 A | 8/1983 | Grimes et al. |

(Continued)

FOREIGN PATENT DOCUMENTS

| CA | 2388711 A1 | 5/2001 |
| CN | 85106872 A | 6/1986 |

(Continued)

OTHER PUBLICATIONS

Zhang et al., High aspect ration nickel structions fabricated by electrochemical replication of hydrofluoric acid etched silicon, Electrochemical and Solid-State Letters, 2006, 9(9): C150-C152.
(Continued)

*Primary Examiner* — Daniel S Gatewood
(74) *Attorney, Agent, or Firm* — Haley Guiliano LLP; Ronit Buller

(57) ABSTRACT

A secondary battery for cycling between a charged and a discharged state is provided. The secondary battery has an electrode assembly having a population of anode structures, a population of cathode structures, and an electrically insulating microporous separator material. The electrode assembly also has a set of electrode constraints that at least partially restrains growth of the electrode assembly. Members of the anode structure population have a first cross-sectional area, $A_1$ when the secondary battery is in the
(Continued)

charged state and a second cross-sectional area, $A_2$, when the secondary battery is in the discharged state, and members of the cathode structure population have a first cross-sectional area, $C_1$ when the secondary battery is in the charged state and a second cross-sectional area, $C_2$, when the secondary battery is in the discharged state, where $A_1$ is greater than $A_2$, and $C_1$ is less than $C_2$.

20 Claims, 13 Drawing Sheets

Related U.S. Application Data division of application No. 16/349,785, filed as application No. PCT/US2017/061892 on Nov. 16, 2017, now Pat. No. 11,063,299.

(60) Provisional application No. 62/422,983, filed on Nov. 16, 2016.

(51) Int. Cl.
- *H01M 10/0525* (2010.01)
- *H01M 10/054* (2010.01)
- *H01M 10/42* (2006.01)
- *H01M 50/489* (2021.01)
- *H01M 50/491* (2021.01)

(52) U.S. Cl.
CPC ....... *H01M 10/054* (2013.01); *H01M 50/489* (2021.01); *H01M 50/491* (2021.01); *H01M 2010/4292* (2013.01)

(58) Field of Classification Search
CPC ....... H01M 50/491; H01M 2010/4292; H01M 10/052; H01M 10/0468; H01M 4/13; Y02E 60/10; Y02P 70/50
See application file for complete search history.

(56) References Cited

U.S. PATENT DOCUMENTS

| | | |
|---|---|---|
| 4,587,182 A | 5/1986 | Stiles et al. |
| 4,889,777 A | 12/1989 | Akuto |
| 5,238,759 A | 8/1993 | Plichta et al. |
| 5,294,504 A | 3/1994 | Otagawa et al. |
| 5,350,645 A | 9/1994 | Lake et al. |
| 5,709,962 A | 1/1998 | Bailey |
| 6,083,640 A | 7/2000 | Lee et al. |
| 6,090,505 A | 7/2000 | Shimamura et al. |
| 6,235,427 B1 | 5/2001 | Idota et al. |
| 6,287,371 B1 | 9/2001 | Ota et al. |
| 6,355,369 B1 | 3/2002 | Iarochencko et al. |
| 6,383,234 B1 | 5/2002 | Noh |
| 6,432,579 B1 | 8/2002 | Tsuji et al. |
| 6,432,585 B1 | 8/2002 | Kawakami et al. |
| 6,525,391 B1 | 2/2003 | Bertrand et al. |
| 6,548,208 B1 | 4/2003 | Kasamatsu et al. |
| 6,679,925 B1 | 1/2004 | Tanizaki et al. |
| 6,726,733 B2 | 4/2004 | Lee et al. |
| 6,791,737 B2 | 9/2004 | Giron |
| 6,835,496 B1 | 12/2004 | Kaminaka et al. |
| 6,855,378 B1 | 2/2005 | Narang |
| 7,066,971 B1 | 6/2006 | Carlson |
| 7,309,548 B2 | 12/2007 | Ota et al. |
| 7,402,829 B2 | 7/2008 | Green |
| 7,722,984 B2 | 5/2010 | Kim et al. |
| 7,794,881 B1 | 9/2010 | Fujimoto et al. |
| 7,824,806 B2 | 11/2010 | Visco et al. |
| 8,101,298 B2 | 1/2012 | Green et al. |
| 8,129,048 B2 | 3/2012 | Hirakawa et al. |
| 8,133,613 B2 | 3/2012 | Ramasubramanian et al. |
| 8,192,788 B1 | 6/2012 | Shah et al. |
| 8,367,244 B2 | 2/2013 | Ramasubramanian et al. |
| 8,475,957 B2 | 7/2013 | Ramasubramanian et al. |
| 8,527,395 B2 | 9/2013 | Pylant |
| 8,580,439 B1 | 11/2013 | Kaiser et al. |
| 8,722,226 B2 | 5/2014 | Chiang et al. |
| 8,841,030 B2 | 9/2014 | Lahiri et al. |
| 8,865,345 B1 | 10/2014 | Ramasubramanian et al. |
| 8,993,159 B2 | 3/2015 | Chiang et al. |
| 9,105,905 B2 | 8/2015 | Ramasubramanian et al. |
| 9,153,833 B2 | 10/2015 | Chiang et al. |
| 9,343,772 B2 | 5/2016 | Byun |
| 9,356,271 B2 | 5/2016 | Ramasubramanian et al. |
| 9,362,553 B2 | 6/2016 | Lahiri et al. |
| 9,660,292 B2 | 5/2017 | Rust et al. |
| 9,692,044 B2 | 6/2017 | Delpuech et al. |
| 9,806,331 B2 | 10/2017 | Lahiri et al. |
| 9,991,490 B2 | 6/2018 | Ramasubramanian et al. |
| 10,020,514 B2 | 7/2018 | Ramasubramanian et al. |
| 10,038,214 B2 | 7/2018 | Rust et al. |
| 10,177,400 B2 | 1/2019 | Busacca et al. |
| 10,256,507 B1 | 4/2019 | Busacca et al. |
| 10,283,807 B2 | 5/2019 | Busacca et al. |
| 10,784,477 B2 | 9/2020 | Fischer et al. |
| 11,063,299 B2 | 7/2021 | Busacca et al. |
| 11,081,718 B2 | 8/2021 | Busacca et al. |
| 11,128,020 B2 | 9/2021 | Busacca et al. |
| 11,264,680 B2 | 3/2022 | Busacca et al. |
| 11,411,253 B2 | 8/2022 | Busacca et al. |
| 11,444,310 B2 | 9/2022 | Busacca et al. |
| 11,901,514 B2 | 2/2024 | Busacca et al. |
| 2002/0013986 A1 | 2/2002 | Ahn et al. |
| 2003/0082446 A1 | 5/2003 | Chiang et al. |
| 2003/0175589 A1 | 9/2003 | Kaminaka et al. |
| 2004/0048151 A1 | 3/2004 | Hayashi et al. |
| 2004/0185336 A1 | 9/2004 | Ito et al. |
| 2004/0214085 A1 | 10/2004 | Sheem et al. |
| 2004/0234861 A1 | 11/2004 | Kawase et al. |
| 2004/0241540 A1 | 12/2004 | Tsutsumi et al. |
| 2004/0253512 A1 | 12/2004 | Watanabe et al. |
| 2005/0008939 A1 | 1/2005 | Ota et al. |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0051663 A1 | 3/2006 | Fujita et al. |
| 2006/0093871 A1 | 5/2006 | Howard et al. |
| 2006/0188648 A1 | 8/2006 | Yudasaka |
| 2007/0002523 A1 | 1/2007 | Ando et al. |
| 2007/0031733 A1 | 2/2007 | Kogetsu et al. |
| 2007/0097481 A1 | 5/2007 | Burdis et al. |
| 2007/0172732 A1 | 7/2007 | Jung et al. |
| 2007/0285051 A1 | 12/2007 | Jeon et al. |
| 2008/0003490 A1 | 1/2008 | Christensen et al. |
| 2008/0081256 A1 | 4/2008 | Madou et al. |
| 2008/0081257 A1 | 4/2008 | Yoshida et al. |
| 2008/0118826 A1 | 5/2008 | Shimamura et al. |
| 2008/0233455 A1 | 9/2008 | Deimede et al. |
| 2009/0023073 A1 | 1/2009 | Okada et al. |
| 2009/0035664 A1 | 2/2009 | Chiang et al. |
| 2009/0068567 A1 | 3/2009 | Konishiike et al. |
| 2009/0123847 A1 | 5/2009 | Okada et al. |
| 2009/0136844 A1 | 5/2009 | Watanabe et al. |
| 2009/0142656 A1 | 6/2009 | Nathan et al. |
| 2009/0155678 A1 | 6/2009 | Less et al. |
| 2009/0159311 A1 | 6/2009 | Zheng et al. |
| 2009/0166187 A1 | 7/2009 | Nagase et al. |
| 2009/0263716 A1 | 10/2009 | Ramasubramanian et al. |
| 2009/0303660 A1 | 12/2009 | Nair et al. |
| 2010/0040951 A1 | 2/2010 | Yamamoto et al. |
| 2010/0051856 A1 | 3/2010 | Kim et al. |
| 2010/0209775 A1 | 8/2010 | Kim et al. |
| 2010/0266907 A1 | 10/2010 | Yazami |
| 2010/0285368 A1 | 11/2010 | Yamamoto et al. |
| 2011/0008656 A1 | 1/2011 | Tanahashi et al. |
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0067228 A1 | 3/2011 | Green |
| 2011/0070489 A1 | 3/2011 | Chiang et al. |

(56) References Cited

U.S. PATENT DOCUMENTS

| | | |
|---|---|---|
| 2011/0111283 A1 | 5/2011 | Rust et al. |
| 2011/0129732 A1 | 6/2011 | Bachrach et al. |
| 2011/0159328 A1 | 6/2011 | Yeo |
| 2011/0171518 A1 | 7/2011 | Dunn et al. |
| 2011/0200862 A1 | 8/2011 | Kurosawa |
| 2011/0294015 A1 | 12/2011 | Pirk et al. |
| 2012/0052341 A1 | 3/2012 | Kim et al. |
| 2012/0100438 A1 | 4/2012 | Fasching et al. |
| 2012/0176093 A1 | 7/2012 | Ramasubramanian et al. |
| 2012/0202113 A1 | 8/2012 | Hodge et al. |
| 2012/0288742 A1 | 11/2012 | Tanaka et al. |
| 2013/0078493 A1 | 3/2013 | Chen |
| 2013/0136963 A1 | 5/2013 | Chiba |
| 2013/0143120 A1 | 6/2013 | Ramasubramanian et al. |
| 2013/0189602 A1 | 7/2013 | Lahiri et al. |
| 2013/0202942 A1 | 8/2013 | Sakai et al. |
| 2013/0230751 A1 | 9/2013 | Shaw |
| 2014/0050959 A1 | 2/2014 | Ryu et al. |
| 2014/0050969 A1 | 2/2014 | Rust et al. |
| 2014/0072850 A1 | 3/2014 | Kwon et al. |
| 2014/0154531 A1 | 6/2014 | Furuya et al. |
| 2014/0272547 A1 | 9/2014 | Ramasubramanian et al. |
| 2014/0335395 A1 | 11/2014 | Ramasubramanian et al. |
| 2015/0007952 A1 | 1/2015 | Mderl et al. |
| 2015/0024253 A1 | 1/2015 | Noh |
| 2015/0033547 A1 | 2/2015 | Yang et al. |
| 2015/0079452 A1 | 3/2015 | Park et al. |
| 2015/0104686 A1 | 4/2015 | Brommer et al. |
| 2015/0135522 A1 | 5/2015 | Seto et al. |
| 2015/0162575 A1 | 6/2015 | Son et al. |
| 2016/0197332 A1 | 7/2016 | Lee et al. |
| 2016/0218339 A1 | 7/2016 | Nishimori et al. |
| 2017/0352850 A1 | 12/2017 | Nagane et al. |
| 2018/0040876 A1 | 2/2018 | Lahiri et al. |
| 2018/0079035 A1 | 3/2018 | Watanabe |
| 2018/0145367 A1 | 5/2018 | Busacca et al. |
| 2018/0166735 A1 | 6/2018 | Busacca et al. |
| 2018/0309110 A1 | 10/2018 | Iwasaki et al. |
| 2019/0207264 A1 | 7/2019 | Busacca et al. |
| 2019/0221878 A1 | 7/2019 | Busacca et al. |
| 2019/0319294 A1 | 10/2019 | Busacca et al. |
| 2019/0350633 A1 | 11/2019 | Ramadhyani et al. |
| 2019/0372150 A1 | 12/2019 | Busacca et al. |
| 2020/0212493 A1 | 7/2020 | Busacca et al. |
| 2020/0313146 A1 | 10/2020 | Busacca et al. |
| 2020/0335754 A1 | 10/2020 | Ramasubramanian et al. |
| 2020/0350633 A1 | 11/2020 | Busacca et al. |
| 2020/0381771 A1 | 12/2020 | Rust et al. |
| 2021/0265617 A1 | 8/2021 | Okano et al. |
| 2022/0115711 A1 | 4/2022 | Busacca et al. |
| 2022/0115753 A1 | 4/2022 | Busacca et al. |
| 2022/0123370 A1 | 4/2022 | Busacca et al. |
| 2022/0149423 A1 | 5/2022 | Busacca et al. |
| 2022/0158220 A1 | 5/2022 | Busacca et al. |
| 2022/0166051 A1 | 5/2022 | Busacca et al. |
| 2022/0173485 A1 | 6/2022 | Busacca et al. |
| 2022/0181702 A1 | 6/2022 | Busacca et al. |
| 2022/0399612 A1 | 12/2022 | Busacca et al. |
| 2023/0178787 A1 | 6/2023 | Busacca et al. |

FOREIGN PATENT DOCUMENTS

| | | |
|---|---|---|
| CN | 1286811 A | 3/2001 |
| CN | 1555588 A | 12/2004 |
| CN | 101960643 A | 1/2011 |
| CN | 102007625 A | 4/2011 |
| CN | 102569758 A | 7/2012 |
| CN | 104347856 A | 2/2015 |
| CN | 104662714 A | 5/2015 |
| CN | 105518904 A | 4/2016 |
| CN | 207199697 U | 4/2018 |
| CN | 207967108 U | 10/2018 |
| CN | 209447946 U | 9/2019 |
| CN | 210576107 U | 5/2020 |
| CN | 212625870 U | 2/2021 |
| CN | 109994663 B | 9/2021 |
| CN | 109994671 B | 10/2021 |
| CN | 216085187 U | 3/2022 |
| CN | 216872119 U | 7/2022 |
| CN | 218274993 U | 1/2023 |
| CN | 218385615 U | 1/2023 |
| CN | 218677233 U | 3/2023 |
| CN | 218677326 U | 3/2023 |
| CN | 219658948 U | 9/2023 |
| CN | 220341311 U | 1/2024 |
| CN | 220492106 U | 2/2024 |
| CN | 220510172 U | 2/2024 |
| CN | 220692103 U | 3/2024 |
| CN | 109428021 B | 4/2024 |
| CN | 109428107 B | 4/2024 |
| CN | 114256497 B | 4/2024 |
| CN | 220895659 U | 5/2024 |
| CN | 220963563 U | 5/2024 |
| CN | 221226383 U | 6/2024 |
| CN | 221353058 U | 7/2024 |
| CN | 221632726 U | 8/2024 |
| CN | 221766962 U | 9/2024 |
| CN | 221766963 U | 9/2024 |
| CN | 221805673 U | 10/2024 |
| CN | 221861763 U | 10/2024 |
| CN | 222282154 U | 12/2024 |
| CN | 222463111 U | 2/2025 |
| CN | 222826444 U | 5/2025 |
| DE | 102018203033 A1 | 9/2019 |
| EP | 0883199 A1 | 12/1998 |
| EP | 1028476 A1 | 8/2000 |
| EP | 1100134 A1 | 5/2001 |
| EP | 1102340 A2 | 5/2001 |
| EP | 1270765 A1 | 1/2003 |
| EP | 1465268 A2 | 10/2004 |
| EP | 2048262 A1 | 4/2009 |
| EP | 2277214 A1 | 1/2011 |
| EP | 2858162 A1 | 4/2015 |
| EP | 2223367 B1 | 6/2015 |
| EP | 3051606 A1 | 8/2016 |
| EP | 3295507 A1 | 3/2018 |
| EP | 3367468 A1 | 8/2018 |
| EP | 3455898 A1 | 3/2019 |
| JP | 01-132064 A | 5/1989 |
| JP | 06-236768 A | 8/1994 |
| JP | 2001-185224 A | 7/2001 |
| JP | 2003-323882 A | 11/2003 |
| JP | 2004-351500 A | 12/2004 |
| JP | 2005-149891 A | 6/2005 |
| JP | 2005-285378 A | 10/2005 |
| JP | 2006-100280 A | 4/2006 |
| JP | 2006-173001 A | 6/2006 |
| JP | 2006-236768 A | 9/2006 |
| JP | 2006-286427 A | 10/2006 |
| JP | 2007-258160 A | 10/2007 |
| JP | 2008-140633 A | 6/2008 |
| JP | 2008-171732 A | 7/2008 |
| JP | 2009-170258 A | 7/2009 |
| JP | 2010-146732 A | 7/2010 |
| JP | 2010-225552 A | 10/2010 |
| JP | 2010-262752 A | 11/2010 |
| JP | 2010-278125 A | 12/2010 |
| JP | 2011-171029 A | 9/2011 |
| JP | 2012-516941 A | 7/2012 |
| JP | 2012-160352 A | 8/2012 |
| JP | 2015-505120 A | 2/2015 |
| JP | 2015-064959 A | 4/2015 |
| JP | 2015-524994 A | 8/2015 |
| JP | 2015-172997 A | 10/2015 |
| JP | 2015-220218 A | 12/2015 |
| JP | 2019-169476 A | 10/2019 |
| KR | 10-2003-0044508 A | 6/2003 |
| KR | 10-2006-0050988 A | 5/2006 |
| KR | 10-2007-0021192 A | 2/2007 |
| KR | 10-2013-0105001 A | 9/2013 |
| KR | 10-2015-0010226 A | 1/2015 |
| KR | 10-2015-0045456 A | 4/2015 |
| NL | 1015956 C2 | 2/2002 |
| TW | 201225385 A | 6/2012 |

(56) References Cited

FOREIGN PATENT DOCUMENTS

| | | |
|---|---|---|
| TW | 201414048 A | 4/2014 |
| WO | 99/00588 A2 | 1/1999 |
| WO | 02/43168 A2 | 5/2002 |
| WO | 2003/105258 A1 | 12/2003 |
| WO | 2005/101973 A2 | 11/2005 |
| WO | 2006/064344 A2 | 6/2006 |
| WO | 2008/030215 A2 | 3/2008 |
| WO | 2008/089110 A1 | 7/2008 |
| WO | 2009/109834 A1 | 9/2009 |
| WO | 2009/129490 A1 | 10/2009 |
| WO | 2009/140300 A1 | 11/2009 |
| WO | 2010/090956 A2 | 8/2010 |
| WO | 2010/092059 A1 | 8/2010 |
| WO | 2010/138176 A1 | 12/2010 |
| WO | 2011/154862 A1 | 12/2011 |
| WO | 2012/054767 A2 | 4/2012 |
| WO | 2013/112135 A1 | 8/2013 |
| WO | 2013/112670 A1 | 8/2013 |
| WO | 2014/024424 A1 | 2/2014 |
| WO | 2014/028230 A1 | 2/2014 |
| WO | 2014/151202 A1 | 9/2014 |
| WO | 2016/183410 A1 | 11/2016 |
| WO | 2018/020906 A1 | 2/2018 |
| WO | 2018/115016 A1 | 6/2018 |
| WO | 2019/099642 A2 | 5/2019 |
| WO | 2019/099650 A1 | 5/2019 |
| WO | 2021/020480 A1 | 2/2021 |
| WO | 2022/021056 A1 | 2/2022 |
| WO | 2022/060703 A1 | 3/2022 |
| WO | 2022/108954 A1 | 5/2022 |
| WO | 2022/125529 A1 | 6/2022 |

OTHER PUBLICATIONS

Alliance Rubber Company, Rubber Band Size Chari, retrieved from www.rubberband.com/public/userfiles/sales-collateral/RubberBandChart.pdf, 2 pgs 2021.
Arora, P. et al., "Battery Separators", Chem. Reviews, 2004, 104, 4419-4462 Mar. 30, 2004.
Bourderau et al., "Amorphous Silicon as a Possible Anode Material for Li-Ion Batteries," Journal of Power Sources, 1999, 81-82, 233-236 Sep. 30, 1999.
Broussely et al., Li-ion batteries and portable power source prospects for the next 5-10 years, Journal of Power Sources, 136, 2004, 386-394.
Dierks, S., GuideChem, NickelSilicide {Ni2Si} {cas 12059-14-2) MSDS, Material safety data sheet, retrieved from www.guidechem.com/cas-120/12059-14-2.html, 2 pgs Sep. 30, 1993.
European Patent Office, Extended European Search Report for 12866772.2, EP 2807698, dated Oct. 8, 2015, 3 pages.
European Patent Office, Extended European Search Report for 13829954.0, EP 2885830, dated Feb. 19, 2016, 7 pages.
European Patent Office, Extended European Search Report for 14768734.7, EP 2973785, 10 pages dated Jul. 15, 2016.
European Patent Office, Extended European Search Report for 20191612.9, 7 pages Mar. 5, 2021.
European Patent Office, Extended European Search Report for Application No. 16793590.7, publication EP 3295507, 7 pages dated Aug. 28, 2018.
European Patent Office, Extended European Search Report for EP 17872332.6, 7 pages dated Sep. 1, 2020.
European Patent Office, Extended Search Report for EP 13 74 0825, App. No. 13740825.8, dated Aug. 8, 2015, 9 pages.
European Patent Office, Extended Search Report for EP App. 17796914.4, 10 pages dated Nov. 19, 2019.
European Patent Office, Extended Search Report for EP App. 19197127.4, 3 pages dated Jan. 17, 2020.
Golodnitsky et al., Advanced materials for the 3D microbattery, Journal of Power Sources, 2006, 153, 281-287.
Google Query Result Page for "Pressure a Rubber Band Can Apply" and "How much pressure does a rubber band have?", 1 page 2021.
Green et al., Structured silicon anodes for lithium battery applications, Electrochemical and Solid State Letters, 6, 2003, A75-A79 Mar. 5, 2003.
Harraz et al., Different behavior in immersion plating of nickel on porous silicon from acidic and and alkaline fluoride media, J. Elect. Soc., 2003, 150(5): C277-284.
Harraz et al., Immersion plating of nickel onto a porous silicon layer from fluoride solutions, Phys. Stat. Sol., 2003, 197(1): 51-56.
Iaboni et al., Li15SI4 Formation in silicon thin film negative electrodes, Journal of the Electrochemical Society, 2016, 163(2), A255-A261.
Kasavajula et al., Nano- and Bulk-Silicon-Based Insertion Anodes for Lithium-Ion Secondary Cells, Journal of Power Sources, 2007, 1003-1039, 163 Nov. 9, 2006.
Keener Rubber Bands Federal Specifications, retrieved from keener-rubber.com/Federal%20Specifications.htm, 1 page 2021.
Li et al., "The Crystal Structural Evolution of Nano-Si Anode Caused by Lithium Insertion and Extraction at Room Temperature," Solid State Ionics, 2000, 135, 181-191 Nov. 30, 2000.
Liu, C., Bulk Micromachining and Silicon Anisotropic Etching, Foundations of MEMS, Prentice Hall Inc. Chapter 10, pp. 326-370; Prentice Hall Dec. 31, 2006.
Long et al., Three-Dimensional battery Architectures, Chemical Reviews, 2004, 104, 4463-4492.
Maranchi et al., High capacity, reversible silicon thin-film anodes for lithium-ion batteries, Electronchemical and Solid-State Letters, 2001, 6(9), A198-A201.
Mu et al., Silicon nanotube array/gold electrode for direct electrochemistry of cytochrome C, J. Phys. Chem. B, 2007, 111(6), 1491-1495.
Obrovac et al., Reversible cycling of crystalline silicon powder, J. Elect. Soc., 2007, 154(2): A103-A108.
Patent Cooperation Treaty, International Search Report for PCT/US2009/041012, dated Sep. 8, 2009, 4 pages Sep. 8, 2009.
Patent Cooperation Treaty, International Search Report for PCT/US2013/053235, dated Jan. 28, 2014, 5 pages Jan. 28, 2014.
Patent Cooperation Treaty, International Search Report for PCT/US2016/032284, dated Aug. 26, 2016, 4 pages 2016.
Patent Cooperation Treaty, International Search Report for PCT/US2017/032355, 4 pages dated Aug. 25, 2017.
Patent Cooperation Treaty, International Search Report for PCT/US2017/032355, dated Aug. 25, 2017, 4 pages 2017.
Patent Cooperation Treaty, International Search Report for PCT/US2017/061892, 6 pages dated Mar. 27, 2018.
Patent Cooperation Treaty, International Search Report for PCT/US2018/061245, 10 pgs, dated May 7, 2019.
Patent Cooperation Treaty, International Search Report for PCT/US2018/061254, 5pgs, dated Mar. 7, 2019.
Patent Cooperation Treaty, International Search report issued for PCT/US2013/022868, dated May 15, 2013, 3 pages dated May 15, 2013.
Patent Cooperation Treaty, International Search Report issued for PCT/US2014/025200, dated Jul. 29, 2014, 4 pages dated Jul. 29, 2014.
Patent Cooperation Treaty, International Search Report issued on PCT/US2012/022393, dated Oct. 10, 2012, 4 pages.
Patent Cooperation Treaty, Written Opinion for PCT/US2017/061892, 6 pages dated Mar. 27, 2018.
Roberts et al., 3D lithium ion batteries—from fundamentals to fabrication, Journal of Materials Chemistry, Royal Society of Chemistry, 2011, 21: 9876-9890 2011.
Shin et al. Porous Silicon Negative Electrodes for Rachargeable Lithium Batteries, Journal of Power Sources, 139 (2005) 314-320 Sep. 13, 2004.
Su et al., Silicon-Based Nanomaterials for Lithium-Ion Batteries: A Review, Advanced Energy Materials, 2013, 1-23.
Taiwan Search Report for App. No. 102129550, dated Sep. 9, 2016, 1 page dated Sep. 9, 2016.
United Kingdom Search Report dated dated Dec. 18, 2012, 4 pages dated Dec. 18, 2012.
Vyatkin et al., Random and Ordered Macropore in p-type silicon J. Electrochem. Soc. 149, 1, G70-G76 (2002) Dec. 6, 2001.

(56) References Cited

OTHER PUBLICATIONS

Waidmann et al., Tuning nickel silicide properties using a lamp based RTA, a heat conduction based RTA or a furnace anneal, Microelectronic Engineering, 2006, 83, 2282-2286.
Whitehead et al., Current Collectors for positive electrodes of lithium-based batteries, Journal of the Electrochemical Society, 2005, A5105-A2113, 152(11) Sep. 8, 2005.
Xu et al., Nickel displacement deposition of porous silicon with ultrahigh aspect ratio, J. Elect. Soc., 2007, 154(3): 170-174.
Xu, Chengkun et al., Theorectical studies of displacement disposition of nickel into porous silicon with ultrahigh aspect ratio, Electrochimica Acta, Dec. 4, 2006, 3901-3909, 52 Dec. 4, 2006.
Research Institute Overview, R&D and Smart Manufacturing, https://www.atlbattery.com/en/research.html (Jan. 24, 2025), 7 pages.

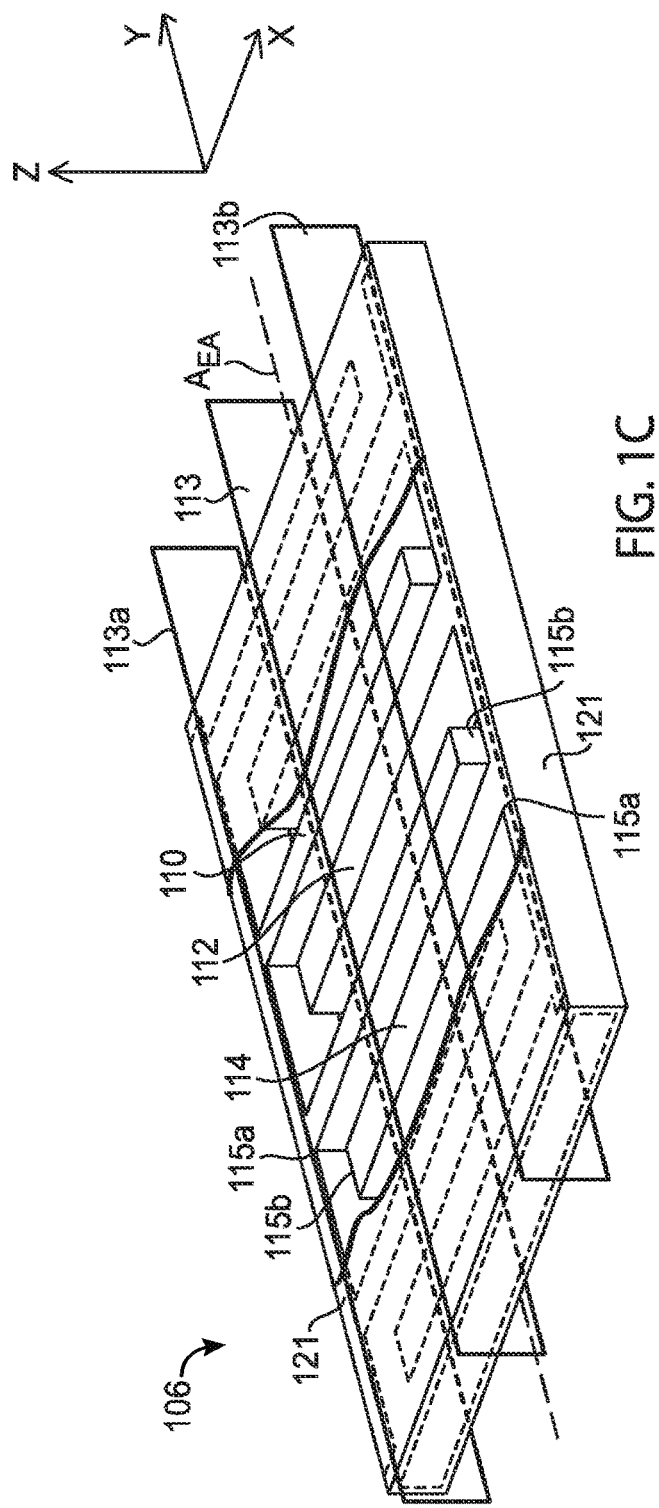
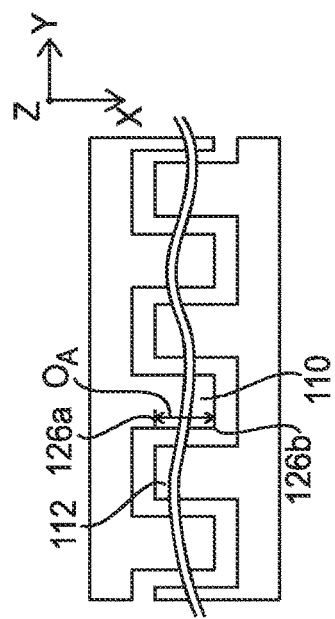
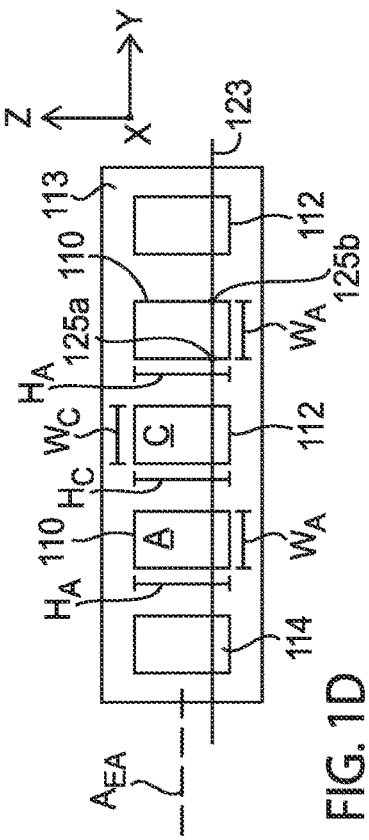
FIG. 1C
FIG. 1D
FIG. 1E

THREE-DIMENSIONAL BATTERIES WITH COMPRESSIBLE CATHODES

CROSS REFERENCE TO RELATED APPLICATIONS

This is a continuation of U.S. application Ser. No. 17/363,148, filed on Jun. 30, 2021, which is a divisional application of U.S. application Ser. No. 16/349,785, filed May 14, 2019, now U.S. Pat. No. 11,063,299, which is a U.S. National Phase Application of International Application PCT Application Number PCT/US17/61892, filed Nov. 16, 2017, which claims priority to U.S. Application Ser. No. 62/422,983 filed Nov. 16, 2016. The contents of each of these applications are hereby incorporated by reference in their entireties.

FIELD OF THE INVENTION

This disclosure generally relates to structures for use in energy storage devices, to energy storage devices employing such structures, and to methods for producing such structures and energy devices.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two or more battery cells that have been electrically coupled to form the battery, with each battery cell comprising a positive electrode, a negative electrode, a microporous separator, and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

When the carrier ions move between electrodes, one of the persistent challenges resides in the fact that the electrodes tend to expand and contract as the battery is repeatedly charged and discharged. The expansion and contraction during cycling tends to be problematic for reliability and cycle life of the battery because when the electrodes expand, electrical shorts and battery failures occur.

Therefore, there remains a need for improving the reliability and cycle life of secondary batteries having electrodes that tend to expand and contract.

SUMMARY

Briefly, therefore, one aspect of this disclosure relates to the implementation of constraint structures to improve the energy density, reliability, and cycle life of batteries.

According to one aspect, a secondary battery for cycling between a charged and a discharged state is provided, the secondary battery having a battery enclosure, an electrode assembly, carrier ions, and a non-aqueous liquid electrolyte within the battery enclosure. The electrode assembly has a population of anode structures, a population of cathode structures, and an electrically insulating microporous separator material electrically separating members of the anode and cathode structure populations, wherein the anode and cathode structure populations are arranged in an alternating sequence in a longitudinal direction, each member of the anode structure population has a first cross-sectional area, $A_1$ when the secondary battery is in the charged state and a second cross-sectional area, $A_2$, when the secondary battery is in the discharged state, each member of the cathode structure population has a first cross-sectional area, $C_1$ when the secondary battery is in the charged state and a second cross-sectional area, $C_2$, when the secondary battery is in the discharged state, and the cross-sectional areas of the members of the anode and cathode structure populations are measured in a first longitudinal plane that is parallel to the longitudinal direction. The electrode assembly also has a set of electrode constraints that at least partially restrains growth of the electrode assembly in the longitudinal direction upon cycling of the secondary battery between the charged and discharged states. Each member of the population of cathode structures has a layer of a cathode active material and each member of the population of anode structures has a layer of an anode active material having a capacity to accept more than one mole of carrier ion per mole of anode active material when the secondary battery is charged from a discharged state to a charged state, and $A_1$ is greater than $A_2$ for each of the members of a subset of the anode structure population and $C_1$ is less than $C_2$ for each of the members of a subset of the cathode structure population. The charged state is at least 75% of the rated capacity of the secondary battery, and the discharged state is less than 25% of the rated capacity of the secondary battery.

According to yet another aspect, a method of formation is provided for a secondary battery, the secondary battery being capable of cycling between a charged and a discharged state. The secondary battery has a battery enclosure, an electrode assembly, carrier ions, and a non-aqueous liquid electrolyte within the battery enclosure. The electrode assembly has a population of anode structures, a population of cathode structures, and an electrically insulating microporous separator material electrically separating members of the anode and cathode structure populations. Members of the anode and cathode structure populations are arranged in an alternating sequence in a longitudinal direction, and members of the population of anode structures have anode active material layers that expand in cross-sectional area A upon charging of the secondary battery. Members of the population of cathode structures have compressible cathode active material layers having a cross-sectional area C, the cross-sectional areas being measured in a first longitudinal plane that is parallel to the longitudinal direction. The method includes, in an initial formation stage, charging the secondary battery such that an expansion in cross-sectional area of the anode active material layers in the members of the population of anode structures compresses the compressible cathode active material layers of the population of cathode structure, such that a cross-sectional area of members of a subset of the cathode structure population decreases from an initial cross-sectional area $C_i$ prior to the initial formation stage to a post-formation cross-sectional area $C_f$ after the initial formation stage that is less than 95% of the initial cross-sectional area $C_i$ prior to the initial formation stage.

According to yet another aspect, a method of formation is provided for a secondary battery, the secondary battery being capable of cycling between a charged and a discharged state. The secondary battery has a battery enclosure, an electrode assembly, carrier ions, and a non-aqueous liquid electrolyte within the battery enclosure. The electrode assembly has a population of anode structures, a population of cathode structures, and electrically insulating microporous separators electrically separating members of the anode and compressible cathode structure populations. Members of the anode and cathode structure populations are arranged in an alternating sequence in a longitudinal direction, and members of the population of anode structures have anode active material layers that expand in cross-sectional area A upon charging of the secondary battery. Members of the population of cathode structures have compressible cathode active material layers having a cross-sectional area C, the cross-sectional areas being measured in a first longitudinal plane that is parallel to the longitudinal direction. The method includes, in an initial formation stage, charging the secondary battery such that expansion of the anode active material layers in the members of the population of anode structures compresses the microporous separators against the compressible cathode active material layers of the cathode structures at a pressure that contracts the cross-sectional area C of the compressible cathode active material layers, while also at least partially adhering the microporous separators to the compressible cathode active material layers of the cathode structures and the anode active material layers of the anode structures, wherein, upon discharge of the secondary battery and contraction in the cross-sectional area A of the anode active material layers, the at least partial adhesion of the microporous separators to the compressible cathode active material layers and the anode active material layers causes expansion in the cross-sectional area C of the compressible cathode active material layers.

According to yet another aspect, a secondary battery for cycling between a charged and a discharged state is provided, the secondary battery having a battery enclosure, an electrode assembly, carrier ions, and a non-aqueous liquid electrolyte within the battery enclosure. The electrode assembly has a population of anode structures, a population of cathode structures, and an electrically insulating microporous separator material electrically separating members of the anode and cathode structure populations. The electrode assembly also has a set of electrode constraints that at least partially restrains growth of the electrode assembly in the longitudinal direction upon cycling of the secondary battery. Members of the population of anode structures have an anode active material, and wherein the anode active material has the capacity to accept more than one mole of carrier ion per mole of anode active material when the secondary battery is charged from a discharged state to a charged state. Members of the population of cathode structures have a porous cathode active material, wherein a volume $V_2$ of the porous cathode active material occupied by the non-aqueous liquid electrolyte in the discharged state is greater than a volume $V_1$ of the porous cathode active material occupied by the non-aqueous electrolyte in the charged state. The charged state is at least 75% of the rated capacity of the secondary battery, and the discharged state is less than 25% of the rated capacity of the secondary battery.

According to yet another aspect, a secondary battery for cycling between a charged and a discharged state is provided, the secondary battery having a battery enclosure, an electrode assembly, carrier ions, and a non-aqueous liquid electrolyte within the battery enclosure. The electrode assembly has a population of anode structures, a population of cathode structures, and an electrically insulating microporous separator material electrically separating members of the anode and cathode structure populations. Members of the population of anode structures have an anode active material, and members of the population of cathode structures have a cathode active material. Members of the population of cathode structures have an areal capacity of at least 5 mA·h/cm$^2$ at 0.1 C, and a rate capability of 1 C:C/10 of at least 80% for discharge from a charged state to a discharged state. The charged state is at least 75% of the rated capacity of the secondary battery, and the discharged state is less than 25% of the rated capacity of the secondary battery.

According to yet another aspect, a secondary battery for cycling between a charged and a discharged state is provided, the secondary battery having a battery enclosure, an electrode assembly, carrier ions, and anon-aqueous liquid electrolyte within the battery enclosure. The electrode assembly has a population of anode structures, a population of cathode structures, and an electrically insulating microporous separator material electrically separating members of the anode and cathode structure populations, wherein members of the anode and cathode structure populations are arranged in an alternating sequence in a longitudinal direction. Each member of the population of anode structures has a layer of an anode active material and each member of the population of cathode structures has a layer of a cathode active material. Each member of the population of cathode structures has a first cross-sectional area $C_1$ when the secondary battery is in the charged state, and has a second cross-sectional area $C_2$ when the secondary battery is in the discharged state, wherein the second cross-sectional area $C_2$ of the cathode structures in the discharged state is greater than the first cross-sectional area $C_1$ of the cathode structures in the charged state, and wherein a ratio of second cross-sectional area $C_2$ of a subset of the members of the population of cathode structures to the first cross-sectional area $C_1$ of the subset of the members of the population of cathode structures is at least 1.05:1 upon discharging of the secondary battery from the charged state to the discharged state. The charged state is at least 75% of the rated capacity of the secondary battery, and the discharged state is less than 25% of the rated capacity of the secondary battery.

Other aspects, features and embodiments of the present disclosure will be, in part, discussed and, in part, apparent in the following description and drawing.

BRIEF DESCRIPTION OF THE DRAWING

FIG. 1C is a perspective view of one embodiment of an electrode assembly having a population of cathode structures and a population of anode structures, and a first longitudinal plane;

FIG. 1D is a cross-sectional view of an embodiment of an electrode assembly illustrating cross-sectional areas of a population of cathode structures and a population of anode structures.

FIG. 1E is a cross-sectional view of an embodiment of an electrode assembly illustrating an opposing surface area of an anode structure;

DEFINITIONS

Figure 1A:
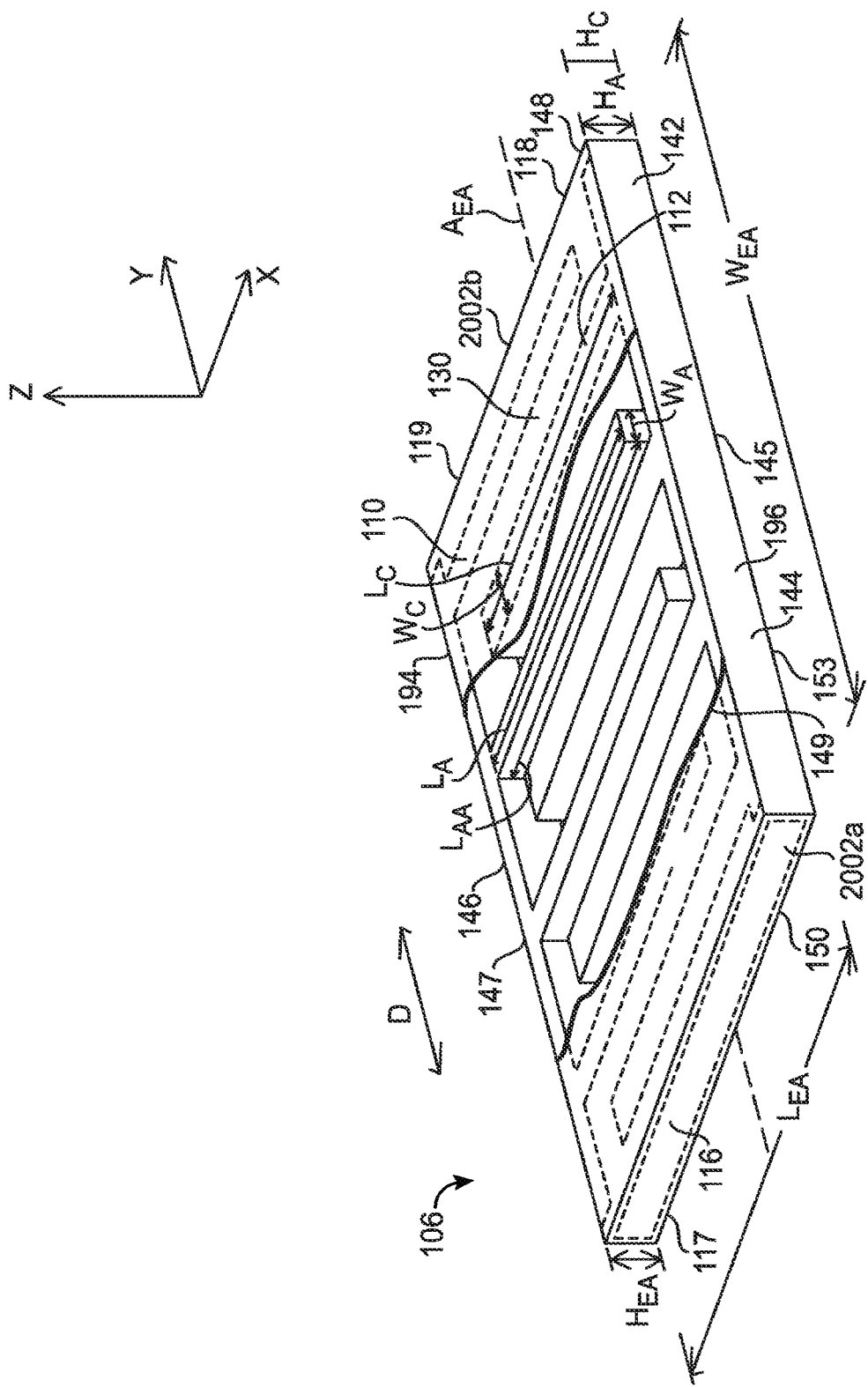
FIG. 1A is a schematic view of one embodiment of an electrode assembly having a population of cathode structures and a population of anode structures.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Areal capacity" as used herein in the context of a secondary battery refers to the capacity of the battery per unit area, where the area is the geometrical area of a portion of an anode structure (ignoring porosity) facing the cathode structure, summed over all anode structures in the secondary battery. The areal capacity will also typically be specified at a certain C-rate, such as 0.1 C. For example, if the rated capacity of a battery is 1000 mA·h at a C-rate of 0.1 C, and the geometrical area of the portion of each anode structure facing each cathode structure is 250 cm², and there are 5 anode structures (each having two facing sides), then the areal capacity is 1000/(250×5×2)=0.4 mA·h/cm².

"C-rate" as used herein refers to a measure of the rate at which a secondary battery is discharged, and is defined as the discharge current divided by the theoretical current draw under which the battery would deliver its nominal rated capacity in one hour. For example, a C-rate of 1 C indicates the discharge current that discharges the battery in one hour, a rate of 2 C indicates the discharge current that discharges the battery in ½ hours, a rate of C/2 indicates the discharge current that discharges the battery in 2 hours, etc.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Feret diameter" as referred to herein with respect to the electrode assembly is defined as the distance between two parallel planes restricting the electrode assembly measured in a direction perpendicular to the two planes. For example, a Feret diameter of the electrode assembly in the longitudinal direction is the distance as measured in the longitudinal direction between two parallel planes restricting the electrode assembly that are perpendicular to the longitudinal direction. As another example, a Feret diameter of the electrode assembly in the transverse direction is the distance as measured in the transverse direction between two parallel planes restricting the electrode assembly that are perpendicular to the transverse direction. As yet another example, a Feret diameter of the electrode assembly in the vertical direction is the distance as measured in the vertical direction between two parallel planes restricting the electrode assembly that are perpendicular to the vertical direction.

"Inversely related" as used herein with respect to a change in at least one dimension (e.g., the width), cross-sectional area, and/or volume of an electrode structure (i.e., anode structure and/or cathode structure), refers to a sign of the change being the opposite of that of a sign of the change in the same dimension, cross-section and/or volume in a counter-electrode structure. For example, for an increase in width of an anode structure, a change in the width dimension of the cathode structure that is inversely related thereto would be a decrease in width of the cathode structure. As another example, for an increase in a cross-sectional area of an anode structure, a change in the cross-sectional area of the cathode structure that is inversely related thereto would be a decrease in cross-sectional area of the cathode structure. Similarly, for a decrease in width of an anode structure, a change in the width dimension of the cathode structure that is inversely related thereto would be an increase in width of the cathode structure. As another example, for a decrease in a cross-sectional area of an anode structure, a change in the cross-sectional area of the cathode structure that is inversely related thereto would be an increase in cross-sectional area of the cathode structure. By way of further example, for an increase in width of a cathode structure, a change in the width dimension of the anode structure that is inversely related thereto would be a decrease in width of the anode structure. As another example, for an increase in a cross-sectional area of a cathode structure, a change in the cross-sectional area of the anode structure that is inversely related thereto would be a decrease in cross-sectional area of the anode structure. Similarly, for a decrease in width of a cathode structure, a change in the width dimension of the anode structure that is inversely related thereto would be an increase in width of the anode structure. As another example, for a decrease in a cross-sectional area of a cathode structure, a change in the cross-sectional area of the anode structure that is inversely related thereto would be an increase in cross-sectional area of the anode structure.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rate capability" as used herein in the context of a secondary battery refers to the ratio of the capacity of the secondary battery at a first C-rate to the capacity of the secondary battery at a second C-rate, expressed as a percentage. For example, the rate capability may calculated according to Capacity$_1$/Capacity$_2 \times 100$, where Capacity$_1$ is the capacity for discharge at the first C-rate, such as a C-rate of 1 C, and Capacity$_2$ is the capacity for discharge at a second C-rate, such as a C-rate of C/10, and may be expressed as the calculated percentage for a specified ratio $C_x:C_y$, where $C_x$ is the first C-rate, and $C_y$ is the second C-rate.

"Rated capacity" as used herein in the context of a secondary battery refers to the capacity of the secondary battery to deliver a specified current over a period of time, as measured under standard temperature conditions (25° C.). For example, the rated capacity may be measured in units of Amp-hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1 C indicates the discharge current that discharges the battery in one hour, 2C indicates the discharge current that discharges the battery in ½ hours, C/2 indicates the discharge current that discharges the battery in 2 hours, etc. Thus, for example, a battery rated at 20 Amp·hr at a C-rate of 1 C would give a discharge current of 20 Amp for 1 hour, whereas a battery rated at 20 Amp·hr at a C-rate of 2 C would give a discharge current of 40 Amps for ½ hour, and a battery rated at 20 Amp·hr at a C-rate of C/2 would give a discharge current of 10 Amps over 2 hours.

"Maximum width" ($W_{EA}$) as used herein in the context of a dimension of an electrode assembly corresponds to the greatest width of the electrode assembly as measured from opposing points of longitudinal end surfaces of the electrode assembly in the longitudinal direction.

"Maximum length" ($L_{EA}$) as used herein in the context of a dimension of an electrode assembly corresponds to the greatest length of the electrode assembly as measured from opposing points of a lateral surface of the electrode assembly in the transverse direction.

"Maximum height" ($H_{EA}$) as used herein in the context of a dimension of an electrode assembly corresponds to the greatest height of the electrode assembly as measured from opposing points of the lateral surface of the electrode assembly in the transverse direction.

"Porosity" or "void fraction" as used herein refers to the fraction of voids in a volume over the total volume, and may be expressed as a percentage. For example, the porosity of a cathode active material layer is the fraction of volume made up by voids in the layer per total layer volume. In the context of a secondary battery, the voids in a cathode active material layer may be at least partially filled with electrolyte, such as liquid electrolyte, during charging and/or discharging of the secondary battery, and as such the porosity or void fraction may be a measure of the volume fraction of the layer that can potentially be occupied by the electrolyte.

DETAILED DESCRIPTION

Figure 1B:
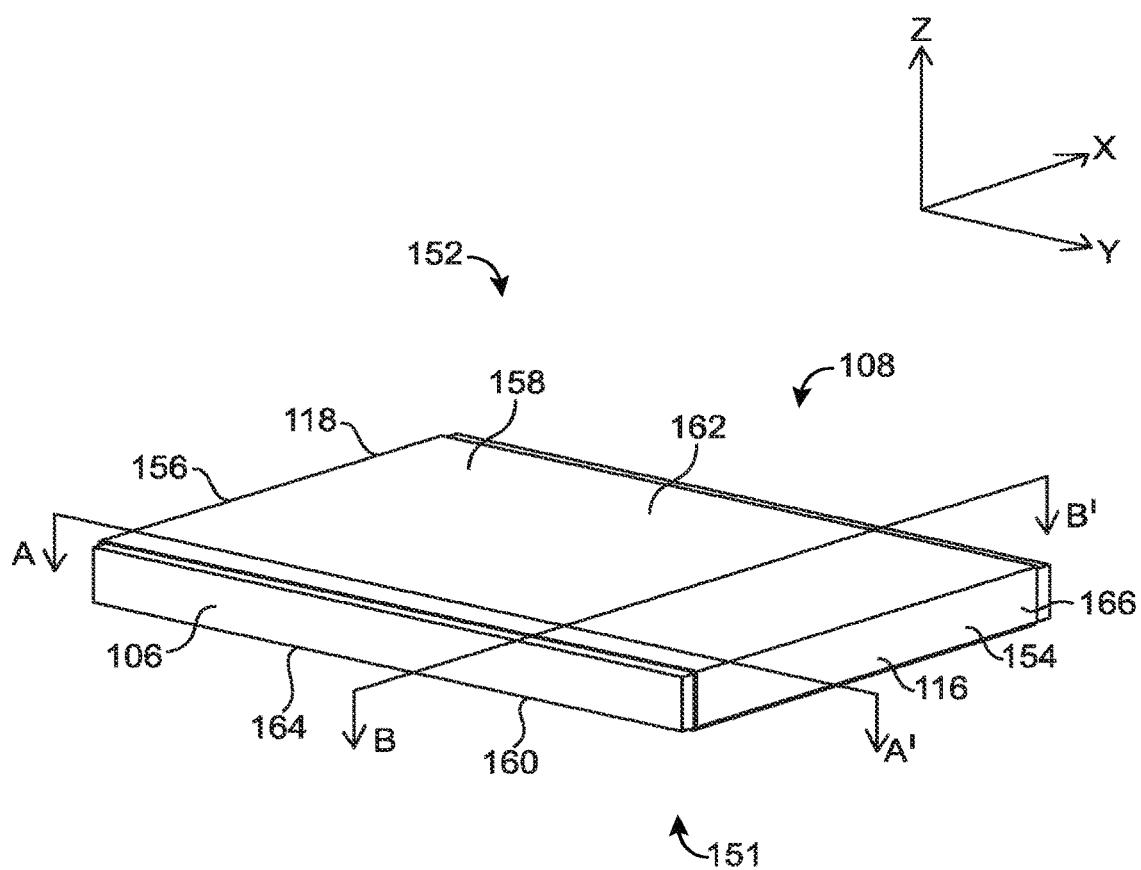
FIG. 1B is a perspective view of one embodiment of an electrode assembly having a population of cathode structures and a population of anode structures.
Figure 9:
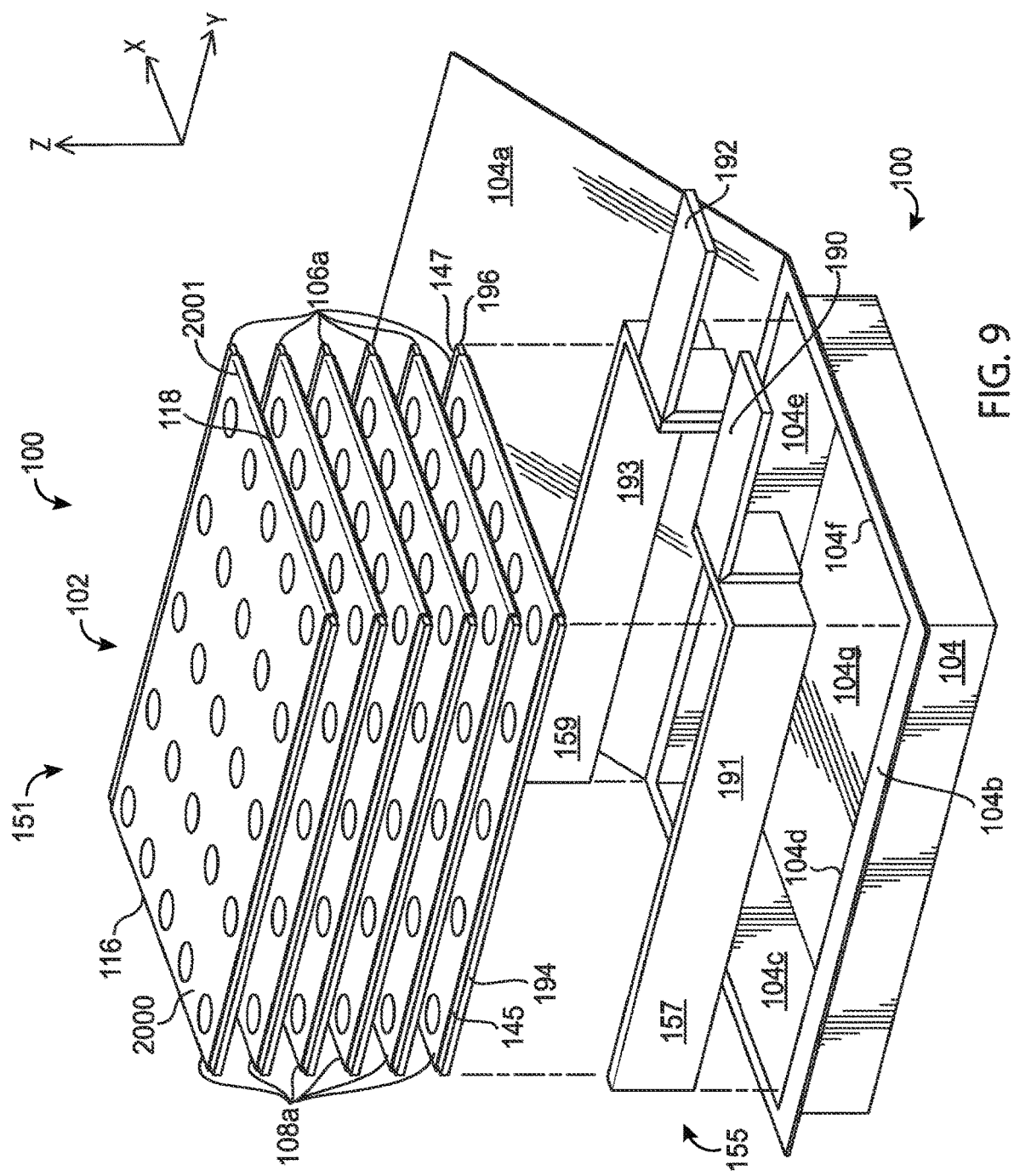
FIG. 9 illustrates an exploded view of an embodiment of an energy storage device or a secondary battery having compressible cathode structures.

In general, aspects of the present disclosure are directed to an energy storage device 100 (see, e.g., FIG. 9), such as a secondary battery 102, as shown for example in FIGS. 1A-1B and/or FIG. 9, that cycles between a charged and a discharged state. The secondary battery 102 includes a battery enclosure 104, an electrode assembly 106, carrier ions, and a non-aqueous liquid electrolyte within the battery enclosure. In the embodiment as shown in FIG. 1A, the electrode assembly 106 comprises a population of anode structures 110 (i.e., negative electrode structures), a population of cathode structures 112 (i.e., positive electrode structures), and electrically insulating microporous separators 130 arranged to electrically separate the members of the populations of anode structures 110 and 112.

According to one embodiment, aspects of the disclosure are directed to addressing issues that can arise in energy storage devices 100, such as secondary batteries 102, in a case where members of the population of anode structures 110 expand and/or contract upon cycling of the secondary battery 102 between charged and discharged states. For example, the anode structures 110 may comprise a layer of anode active material 132 (see, e.g., FIG. 7) that accepts carrier ions during charging of the secondary battery 102, such as by intercalating with or alloying with the carrier ions, in an amount that is sufficient to generate an increase in the volume of the anode structure. Referring to FIG. 1A, an embodiment of a three-dimensional electrode assembly 106 is shown with an alternating set of the anode structures 110 and cathode structures 112 that are interdigitated with one another, and which has a longitudinal axis $A_{EA}$ that is generally parallel to a stacking direction D (which is depicted as being parallel to the Y axis, in FIG. 1A) a transverse axis (not shown) generally parallel to the X axis, and a vertical axis (not shown) generally parallel to the Z axis. The X, Y and Z axes shown herein are arbitrary axes intended only to show a basis set where the axes are mutually perpendicular to one another in a reference space, and are not intended in any way to limit the structures herein to a specific orientation. Generally, upon charge and discharge cycling of a secondary battery 102 having the electrode assembly 106, the carrier ions travel between the anode and cathode structures 110 and 112, respectively, such as generally in a direction that is parallel to the Y axis as shown in the embodiment depicted in FIG. 1A, and can intercalate and/or move into anode/cathode active material of one or more of the anode structures 110 and cathode structures 112 that are located within the direction of travel. In particular, in moving from a discharged state to a charged state, carrier ions such as, for example, one or more of lithium, sodium, potassium, calcium and magnesium, can move between the positive and negative electrodes in the battery. Upon reaching the anode structure, the carrier ions may then intercalate or alloy into the electrode material, thus increasing the size and volume of that electrode. Conversely, reversing from the charged state to the discharged state can cause the ions to de-intercalate or de-alloy, thus contracting the anode structure. This alloying and/or intercalation and de-alloying and/or de-intercalation can cause significant volume change in the anode structure, which can cause strain in the electrode assembly 106, due to an overall macroscopic expansion of the electrode assembly 106 that can occur as a result of expansion of members of the population of anode structures 110 during cycling of the secondary battery 102. Thus, the repeated expansion and contraction of the anode structures 110 upon charging and discharging can create strain in the electrode assembly 106.

According to one embodiment, the anode structures 110 that expand and/or contract with cycling of the secondary battery comprise an anode active material that has the capacity to accept more than one mole of carrier ion per mole of anode active material, when the secondary battery 102 is charged from a discharged to a charged state. By way of further example, the anode active material may comprise a material that has the capacity to accept 1.5 or more moles of carrier ion per mole of anode active material, such as 2.0 or more moles of carrier ion per mole of anode active material, and even 2.5 or more moles of carrier ion per mole of anode active material, such as 3.5 moles or more of carrier ion per mole of anode active material. The carrier ion accepted by the anode active material may be at least one of lithium, potassium, sodium, calcium, and magnesium. Examples of anode active materials that expand to provide such a volume change include one or more of silicon, aluminum, tin, zinc, silver, antimony, bismuth, gold, platinum, germanium, palladium, and alloys thereof.

According to one embodiment, the secondary battery 102 includes a set of electrode constraints 108 that restrain growth of the electrode assembly 106. The growth of the electrode assembly 106 that is being constrained may be a macroscopic increase in one or more dimensions of the electrode assembly 106, and which may be due to an increase in the volume of members of the population of anode structures 110. In one embodiment, the set of electrode constraints 108 comprise a primary growth constraint system 151 to mitigate and/or reduce at least one of growth, expansion, and/or swelling of the electrode assembly 106 in the longitudinal direction (i.e., in a direction that parallels the Y axis), as shown for example in FIG. 1B. For example, the primary growth constraint system 151 can include structures configured to constrain growth by opposing expansion, such as at longitudinal end surfaces 116, 118 of the electrode assembly 106. In one embodiment, the primary growth constraint system 151 comprises first and second primary growth constraints 154, 156, that are separated from each other in the longitudinal direction, and that operate in conjunction with at least one primary connecting member 162 that connects the first and second primary growth constraints 154, 156 together to restrain growth in the longitudinal direction of the electrode assembly 106. For example, the first and second primary growth constraints 154, 156 may at least partially cover first and second longitudinal end surfaces 116, 118 of the electrode assembly 106, and may operate in conjunction with one or more connecting members 162, 164 connecting the primary growth constraints 154, 156 to one another to oppose and restrain any growth in the electrode assembly 106 that occurs during repeated cycles of charging and/or discharging. In another embodiment, one or more of the first and second primary growth constraints 154, 156 may be internal to the electrode assembly 106, and may operate in conjunction with at least one connecting member 162 to constrain growth in the longitudinal direction. Further discussion of embodiments and operation of the primary growth constraint system 151 is provided in more detail below.

In addition, repeated cycling through charge and discharge processes in a secondary battery 102 can induce growth and strain not only in a longitudinal direction of the electrode assembly 106 (e.g., Y-axis in FIGS. 1A-1B), but can also induce growth and strain in directions orthogonal to the longitudinal direction, such as the transverse and vertical directions (e.g., X and Z axes, respectively, in FIGS. 1A-1B). Furthermore, in certain embodiments, the incorporation of a primary growth constraint system 151 to inhibit growth in one direction can even exacerbate growth and/or swelling in one or more other directions. For example, in a case where the primary growth constraint system 151 is provided to restrain growth of the electrode assembly 106 in the longitudinal direction, the intercalation of carrier ions during cycles of charging and discharging and the resulting swelling of electrode structures can induce strain in one or more other directions. In particular, in one embodiment, the strain generated by the combination of electrode growth/ swelling and longitudinal growth constraints can result in buckling or other failure(s) of the electrode assembly 106 in the vertical direction (e.g., the Z axis as shown in FIGS. 1A-1B), or even in the transverse direction (e.g., the X axis as shown in FIGS. 1A-1B).

Accordingly, in one embodiment of the present disclosure, the secondary battery 102 includes not only a primary growth constraint system 151, but also at least one secondary growth constraint system 152 that may operate in conjunction with the primary growth constraint system 151 to restrain growth of the electrode assembly 106 along one or more axes of the electrode assembly 106. For example, in one embodiment, the secondary growth constraint system 152 may be configured to interlock with, or otherwise synergistically operate with, the primary growth constraint system 151, such that overall growth of the electrode assembly 106 can be restrained to impart improved performance and reduced incidence of failure of the secondary battery having the electrode assembly 106 and primary and secondary growth constraint systems 151 and 152, respectively. In one embodiment, the secondary growth constraint system 152 comprises first and second secondary growth constraints 158, 160 separated in a second direction and connected by at least one secondary connecting member 166, wherein the secondary constraint system at least partially restrains growth of the electrode assembly in the direction orthogonal to the longitudinal direction (e.g., the Z direction), upon cycling of the secondary battery. Further discussion of embodiments of the interrelationship between the primary and secondary growth constraint systems 151 and 152, respectively, and their operation to restrain growth of the electrode assembly 106, is provided in more detail below.

In one embodiment of the disclosure, the set of electrode constraints 108 may constrain the growth of the electrode assembly 106, such that the growth of members of the population of anode structures 110, i.e. during charging of the secondary battery 102 having the electrode assembly 106, results in compression of other structures of the electrode assembly 106. For example, the set of electrode constraints 108 may provide a longitudinal constraint, i.e. via the primary growth constraint system 151, that constrains growth of the electrode assembly 106 in the longitudinal direction, such that expansion of members of the population of anode structures 110 in the longitudinal direction during charging of the secondary battery 102 exerts a compressive pressure on members of the population of cathode structures 112 in the electrode assembly 106. That is the members of the population of cathode structures 112 may be at least partially prevented from longitudinally translating away from the expanding anode structures members by the presence of the longitudinal constraints, with the result that longitudinal expansion of members of the population of anode structures 110 compresses the members of the population of cathode structures 112. According to yet another embodiment, the set of electrode constraints 108 may constrain growth of the electrode assembly 106 in other direction(s) orthogonal to the longitudinal direction, such as in the vertical direction (Z direction), and/or in the transverse direction (X direction), such that growth of members of the population of anode structures 110 during charging generates a compressive force. The growth of the members of the population of anode structures 110 in an electrode assembly 106 having the set of electrode constraints may thus generate compressive forces and/or pressures on other components of the electrode assembly, which can lead to failure of such components if a force and/or pressure failure limit is exceeded.

In one embodiment, the expansion and/or contraction of the members of the population of anode structures 110 in the constrained electrode assembly 106 can be at least partially accommodated by providing members of the population of cathode structures 112 that are capable of expanding and/or contracting, such as at least partly in relation to the expansion and/or contraction of the members of the population of anode structures 110, thereby reducing strain in the electrode assembly 106. For example, in one embodiment, the members of the population of cathode structures 112 are capable of changing (e.g., expanding and/or contracting) in at least one dimension in a manner that is inversely related to a change in at least one dimension of the members of the population of anode structures. For example, in a case where members of the population of anode structures 110 increase in a width dimension and/or cross-sectional area during charging of the secondary battery 102, the members of the population of cathode structures 112 may be capable of contracting in the width dimension and/or cross-sectional area, to at least partially accommodate the change in dimension(s) of members of the population of anode structures 110.

In one embodiment, each member of a population of anode structures 110 has a cross-section 114 with cross-sectional area A, and each member of the population of cathode structures 112 has a cross-section 114 with cross-sectional area C, wherein the cross-sectional areas are measured in a first longitudinal plane 113 that is parallel to the longitudinal direction (i.e., parallel to the longitudinal axis $A_{EA}$), as shown for example in FIGS. 1 C and 1D. As seen in the embodiment as shown in FIG. 1D, which depicts generally rectangular cross-sections as taken along the longitudinal plane 113, the cross-sectional area A of the anode structure for such a rectangular cross-section may be equal to the height $H_A$ of the anode structure 110 times the width $W_A$ of the anode structure, and the cross-sectional area C of the cathode structure 112 may be equal to the height $H_C$ of the cathode structure 110 times the width $W_C$ of the cathode structure 112. Alternatively and/or additionally, the cross-sectional area 114 may be calculated for electrodes having different shapes and/or cross-sections other than that shown in FIGS. 1C-1D, for example by a suitable cross-sectional area determination method understood by those of ordinary skill in the art. Without being limited thereto, in one embodiment, the cross-sectional area may be calculated by using a Scanning Electron Microscopy (SEM) technique to identify a cross-section of a member of the cathode and/or anode structure populations that is of interest, in the first longitudinal plane 113. The cross-sectional area for the cross-section obtained by SEM may then be obtained using methods known to those of ordinary skill in the art, such as for example by using available software programs capable of determining the areas of various shapes and objects, such as for example the ImageJ software (Image Processing and Analysis in Java) available from the National Institutes of Health. In one embodiment, the area of a cross-section in an image identified by SEM may be generally determined using a software program by computationally or manually identifying the boundaries of the cross-section in the SEM image, counting a number of pixels that fall within the identified boundaries of the portion of the SEM image corresponding to the cross-section, and inputting a scale of the image (e.g., dimension size per pixel in the image), to calculate the area of the identified cross-section. Other methods known to those of ordinary skill in the art for the determination of cross-sectional areas may also be used in determining the area of a cross-section of one or more members of the anode and cathode structure populations.

Accordingly, in one embodiment, a change in size of either a member of the population of anode structures 110 and/or a member of the population of cathode structure 112 may be determined according to a change in the cross-sectional area of the structure as measured in the first longitudinal plane. For example, in one embodiment, each member of the anode structure population has a first cross-sectional area, $A_1$, when the secondary battery is in the charged state, and a second cross-sectional area $A_2$ when the secondary battery is in the discharged state, and each member of the cathode structure population has a first cross-sectional area $C_1$ when the secondary battery is in the charged state, and a second cross-sectional area $C_2$, when the secondary battery is in the discharged state. The change in dimension and/or volume of the members of the population of anode and/or cathode structures upon charging and discharging may thus result in an assembly where $A_1$ is greater than $A_2$ for each of the members of a subset of the anode structure population, and $C_1$ is less than $C_2$ for each of the members of a subset of the cathode structure population. That is, upon charging of the secondary battery, the cross-sectional areas of members of the anode structure population increase from $A_1$ to $A_2$, whereas the cross-sectional areas of members of the cathode structure population contract from $C_2$ to $C_1$, and upon discharging of the secondary battery, the cross-sectional areas of members of the anode structure population decrease from $A_2$ to $A_1$, whereas the cross-sectional areas of members of the cathode structure population increase from $C_2$ to $C_1$. Thus, in one embodiment, the changing dimension(s) of members of the cathode structure population can at least partially accommodate an increase and/or decrease in the dimensions and/or size of members of the anode structure population.

Furthermore, by "subset" of the anode structure population, it is meant at least one member of the anode structure population, and the subset can also be co-extensive with the number of members in the anode structure population in the electrode assembly 106. That is, the subset of the population of anode structures can include only one or all members of the population of anode structures in the electrode assembly 106, or any number in between. Similarly, by "subset" of the cathode structure population, it is meant at least one member of the cathode structure population, and the subset can also be co-extensive with the number of members in the cathode structure population in the electrode assembly 106. That is, the subset of the population of cathode structures can include only one or all members of the population of cathode structures in the electrode assembly, or any number in between. For example, the subset of either anode or cathode structure populations can comprise one member or two members, or more. In one embodiment, the subset comprises at least five members. In another embodiment, the subset comprises at least 10 members. In yet another embodiment, the subset comprises at least 20 members. In yet another embodiment, the subset comprises at least 50 members. For example, in one embodiment, the subset of the population can comprise from 1 to 7 members, such as from 2 to 6 members, and even from 3 to 5 members. In yet another embodiment, the subset (of either the anode and/or cathode structure populations) can comprise a percentage of the total number of members in the electrode assembly 106. For example, the subset can comprise at least 10% of the members (anode and/or cathode members) in the electrode assembly, such as at least 25% of the members, and even at least 50%, such as at least 75%, and even at least 90% of the members in the electrode assembly.

By way of further explanation, in one embodiment, the members of the population of cathode structures 112 can be understood to exhibit a change in size, such as a change in dimension, cross-section and/or volume. For example, members of the population of cathode structure 112 may exhibit a change in the cross-sectional areas C, or width $W_C$ of each cathode structure 112 as measured in the longitudinal direction (i.e., parallel to the longitudinal axis $A_{EA}$), to at least partially accommodate an expansion/contraction of the anode structures 110. For example, in one embodiment, the change in width $W_C$ and/or cross-sectional area C of members of the population of cathode structures 112 may at least partially accommodate a change in width $W_A$ and/or cross-sectional areas A of members of the population of anode structures 110, such as a width as measured in the longitudinal direction and/or a cross-section having at least a portion of the width as a dimension thereof, which may occur due to intercalation and/or alloying or de-intercalation and de-alloying of carrier ions in the direction of travel of the carrier ions between the anode and cathode structures, which direction of travel may generally be in the longitudinal direction. That is, in a case where members of the population of anode structures 110 increase in width and/or cross-sectional area upon charging, the members of the population of cathode structures 112 may decrease in width and/or cross-sectional area upon charging, and in a case where members of the population of anode structures 110 decrease in width and/or cross-sectional area upon discharging, members of the population of the cathode structures 112 may increase in width and/or cross-sectional area upon discharging. In yet another embodiment, the change in the at least one dimension of the member of the population of cathode structures 112 upon expansion/contraction of the members of the population of anode structures 110 can be understood to generate an overall change in the cross-sectional area of the members of the population of cathode structures 112 that is inversely related to a change in the cross-sectional areas of the members of the population of anode structures. That is, in a case where members of the population of the anode structures 110 increase in cross-sectional area upon charging, members of the population of cathode structures 112 may decrease in cross-sectional upon charging, and in a case where members of the population of anode structures 110 decrease in cross-sectional area upon discharging, members of the population of cathode structures 112 may increase in cross-sectional area upon discharging. In yet another embodiment, the change in the at least one dimension of members of the population of cathode structures 112 upon expansion/contraction of members of the population of anode structures 110 can be understood to generate an overall change in volume of the cathode structures 112 that is inversely related to a change in volume of members of the population of anode structures. That is, in a case where members of the population of anode structures 110 increase in volume upon charging, members of the population of cathode structures 112 may decrease in volume upon charging, and in a case where members of the population of anode structures 110 decrease in volume upon discharging, members of the population of cathode structures 112 may increase in volume upon discharging.

Furthermore, in one embodiment, a sign of the change in the at least one dimension (e.g., the width), cross-section and/or volume of members of the population of cathode structures 112 is the opposite of that of a sign of the change in the at least one dimension, cross-section and/or volume of members of the population of anode structures 110, such that the change in sizes are inversely related to each other. For example, for a member of the population of anode structures 110 that increases in width upon charging of the secondary battery 102, a sign for the change in width would be the sign of the number resulting from subtraction of the initial width $W_I$ from the final width $W_F$, ($W_F-W_I=+\Delta W$), which is a positive number with a positive sign (+) since $W_F$ of the anode structure is greater than $W_I$. Conversely, for a member of the population of cathode structures 112 that decreases in width upon charging of the secondary battery 102, a sign for the width change would be $W_F-W_I=-\Delta W$, which is a negative number with a negative sign (−) since $W_F$ for the cathode structure is smaller than $W_I$. However, it should be noted that the absolute value of the magnitude of $\Delta W$ of the anode structure is not necessarily the same as the absolute value of the magnitude of $\Delta W$ for the cathode structure, during charge and/or discharge. In other words, the extent of expansion of the anode structure during charging does not have to equal the extent of contraction of the cathode structure. For example, other structures in the secondary battery may at least partially accommodate the expansion of the anode structure, such that the compression of the cathode structure is less than what might otherwise be expected if the cathode structure were to compress to an extent to completely accommodate the full extent of the anode structure expansion. The same may be true of discharging, where an extent of expansion of the cathode structure may be of a different magnitude than the extent of contraction of the anode structure during the discharge process. Thus, in a case where a member of the population of anode structures 110 exhibits a change in width, cross-section and/or volume that has a positive sign (e.g., the width increases), the change in width, cross-section and/or volume of a member of the population of cathode structures 112 may be inversely related thereto (although possibly of a different magnitude), and thus has a negative sign. Conversely, in a case where a member of the population of anode structures exhibits a change in width, cross-section and/or volume that has a negative sign (e.g., the width decreases), the change in width, cross-section and/or volume of a member of the population of cathode structures 112 may be inversely related thereto (although possibly of a different magnitude), and thus has a positive sign. By providing members of the population of cathode structures that are capable of changing in at least one dimension, such as the width, cross-section and/or volume in relation to an expansion and/or contraction of members of the population of anode structures, the strain on the electrode assembly 106 that can otherwise be caused by repeated expansion and contraction over multiple cycles of the secondary battery can be reduced, thereby improving the lifetime and performance of the secondary battery 102.

Figure 2A:
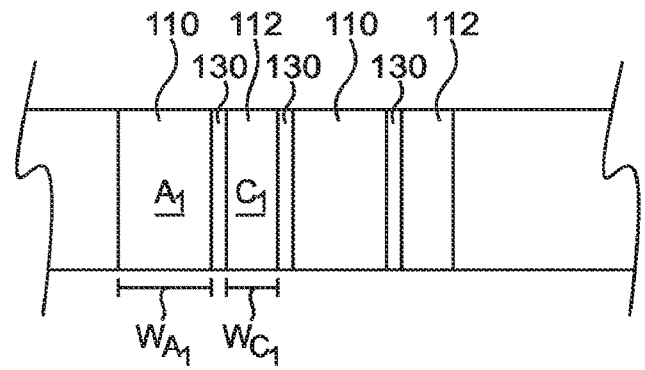
FIGS. 2A-2C are cross-sectional views of an embodiment of an electrode assembly with a population of cathode structures
Figure 2B:
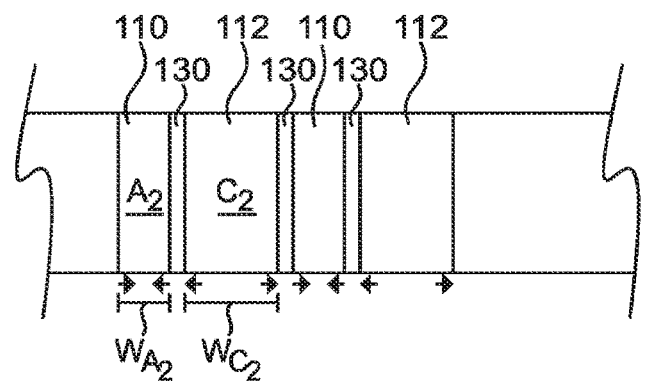
Figure 2C:
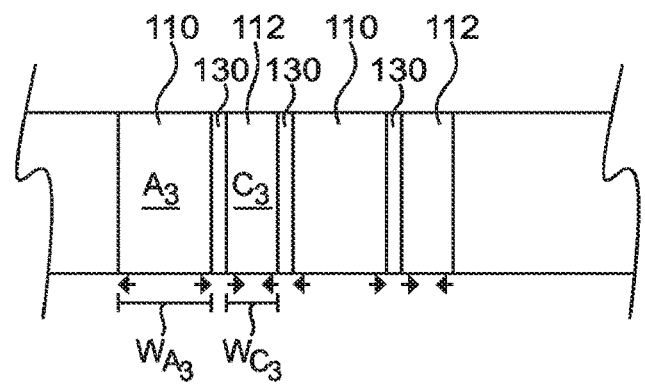

By way of further explanation, referring to FIGS. 2A-2C, an embodiment is shown of an electrode assembly 106 having members of the population of cathode structures 110 that change size (e.g., width, cross-sectional area and/or volume) in relation to expansion/contraction of members of the population of anode structures 112, in both a charged state (FIGS. 2A and 2C) and in a discharged state (FIG. 2B). In FIG. 2A showing a charged state for the secondary battery 102, the members of the population of anode structure 110 have a cross-sectional area $A_1$ with width $W_{A1}$, and members of the population of cathode structure 112 have a cross-sectional area $C_1$ with width $W_{C1}$. However, when the secondary battery 102 is discharged to the discharged state shown in FIG. 2B, the width of members of the population of anode structures 110 decreases to provide cross-sectional area $A_2$ and width $W_{A2}$, while the width of members of the population of cathode structure 112 increases to provide cross-sectional area $C_2$ an $W_{C2}$, where $A_2<A_1$ and $C_2>C_1$, and $W_{A2}<W_{A1}$ and $W_{C2}>W_{C1}$. That is, the change in size of members of the population of cathode structures 112 may be inversely related to that of members of the population of anode structures 110, because the cathode structure population members increase in cross-sectional area and/or width, while the anode structure population members decrease in cross-sectional area and/or width, when the secondary battery is discharged (the direction of the change in width is depicted schematically by the arrows in FIG. 2B). When the secondary battery 102 is charged up from the discharged state shown in FIG. 2B to a subsequent charged state shown in FIG. 2C, members of the population of anode and cathode structures 110, 112 exhibit a further change in cross-sectional area and/or width, with cross-sectional area of the members of the population of anode structures increasing to $A_3$, where $A_3<A_2$, and the width of the members of the population of anode structures increasing to $W_{A3}$, where $W_{A3}>W_{A2}$, and the cross-sectional area of members of the population of cathode structures decreasing to $C_3$, where $C_3<C_2$, and the width of members of the population of cathode structures decreasing to $W_{C3}$, where $W_{C3}<W_{C2}$. While in some embodiments the cross-sectional area $A_3$ and/or width $W_{A3}$ of the members of the population of anode structures 110 in the subsequent charged state depicted in FIG. 2C may be the same as the corresponding cross-sectional area $A_1$ and/or width $W_{A1}$ of the members of the population of anode structures 110 in the initial charged state shown in FIG. 2A, it is also possible that the cross-sectional area $A_3$ and/or width $W_{A3}$ of members of the population of anode structures 110 in a subsequent charged state may be increased over the cross-sectional area $A_1$ and/or width $W_{A1}$ of members of the population of anode structure 110 in the initial charged state. That is, in certain embodiments, the width, cross-sectional area and/or volume of members of the population of anode structures 110 in the charged state may increase over repeated cycling of the secondary battery 102 between charged and discharged states. Similarly, while the cross-sectional area $C_3$ and/or width $W_{C3}$ of members of the population of cathode structure 112 in the subsequent charged state depicted in FIG. 2C may be the same as the cross-sectional area $C_3$ and/or width $W_{C1}$ of the members of the population of cathode structures 112 in the initial charged state depicted in 3A, it is also possible that the cross-sectional area $C_3$ and/or width $W_{C3}$ of members of the population of cathode structures 112 in a subsequent charged state may be decreased over the corresponding cross-sectional area $C_3$ and/or width $W_{C1}$ of members of the population of cathode structures 112 in the initial charged state. That is, in certain embodiments, the width, cross-sectional area and/or volume of the members of the population of cathode structures 112 in the charged state may decrease over repeated cycling of the secondary battery 102 between charged and discharged states, such as to accommodate an increase in growth of members of the population of anode structures 110 that may occur over repeated cycling of the secondary battery 102.

Accordingly, in one embodiment, members of the population of cathode structures 112 have a first size, such as a first dimension and/or cross-sectional area when the secondary battery 102 is in the charged state, and have a second size, such as a second dimension and/or cross-sectional area when the secondary battery 102 is in the discharged state, with the first dimension and/or cross-sectional area being less than the second dimension and/or cross-sectional area. In yet another embodiment, the change in size, such as change in dimension and/or cross-sectional area of the cathode structures 112 may be inversely related to a change in the dimension and/or cross-sectional area of members of the population of anode structures 110. For example, in one embodiment, at least one member of the population of cathode structures 112 may have a first cross-sectional area $C_1$ in the charged state that is no more than $3 \times 10^7$ $\mu m^2$. By way of further example, in one embodiment at least one member of the population of cathode structures may have a first cross-sectional area $C_1$ in the charged state that is no more than $1 \times 10^7$ $\mu m^2$. By way of further example, in one embodiment at least one member of the population of cathode structures may have a first cross-sectional area $C_1$ in the charged state that is no more than $9.5 \times 10^6$ $\mu m^2$. By way of yet further example, in one embodiment at least one member of the population of cathode structure may have a first cross-sectional area $C_1$ in the charged state that is no more than $8 \times 10^6$ $\mu m^2$. By way of yet further example, at least one member of population of cathode structures may have a first cross-sectional area $C_1$ in the charged state that is no more than $5 \times 10^6$ $\mu m^2$. In general, the first cross-sectional area $C_1$ of at least one member of the population of cathode structures in the charged state may be at least $2 \times 10^2$ $\mu m^2$, for example the first cross-sectional area $C_1$ in the charged state may be at least $2.5 \times 10^2$ $\mu m^2$, and even at least $3 \times 10^2$ $\mu m^2$. For example, the first cross-sectional area $C_1$ may be in the range of from $2 \times 10^2$ $\mu m^2$ to $3 \times 10^7$ $\mu m^2$, such as from $2.5 \times 10^2$ $\mu m^2$ to $9.5 \times 10^6$ $\mu m^2$, and even in the range of from $3 \times 10^2$ $\mu m^2$ to $8 \times 10^6$ $\mu m^2$.

Furthermore, in one embodiment, at least one member of the population of cathode structures have a second cross-sectional area $C_2$ in the discharged state that is at least $1.01 \times 10^2$ $\mu m^2$. By way of further example, in one embodiment at least one member of the population of cathode structures may have a second cross-sectional area $C_2$ in the discharged state that is at least $1.05 \times 10^2$ $\mu m^2$. By way of further example, in one embodiment at least one member of the population of cathode structures may have a second cross-sectional area $C_2$ in the discharged state that is at least $1.0 \times 10^3$ $\mu m^2$. By way of further example, in one embodiment at least one member of the population of cathode structures may have a second cross-sectional area $C_2$ in the discharged state that is at least $1.05 \times 10^3$ $\mu m^2$. By way of further example, in one embodiment at least one member of the population of cathode structures may have a second cross-sectional area $C_2$ in the discharged state that is at least $1.1 \times 10^3$ $\mu m^2$. In general, the second cross-sectional area $C_2$ of at least one member of the population of cathode structures in the charged state will not exceed $1.5 \times 10^{10}$, for example the second cross-sectional area $C_2$ in the discharged state may not exceed $1 \times 10^7$ $\mu m^2$, and even may not exceed $1 \times 10^6$ $\mu m^2$. For example, the second cross-sectional area $C_2$ may be in the range of from $1.01 \times 10^2$ $\mu m^2$ to $1.5 \times 10^{10}$ $\mu m^2$, such as from $1.0 \times 10^3$ $\mu m^2$ to $1.0 \times 10^7$ $\mu m^2$, and even in the range of from $1.05 \times 10^2$ $\mu m^2$ to $1 \times 10^6$ $\mu m^2$.

In yet another embodiment, in one embodiment at least one member of the population of cathode structures has a ratio of the second cross-sectional area $C_2$ of the cathode structure 112 in the discharged state to a first cross-sectional area $C_1$ of the cathode structure 112 in the charged state that is at least 1.05:1. By way of further example, in one embodiment at least one member of the population of cathode structures has a ratio of the second cross-sectional area $C_2$ of the cathode structure 112 to the first cross-sectional area $C_1$ of the cathode structure 112 that is at least 1.1:1. By way of further example, in one embodiment at least one member of the population of cathode structures has a ratio of the second cross-sectional area $C_2$ of the cathode structure 112 to the first cross-sectional area $C_1$ of the cathode structure 112 that is at least 1.3:1. By way of further example, in one embodiment at least one member of the population of cathode structures has a ratio of the second cross-sectional area $C_2$ of the cathode structure 112 to the first cross-sectional area $C_1$ of the cathode structure 112 that is at least 2:1. By way of further example, in one embodiment at least one member of the population of cathode structures has a ratio of the second cross-sectional area $C_2$ of the cathode structure 112 to the first cross-sectional area $C_1$ of the cathode structure 112 that is at least 3:1. By way of further example, in one embodiment at least one member of the population of cathode structures has a ratio of the second cross-sectional area $C_2$ of the cathode structure 112 to the first cross-sectional area $C_1$ of the cathode structure 112 that is at least 4:1. By way of further example, in one embodiment at least one member of the population of cathode structures has a ratio of the second cross-sectional area $C_2$ of the cathode structure 112 to the first cross-sectional area $C_1$ of the cathode structure 112 that is at least 6:1. Generally, the ratio of the second cross-sectional area $C_2$ to the first cross-sectional area $C_1$ will not exceed about 15:1, and will even not exceed 10:1, such as for example not exceeding 8:1. For example, in one embodiment at least one member of the population of cathode structures has a ratio of the second cross-sectional area $C_2$ of the cathode structure 112 to the first cross-sectional area $C_1$ of the cathode structure 112 that may be in the range of from 1.05:1 to 15:1. By way of further example, in one embodiment at least one member of the population of cathode structures has a ratio of the second cross-sectional area $C_2$ of the cathode structure 112 to the first cross-sectional area $C_1$ of the cathode structure 112 that may be in the range of from 1.1:1 to 6:1. By way of further example, in one embodiment at least one member of the population of cathode structures has a ratio of the second cross-sectional area $C_2$ of the cathode structure 112 to the first cross-sectional area $C_1$ of the cathode structure 112 that may be in the range of from 1.3:1 to 4:1. Furthermore, in one embodiment, the contraction of first cross-sectional area $C_1$ with respect to the second cross-sectional area $C_2$ is in the range of from 2% contraction to 90% contraction, such as from 5% contraction to 75% contraction. That is, the first cross-sectional area $C_1$ may be contracted by at least 2% with respect to $C_2$, such as at least 5% and even at least 10% with respect to $C_2$, but may be contracted less than 90% with respect to $C_2$, such as less than 80% and even less than 75% with respect to $C_2$.

Furthermore, in one embodiment, at least one member of the population of anode structures 110 may have a first cross-sectional area $A_1$ in the charged state that is at least 100 $\mu m^2$. By way of further example, in one embodiment at least one member of the population of anode structures may have a first cross-sectional area $A_1$ in the charged state that is at least $1 \times 10^3$ $\mu m^2$. By way of yet further example, in one embodiment at least one member of the population of anode structures may have a first cross-sectional area $A_1$ in the charged state that is at least $4.5 \times 10^3$ $\mu m^2$. By way of yet further example, at least one member of population of anode structures may have a first cross-sectional area $A_1$ in the charged state that is at least $6 \times 10^3$ $\mu m^2$. By way of further example, in one embodiment at least one member of the population of anode structures may have a first cross-sectional area $A_1$ in the charged state that is at least $8 \times 10^3$ $\mu m^2$. In general, the first cross-sectional area $A_1$ of at least one member of the population of anode structures in the charged state may not exceed $1.5 \times 10^7$ $\mu m^2$, for example the first cross-sectional area $A_1$ in the charged state may not exceed $7.6 \times 10^6$ $\mu m^2$, and may even not exceed $5 \times 10^6$ $\mu m^2$. For example, the first cross-sectional area $A_1$ may be in the range of from $100$ $\mu m^2$ to $1.5 \times 10^7$ $\mu m^2$, such as from $4.5 \times 10^3$ $\mu m^2$ to $7.6 \times 10^6$ $\mu m^2$, and even in the range of from $6 \times 10^3$ $\mu m^2$ to $5 \times 10^6$ $\mu m^2$.

Furthermore, in one embodiment, at least one member of the population of anode structures have a second cross-sectional area $A_2$ in the discharged state that is no more than $3 \times 10^7$ $\mu m^2$. By way of further example, in one embodiment at least one member of the population of anode structures may have a second cross-sectional area $A_2$ in the discharged state that is no more than $1.5 \times 10^7$ $\mu m^2$. By way of further example, in one embodiment at least one member of the population of anode structures may have a second cross-sectional area $A_2$ in the discharged state that is no more than $7.5 \times 10^6$ $\mu m^2$. By way of further example, in one embodiment at least one member of the population of anode structures may have a second cross-sectional area $A_2$ in the discharged state that is no more than $5 \times 10^6$ $\mu m^2$. By way of further example, in one embodiment at least one member of the population of anode structures may have a second cross-sectional area $A_2$ in the discharged state that is no more than $3 \times 10^6$ $\mu m^2$. In general, the second cross-sectional area $A_2$ of at least one member of the population of anode structures in the charged state will be at least $500$ $\mu m^2$, for example the second cross-sectional area $A_2$ in the discharged state may be at least $1.5 \times 10^3$, and even at least $3 \times 10^3$ $\mu m^2$. For example, the second cross-sectional area $A_2$ may be in the range of from $500$ $\mu m^2$ to $3 \times 10^7$ $\mu m^2$, such as from $1.5 \times 10^3$ $\mu m^2$ to $7.5 \times 10^6$ $\mu m^2$, and even in the range of from $3 \times 10^3$ $\mu m^2$ to $5 \times 10^6$ $\mu m^2$.

In yet another embodiment, in one embodiment at least one member of the population of anode structures has a ratio of the first cross-sectional area $A_1$ of the anode structure 110 in the charged state to a second cross-sectional area $A_2$ of the anode structure 110 in the discharged state that is at least 1.01:1. By way of further example, in one embodiment at least one member of the population of anode structures has a ratio of the first cross-sectional area $A_1$ of the anode structure 110 to the second cross-sectional area $A_2$ of the anode structure 110 that is at least 1.05:1. By way of further example, in one embodiment at least one member of the population of anode structures has a ratio of the first cross-sectional area $A_1$ of the anode structure 110 to the second cross-sectional area $A_2$ of the anode structure 110 that is at least 1.5:1. By way of further example, in one embodiment at least one member of the population of anode structures has a ratio of the first cross-sectional area $A_1$ of the anode structure 110 to the second cross-sectional area $A_2$ of the anode structure 110 that is at least 2:1. By way of further example, in one embodiment at least one member of the population of anode structures has a ratio of the first cross-sectional area $A_1$ of the anode structure 110 to the second cross-sectional area $A_2$ of the anode structure 110 that is at least 3:1. By way of further example, in one embodiment at least one member of the population of anode structures has a ratio of the first cross-sectional area $A_1$ of the anode structure 110 to the second cross-sectional area $A_2$ of the anode structure 110 that is at least 4:1. By way of further example, in one embodiment at least one member of the population of anode structures has a ratio of the first cross-sectional area $A_1$ of the anode structure 110 to the second cross-sectional area $A_2$ of the anode structure 110 that is at least 5:1. For example, in one embodiment at least one member of the population of anode structures has a ratio of the first cross-sectional area $A_1$ of the anode structure 110 to the second cross-sectional area $A_2$ of the anode structure 110 that may be in the range of from 1.01:1 to 5:1. By way of further example, in one embodiment at least one member of the population of anode structures has a ratio of the first cross-sectional area $A_1$ of the anode structure 110 to the second cross-sectional area $A_2$ of the anode structure 110 that may be in the range of from 1.01 to 4:1. By way of further example, in one embodiment at least one member of the population of anode structures has a ratio of the first cross-sectional area $A_1$ of the anode structure 110 to the second cross-sectional area $A_2$ of the anode structure 110 that may be in the range of from 1.01:1 to 3:1, and even in the range of from 1.5:1 to 3:1.

In one embodiment, a subset of the anode structure population has a median cross-sectional area, as measured either according to $MA_A$, which as used herein refers to a median of cross-sectional areas for more than one anode member, and/or according to $ML_A$, which as used herein refers to a median of cross-sectional areas at different longitudinal planes long an anode member, and/or according to $MO_A$, which are used herein refers to a median of $MA_A$ and $ML_A$. Furthermore, a subset of the cathode structure population has a median cross-sectional area, as measured either according to $MA_C$, which as used herein refers to a median of cross-sectional areas for more than one cathode member, and/or according to $ML_C$, which as used herein refers to a median of cross-sectional areas at different longitudinal planes long a cathode member, and/or according to $MO_C$, which are used herein refers to a median of $MA_C$ and $ML_C$. Further description of these measures are as follows.

According to one embodiment, a subset of the anode structure population has a median cross-sectional area $MA_A$, and a subset of the cathode structure population has a median cross-sectional area $MA_C$, where $MA_A$ and $MA_C$ are the medians of the cross-sectional areas A and C for members of the population of anode structures and cathode structures respectively, as measured across a subset of the anode and/or cathode structure population. That is, $MA_A$ can be understood as the median cross-section as measured in the first longitudinal plane 113 for a subset of members of the population of anode structures, and $MA_C$ can be understood as the median cross-section as measured in the first longitudinal plane 113 for a subset of members of the population of cathode structures. That is, to determine the median cross-sectional area $MA_A$ for the subset, the cross-sectional areas are determined for each member of the anode structure population in the subset, and then the median of the cross-sectional areas are evaluated. Similarly, to determine the median cross-sectional area $MA_C$ for the subset, the cross-sectional areas are determined for each member of the cathode structure population in the subset, and then the median of the cross-sectional areas are evaluated. In one embodiment, the median of the cross-sectional areas as measured in the first longitudinal plane are determined for a subset comprising at least two members. In another embodiment, the median of the cross-sectional areas as measured in the first longitudinal plane are determined for a subset comprising at least five members. In another embodiment, the median of the cross-sectional areas as measured in the first longitudinal plane are determined for a subset comprising at least ten members. In another embodiment, the median of the cross-sectional areas as measured in the first longitudinal plane are determined for a subset comprising at least 20 members. In another embodiment, the median of the cross-sectional areas as measured in the first longitudinal plane are determined for a subset comprising at least 50 members. For example, in one embodiment, the subset of the population can comprise from 1 to 7 members, such as from 2 to 6 members, and even from 3 to 5 members. In yet another embodiment, the subset of the population can comprise a percentage of the total number of members in the electrode assembly 106. For example, the subset can comprise at least 10% of the members in the electrode assembly, such as at least 25% of the members, and even at least 50%, such as at least 75%, and even at least 90% of the members in the electrode assembly.

In one embodiment, the subset of the population of cathode structures 112 may have a first median cross-sectional area $MA_{C1}$ in the charged state that may be the same as and/or similar to values give above for the first cross-sectional area $C_1$ of a member of the population of cathode structures in the charged state. For example, in one embodiment, the subset of the population of cathode structures 112 may have a first median cross-sectional area $MA_{C1}$ that is no more than $3 \times 10^7$ $\mu m^2$. By way of further example, in one embodiment, the subset of the population of cathode structures 112 may have a first median cross-sectional area $MA_{C1}$ in the charged state that is no more than $1 \times 10^7$ $\mu m^2$. By way of yet further example, in one embodiment the subset of the population of cathode structures 112 may have a first median cross-sectional area $MA_{C1}$ in the charged state that is no more than $9.03 \times 10^6$ $\mu m^2$. By way of yet further example, in one embodiment, the subset of the population of cathode structures 112 may have a first median cross-sectional area $MA_{C1}$ in the charged state that is no more than $8 \times 10^6$ $\mu m^2$. By way of further example, in one embodiment the subset of the population of cathode structures 112 may have a first median cross-sectional area $MA_{C1}$ in the charged state that is no more than $5 \times 10^6$ $\mu m^2$. In general, the first median cross-sectional area $MA_{C1}$ of the subset of the population of cathode structure may be at least $2 \times 102$ $\mu m^2$, for example the first median cross-sectional area $MA_{C1}$ of the subset of the population of cathode structures may be at least $2.6 \times 10^2$ $\mu m^2$, for example the first median cross-sectional area $MA_{C1}$ in the charged state may be at least $3 \times 10^2$ $\mu m^2$. For example, the first median cross-sectional area $MA_{C1}$ may be in the range of from $1 \times 10^2$ $\mu m^2$ to $3 \times 10^7$ $\mu m^2$, such as from $2.6 \times 10^2$ $\mu m^2$ to $9.03 \times 10^6$ $\mu m^2$, and even in the range of from $3 \times 10^2$ $\mu m^2$ to $8 \times 10^6$ $\mu m^2$.

Furthermore, in one embodiment, the subset of the population of cathode structures 112 may have a second median cross-sectional area $MA_{C2}$ in the discharged state that may be the same as and/or similar to values give above for the second cross-sectional area $C_2$ of a member of the population of cathode structures in the discharged state. For example, in one embodiment, the subset of the population of cathode structures 112 may have a second median cross-sectional area $MA_{C2}$ in the charged state in the discharged state that is at least $1.01 \times 10^2$ $\mu m^2$. By way of further example, in one embodiment the subset of the population of cathode structures 112 may have a second median cross-sectional area $MA_{C2}$ in the discharged state that is at least $1.05 \times 10^2$ $\mu m^2$. By way of further example, in one embodiment the subset of the population of cathode structures 112 may have a second median cross-sectional area $MA_{C2}$ in the discharged state that is at least $1.05 \times 10^3$ $\mu m^2$. By way of further example, the subset of the population of cathode structures 112 may have a second median cross-sectional area $MA_{C2}$ in the discharged state that is at least $1.1 \times 10^3$ $\mu m^2$. By way of further example, the subset of the population of cathode structures 112 may have a second median cross-sectional area $MA_{C2}$ in the discharged state that is at least $1.5 \times 10^3$ $\mu m^2$. In general, the second median cross-sectional area $MA_{C2}$ of the subset of the population of cathode structures in the discharged state will not exceed $1.5 \times 10^{10}$ $\mu m^2$, for example the second median cross-sectional area $MA_{C2}$ in the discharged state may not exceed $9.5 \times 10^6$ $\mu m^2$, and may even not exceed $1 \times 10^6$ $\mu m^2$. For example, the second median cross-sectional area $MA_{C2}$ may be in the range of from $1.01 \times 10^2$ $\mu m^2$ to $1.5 \times 10^{10}$ $\mu m^2$, such as from $1.05 \times 10^3$ $\mu m^2$ to $9.5 \times 10^6$ $\mu m^2$, and even in the range of from $1.1 \times 10^2$ $\mu m^2$ to $1 \times 10^6$ $\mu m^2$.

In yet another embodiment, the subset of the population of cathode structures 112 may have a ratio of the second median cross-sectional area $MA_{C2}$ in the discharged state to a first median cross-sectional area $MA_{C1}$ in the charged state that is the same as and/or similar to the values given above for the ratio of the second cross-sectional area $C_2$ in the discharged state to the first cross-sectional area $C_1$ in the charged state. For example, in one embodiment the subset of the population of cathode structures has a ratio of the second median cross-sectional area $MA_{C2}$ in the discharged state to a first median cross-sectional area $MA_{C1}$ in the charged state that is at least 1.05:1. By way of further example, in one embodiment the subset of the population of cathode structures has a ratio of the second median cross-sectional area $MA_{C2}$ in the discharged state to a first median cross-sectional area $MA_{C1}$ in the charged state that is at least 1.1:1. By way of further example, in one embodiment the subset of the population of cathode structures has a ratio of the second median cross-sectional area $MA_{C2}$ in the discharged state to a first median cross-sectional area $MA_{C1}$ in the charged state that is at least 1.3:1. By way of further example, in one embodiment the subset of the population of cathode structures has a ratio of the second median cross-sectional area $MA_{C2}$ in the discharged state to a first median cross-sectional area $MA_{C1}$ in the charged state that is at least 2:1. By way of further example, in one embodiment the subset of the population of cathode structures has a ratio of the second median cross-sectional area $MA_{C2}$ in the discharged state to a first median cross-sectional area $MA_{C1}$ in the charged state that is at least 3:1. By way of further example, in one embodiment the subset of the population of cathode structures has a ratio of the second median cross-sectional area $MA_{C2}$ in the discharged state to a first median cross-sectional area $MA_{C1}$ in the charged state that is at least 4:1. By way of further example, in one embodiment the subset of the population of cathode structures has a ratio of the second median cross-sectional area $MA_{C2}$ in the discharged state to a first median cross-sectional area $MA_{C1}$ in the charged state that is at least 6:1. Generally, a ratio of $MA_{C2}$ to $MA_{C1}$ for the subset will not exceed about 15:1 and will even not exceed 10:1, such as for example not exceeding 8:1. For example, the subset of the population of cathode structures has a ratio of the second median cross-sectional area $MA_{C2}$ in the discharged state to a first median cross-sectional area $MA_{C1}$ in the charged state that may be in the range of from 1.05:1 to 15:1. By way of further example, the subset of the population of cathode structures has a ratio of the second median cross-sectional area $MA_{C2}$ in the discharged state to a first median cross-sectional area $MA_{C1}$ in the charged state that may be in the range of from 1.1:1 to 6:1. By way of further example, in one embodiment the subset of the population of cathode structures has a ratio of the second median cross-sectional area $MA_{C2}$ in the discharged state to a first median cross-sectional area $MA_{C1}$ in the charged state that may be in the range of from 1.3:1 to 4:1. By way of further example, in one embodiment the contraction of the subset of the first median cross-sectional area $MA_{C1}$ with respect to the second median cross-sectional area $MA_{C2}$ may be in the range of from 2% contraction to 90% contraction, such as from 5% contraction to 75% contraction. That is, the subset of the population of cathode structures may have a first median cross-sectional area $MA_{C1}$ that is contracted by at least 2% with respect to the second median cross-sectional area $MA_{C2}$, such as at least 5% and even at least 10% with respect to the second median cross-sectional area $MA_{C2}$, but may be contracted less than 90% with respect to the second median cross-sectional area $MA_{C2}$, such as less than 80% and even less than 75% with respect to the second median cross-sectional area $MA_{C2}$.

Furthermore, in one embodiment, the subset of the population of anode structures 110 may have a first median cross-sectional area $MA_{A1}$ in the charged state that may be the same as and/or similar to values give above for the first cross-sectional area $A_1$ of a member of the population of anode structures in the charged state. For example, according to one embodiment, the subset of the population of anode structures 110 may have a first median cross-sectional area $MA_{A1}$ in the charged state that is at least 100 $\mu m^2$. By way of further example, in one embodiment the subset of the population of anode structures 110 may have a first median cross-sectional area $MA_{A1}$ in the charged state that is at least $1 \times 10^3$ $\mu m^2$. By way of yet further example, in one embodiment the subset of the population of anode structures 110 may have a first median cross-sectional area $MA_{A1}$ in the charged state that is at least $4.7 \times 10^3$ $\mu m^2$. By way of yet further example, the subset of the population of anode structures 110 may have a first median cross-sectional area $MA_{A1}$ in the charged state that is at least $6 \times 10^3$ $\mu m^2$. By way of further example, in one embodiment the subset of the population of anode structures 110 may have a first median cross-sectional area $MA_{A1}$ in the charged state that is at least $8 \times 10^3$ $\mu m^2$. In general, the first median cross-sectional area $MA_{A1}$ of the subset of the population of anode structures in the charged state may not exceed $1.5 \times 10^7$ $\mu m^2$, for example the first median cross-sectional area $MA_{A1}$ in the charged state may not exceed $6.8 \times 10^7$ $\mu m^2$, and may not even exceed $5 \times 10^6$ $\mu m^2$. For example, the first median cross-sectional area $MA_{A1}$ in the charged state may be in the range of from 100 $\mu m^2$ to $1.5 \times 10^7$ $\mu m^2$, such as from $4.7 \times 10^3$ $\mu m^2$ to $6.8 \times 10^6$ $\mu m^2$, and even in the range of from $6 \times 10^3$ $\mu m^2$ to $5 \times 10^6$ $\mu m^2$.

Furthermore, in one embodiment, the subset of the population of anode structures 110 may have a second median cross-sectional area $MA_{A2}$ in the discharged state that may be the same as and/or similar to values give above for the second cross-sectional area $A_2$ of a member of the population of anode structures in the discharged state. For example, in one embodiment, the subset of the population of anode structures 110 may have a second median cross-sectional area $MA_{A2}$ in the discharged state that is no more than $3 \times 10^7$ $\mu m^2$. By way of further example, in one embodiment the subset of the population of anode structures 110 may have a second median cross-sectional area $MA_{A2}$ in the discharged state that is no more than $1.5 \times 10^7$ $\mu m^2$. By way of further example, in one embodiment the subset of the population of anode structures 110 may have a second median cross-sectional area $MA_{A2}$ in the discharged state that is no more than $7.1 \times 10^6$ $\mu m^2$. By way of further example, in one embodiment the subset of the population of anode structures 110 may have a second median cross-sectional area $MA_{A2}$ in the discharged state that is no more than $5 \times 10^6$ $\mu m^2$. By way of further example, in one embodiment the subset of the population of anode structures 110 may have a second median cross-sectional area $MA_{A2}$ in the discharged state that is no more than $3 \times 10^6$ $\mu m^2$. In general, the second median cross-sectional area $MA_{A2}$ of the subset of the population of anode structures in the charged state will be at least $1.5 \times 10^3$ $\mu m^2$, for example the second median cross-sectional area $MA_{A2}$ in the discharged state may be at least $1.6 \times 10^3$ $\mu m^2$, and even at least $3 \times 10^3$ $\mu m^2$. For example, the second median cross-sectional area $MA_{A2}$ in the discharged state may be in the range of from 500 $\mu m^2$ to $3 \times 10^7$ $\mu m^2$, such as from $1.6 \times 10^3$ $\mu m^2$ to $7.1 \times 10^6$ $\mu m^2$, and even in the range of $3 \times 10^3$ $\mu m^2$ to $5 \times 10^6$ $\mu m^2$.

In yet another embodiment, the subset of the population of anode structures 110 may have a ratio of the first median cross-sectional area $MA_{A1}$ in the charged state to a second median cross-sectional area $MA_{A2}$ in the discharged state that is the same as and/or similar to the values given above for the ratio of the first cross-sectional area $A_1$ in the charged state to the second cross-sectional area $A_2$ in the discharged state. For example, in one embodiment the subset of the population of anode structures has a ratio of the first median cross-sectional area $MA_{A1}$ in the charged state to a second median cross-sectional area $MA_{A2}$ in the discharged state that is at least 1.01:1. By way of further example, in one embodiment the subset of the population of anode structures has a ratio of the first median cross-sectional area $MA_{A1}$ in the charged state to a second median cross-sectional area $MA_{A2}$ in the discharged state that is at least 1.05:1. By way of further example, in one embodiment the subset of the population of anode structures has a ratio of the first median cross-sectional area $MA_{A1}$ in the charged state to a second median cross-sectional area $MA_{A2}$ in the discharged state that is at least 1.5:1. By way of further example, in one embodiment the subset of the population of anode structures has a ratio of the first median cross-sectional area $MA_{A1}$ in the charged state to a second median cross-sectional area $MA_{A2}$ in the discharged state that is at least 2:1. By way of further example, in one embodiment the subset of the population of anode structures has a ratio of the first median cross-sectional area $MA_{A1}$ in the charged state to a second median cross-sectional area $MA_{A2}$ in the discharged state that is at least 3:1. By way of further example, in one embodiment the subset of the population of anode structures has a ratio of the first median cross-sectional area $MA_{A1}$ in the charged state to a second median cross-sectional area $MA_{A2}$ in the discharged state that is at least 4:1. By way of further example, in one embodiment the subset of the population of anode structures has a ratio of the first median cross-sectional area $MA_{A1}$ in the charged state to a second median cross-sectional area $MA_{A2}$ in the discharged state that is at least 5:1. For example, in one embodiment the subset of the population of anode structures has a ratio of the first median cross-sectional area $MA_{A1}$ in the charged state to a second median cross-sectional area $MA_{A2}$ in the discharged state that may be the range of from 1.01:1 to 5:1. By way of further example, in one embodiment the subset of the population of anode structures has a ratio of the first median cross-sectional area $MA_{A1}$ in the charged state to a second median cross-sectional area $MA_{A2}$ in the discharged state that may be in the range of from 1.01 to 4:1. By way of further example, in one embodiment the subset of the population of anode structures has a ratio of the first median cross-sectional area $MA_{A1}$ in the charged state to a second median cross-sectional area $MA_{A2}$ in the discharged state that may be in the range of from 1.01:1 to 3:1, and even in the range of from 1.5:1 to 3:1.

In yet another embodiment, the members of the population of anode structures can each be understood to have a length LA measured in the transverse direction, a width $W_A$ measured in the longitudinal direction, and a height $H_A$ measured in the vertical direction, as shown for example in FIG. 1A. Similarly, the members of the population of cathode structures can each be understood to have a length $L_C$ measured in the transverse direction, a width $W_C$ measured in the longitudinal direction, and a height $H_C$ measured in the vertical direction. The lengths LA and $L_C$ of the anode and cathode structure members, respectively, may be as measured from a bottom 115a of each member to a top 115b, as depicted for example in FIG. 1C, where the bottom 115a is proximate to a plane 121 from which the member extends, and the top 115b is distal to the plane 121. Furthermore, in one embodiment, the length $L_A$ and/or $L_C$ of members of the population of anode and/or cathode structures may be at least 5 times each of the width and the height of the members (e.g., the length of the member may be the longer than either the width or the height). For example, a ratio of the length L (e.g., either $L_A$ or $L_C$) of members to each of the width W (e.g., either $W_A$ or $W_C$) and the height H (e.g., either $H_A$ or $H_C$), may be at least 10:1, and even at least 15:1, such as at least 20:1.

According to one aspect, the cross-sectional area of the at least one member of the cathode and/or anode populations is measured in a first longitudinal plane that is not only parallel to the longitudinal direction, but is also orthogonal to the direction of one or more of the direction of $L_A$ and $L_C$. For example, referring to the embodiment in FIG. 1C, the first longitudinal plane 113 is depicted as being parallel with the stacking direction (longitudinal direction), while also being perpendicular to the length direction of the members of the anode and cathode structure populations, which is the X direction as depicted in the embodiment therein. For example, according to one embodiment, the first longitudinal plane may be in a Z-Y plane, where Y corresponds to an axis that is parallel to the longitudinal direction, and Z corresponds to an axis that is orthogonal to the longitudinal direction while also being orthogonal to the lengths $L_A$ and/or $L_C$ of the members of the population of anode structures and cathode structures, respectively. In yet another embodiment, the first longitudinal plane in which the cross-sectional area(s) are measured is in a plane that is less than 15 degrees away from the Z-Y plane as rotated along the Y axis (e.g., longitudinal axis). In yet another embodiment, the first longitudinal plane in which the cross-sectional area(s) are measured is in a plane that is less than 45 degrees away from the Z-Y plane as rotated along the Y axis (e.g., longitudinal axis). In yet another embodiment, the first longitudinal plane in which the cross-sectional area(s) are measured is in a plane that is greater than 45 degrees away from the Z-Y plane but less than 90 degrees from the Z-Y plane as rotated along the Y axis (e.g., longitudinal axis). In yet another embodiment, the first longitudinal plane is in an X-Y plane, where the Y-axis corresponds to an axis that the parallel to the longitudinal direction, and the X-axis corresponds to an axis that is orthogonal to the longitudinal axis, and that is also parallel to the lengths $L_A$ and/or $L_C$ of the members of the population of anode structures and cathode structures, respectively. Furthermore, in one embodiment, the position of the first longitudinal plane 113 along the length $L_A$ or $L_C$ of the anodes and/or cathodes may be selected according to the measurement to be made. For example, in one embodiment, the first longitudinal plane 113 may be positioned in the Z-Y plane about half-way along the length L of the anodes and/or cathodes (e.g., about half-way along the length in the X-direction), as depicted in FIG. 1C. In another embodiment, the first longitudinal plane may be positioned in the Z-Y plane closer to an end of one or more of the cathode and/or anode structures (e.g., closer to the base or top of the anodes and/or cathodes in the X-direction). In yet another embodiment, cross-sectional areas can be measured in a plurality of longitudinal planes 113a, 113b that are parallel to the longitudinal direction.

According to yet another embodiment, at least one member of a subset of the anode structure population can have a median cross-sectional area $ML_A$ that is the median for the member of a plurality of cross-sectional areas A as measured in a plurality of planes parallel to the longitudinal direction for that member. Similarly, at least one member of a subset of the cathode population can have a median cross-sectional area $ML_C$ that is the median for the member of a plurality of cross-sectional areas C as measured in a plurality of planes parallel to the longitudinal direction for that member. For example, referring to FIG. 1C, the cross-sections A for a member of the population of anode structures may be measured in a plurality of planes 113a,b parallel to the longitudinal direction for that member, such as for example the first longitudinal plane 113 and one or more planes 113a,b. In one embodiment, the one or more other planes 113a,b are planes that are parallel to the first longitudinal plane 113, and may be located at different positions along the length of the anodes (e.g., at different positions on the X-axis). The median cross-sectional area $ML_A$ may thus be calculated as the median of the cross-sections A measured in each longitudinal plane for the member of the population of anode structures. Similarly, the cross-sections C for a member of the population of cathode structures may be measured in a plurality of planes 113a,b parallel to the longitudinal direction for that member, such as for example the first longitudinal plane 113 and one or more planes 113a,b. In one embodiment, the one or more other planes 113a,b are planes that are parallel to the first longitudinal plane 113, and may be located at different positions along the length of the cathodes (e.g., at different positions on the X-axis). The median cross-sectional are $ML_C$ may thus be calculated as the median of the cross-sections C measured in each longitudinal plane for the member of the population of cathode structures.

In one embodiment, the median cross-sectional areas $ML_A$ and $ML_C$ are the median cross-sectional areas of the cross-sectional areas as measured in at least two longitudinal planes for the anode and cathode structure population subsets, respectively. In one embodiment, the median cross-sectional areas $ML_A$ and $ML_C$ are the median cross-sectional areas of the cross-sectional areas as measured in at least three longitudinal planes for the anode and cathode structure population subsets, respectively. In one embodiment, the median cross-sectional areas $ML_A$ and $ML_C$ are the median cross-sectional areas of the cross-sectional areas as measured in at least five longitudinal planes for the anode and cathode structure population subsets, respectively. In one embodiment, the median cross-sectional areas $ML_A$ and $ML_C$ are the median cross-sectional areas of the cross-sectional areas as measured in at least ten longitudinal planes for the anode and cathode structure population subsets, respectively. Furthermore, in one embodiment, the median cross-sectional areas $M_{LA}$ and $M_{LC}$ may be the median of cross-sectional areas as measured in at least two longitudinal planes that are distanced apart from each other by a predetermined length. For example, in one embodiment, the median cross-sectional areas $M_{LA}$ and $M_{LC}$ are the median of cross-sectional areas as measured for a member in at least two longitudinal planes that are spaced apart from one another by at least 10% of the length $L_A$ and/or $L_C$ of the members (e.g., spaced apart along the X-axis). As another example, in one embodiment, the median cross-sectional areas $M_{LA}$ and $M_{LC}$ are the median of cross-sectional areas as measured for a member in at least two longitudinal planes that are spaced apart from one another by at least 15% of the length $L_A$ and/or $L_C$ of the members (e.g., spaced apart along the X-axis). As another example, in one embodiment, the median cross-sectional areas $M_{LA}$ and $M_{LC}$ are the median of cross-sectional areas as measured for a member in at least two longitudinal planes that are spaced apart from one another by at least 20% of the length $L_A$ and/or $L_C$ of the members (e.g., spaced apart along the X-axis). For example, in one embodiment, the median cross-sectional areas $M_{LA}$ and $M_{LC}$ are the median of cross-sectional areas as measured for a member in at least two longitudinal planes that are spaced apart from one another by at least 25% of the length $L_A$ and/or $L_C$ of the members (e.g., spaced apart along the X-axis). As another example, in one embodiment, the median cross-sectional areas $M_{LA}$ and $M_{LC}$ are the median of cross-sectional areas as measured for a member in at least two longitudinal planes that are spaced apart from one another by at least 30% of the length $L_A$ and/or $L_C$ of the members (e.g., spaced apart along the X-axis). As another example, in one embodiment, the median cross-sectional areas $M_{LA}$ and $M_{LC}$ are the median of cross-sectional areas as measured for a member in at least two longitudinal planes that are spaced apart from one another by at least 50% of the length $L_A$ and/or $L_C$ of the members (e.g., spaced apart along the X-axis). As another example, in one embodiment, the median cross-sectional areas $M_{LA}$ and $M_{LC}$ are the median of cross-sectional areas as measured for a member in at least two longitudinal planes that are spaced apart from one another by at least 75% of the length $L_A$ and/or $L_C$ of the members (e.g., spaced apart along the X-axis).

Accordingly, in one embodiment, at least one member of the anode structure population subset may have a first median cross-sectional area $ML_{A1}$ when the secondary battery is in the charged state, and a second median cross-sectional area $ML_{A2}$ when the secondary battery is in the discharged state, and similarly at least one member of the cathode structure population subset may have a first median cross-sectional area $ML_{C1}$ when the secondary battery is in the charged state, and a second median cross-sectional area $ML_{C2}$ when the secondary battery is in the discharged state, where $ML_{A1}$ is greater than $ML_{A2}$ for each of the members of the subset of the anode structure population, and $ML_{C1}$ is less than $ML_{C2}$ for each of the members of the subset of the cathode population.

In one embodiment, at least one member of the subset of the population of cathode structures 112 may have a first median cross-sectional area $ML_{C1}$ in the charged state that may be the same as and/or similar to values given above for the first cross-sectional area $C_1$ of a member of the population of cathode structures in the charged state. For example, in one embodiment, the at least one member of the subset of the population of cathode structures 112 may have a first median cross-sectional area $ML_{C1}$ in the charged state that is no more than $3\times10^7$ μm². By way of further example, in one embodiment, the at least one member of the subset of the population of cathode structures 112 may have a first median cross-sectional area $ML_{C1}$ in the charged state that is no more than $1\times10^7$ μm². By way of yet further example, in one embodiment the at least one member of the subset of the population of cathode structures 112 may have a first median cross-sectional area $ML_{C1}$ in the charged state that is no more than $9.03\times10^6$ μm². By way of yet further example, in one embodiment, the at least one member of the subset of the population of cathode structures 112 may have a first median cross-sectional area $ML_{C1}$ in the charged state that no more than $8\times10^6$ μm². By way of further example, in one embodiment the at least one member of the subset of the population of cathode structures 112 may have a first median cross-sectional area $ML_{C1}$ in the charged state that is no more than $5\times10^6$ μm². In general, the first median cross-sectional area $ML_{C1}$ of the at least one member of the subset of the population of cathode structures may be at least $2\times10^2$ μm², for example the first median cross-sectional area $ML_{C1}$ in the charged state may be at least $2.6\times10^2$ μm², and even at least $3\times10^2$ μm². For example, the first median cross-sectional area $ML_{C1}$ in the charged state may be in the range of from $1\times10^2$ μm² to $3\times10^7$ μm², such as from $2.6\times10^2$ μm² to $9.03\times10^6$ μm², and even in the range of from $3\times10^2$ μm² to $8\times10^6$ μm².

Furthermore, in one embodiment, at least one member of the subset of the population of cathode structures 112 may have a second median cross-sectional area $ML_{C2}$ in the discharged state that may be the same as and/or similar to values give above for the second cross-sectional area $C_2$ of a member of the population of cathode structures in the discharged state. For example, in one embodiment, at least one member of the subset of the population of cathode structures 112 may have a second median cross-sectional area $ML_{C2}$ in the discharged state that is at least $1.01\times10^2$ μm². By way of further example, in one embodiment the at least one member of the subset of the population of cathode structures 112 may have a second median cross-sectional area $ML_{C2}$ in the discharged state that is at least $1.05\times10^2$ μm². By way of further example, in one embodiment the at least one member of the subset of the population of cathode structures 112 may have a second median cross-sectional area $ML_{C2}$ in the discharged state that is at least $1.05\times10^3$ μm². By way of further example, the at least one member of the subset of the population of cathode structures 112 may have a second median cross-sectional area $ML_{C2}$ in the discharged state that is at least $1.1\times10^3$ μm². By way of further example, in one embodiment the at least one member of the subset of the population of cathode structures 112 may have a second median cross-sectional area $ML_{C2}$ in the discharged state that is at least $1.5\times10^3$ μm². In general, the second median cross-sectional area $ML_{C2}$ of the at least one member of the subset of the population of cathode structures in the discharged state will not exceed $1.5\times10^{10}$ μm², for example the second median cross-sectional area $MA_{C2}$ in the discharged state of the at least one member may not exceed $9.5\times10^6$ μm², and even may not exceed $1\times10^6$ μm². For example, the second median cross-sectional area $ML_{C2}$ may be in the range of from $1.01\times10^2$ μm² to $1.5\times10^{10}$ μm², such as from $1.05\times10^3$ μm² to $9.5\times10^6$ μm², and even in the range of from $1.1\times10^2$ μm² to $1\times10^6$ μm².

In yet another embodiment, at least one member of the subset of the population of cathode structures 112 may have a ratio of the second median cross-sectional area $ML_{C2}$ in the discharged state to a first median cross-sectional area $ML_{C1}$ in the charged state that is the same as and/or similar to the values given above for the ratio of the second cross-sectional area $C_2$ in the discharged state to the first cross-sectional area $C_1$ in the charged state. For example, in one embodiment at least one member of the subset of the population of cathode structures has a ratio of the second median cross-sectional area $ML_{C2}$ in the discharged state to a first median cross-sectional area $ML_{C1}$ in the charged state that is at least 1.05:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that is at least 1.1:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that is at least 1.3:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that is at least 2:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that is at least 3:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that is at least 4:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that is at least 6:1. Generally, the ratio of the second median cross-sectional area $ML_{C2}$ to the first median cross-sectional area $ML_{C1}$ will not exceed about 15:1, and even will not exceed 10:1, such as for example may not exceed 8:1. For example, the at least one member of the subset of the population of cathode structures may have a ratio of the second median cross-sectional area $ML_{C2}$ in the discharged state to a first median cross-sectional area $ML_{C1}$ in the charged state that may be in the range of from 1.05:1 to 15:1. By way of further example, the at least one member of the subset of the population of cathode structures has a ratio of the second median cross-sectional area $ML_{C2}$ in the discharged state to a first median cross-sectional area $ML_{C1}$ in the charged state that may be in the range of from 1.1:1 to 6:1. By way of further example, in one embodiment the at least one member of the subset of the population of cathode structures has a ratio of the second median cross-sectional area $ML_{C2}$ in the discharged state to a first median cross-sectional area $ML_{C1}$ in the charged state that may be in the range of from 1.3:1 to 4:1. Furthermore, in one embodiment, the contraction of the first median cross-sectional area $ML_{C1}$ with respect to the second median cross-sectional area $ML_{C2}$ may be in the range of from 2% contraction to 90% contraction, such as from 5% contraction to 75% contraction, and even from 10% contraction to 70% contraction. That is, the first median cross-sectional area $ML_{C1}$ may be contracted by at least 2% with respect to the median cross-sectional area $ML_{C2}$, such as at least 5% and even at least 10%, with respect to $ML_{C2}$, but may be contracted less than 90% with respect to $ML_{C2}$, such as less than 80% and even less than 75% with respect to $ML_{C2}$, such as less than 70% with respect to $ML_{C2}$.

Furthermore, in one embodiment, at least one member of the subset of the population of anode structures 110 may have a first median cross-sectional area $ML_{A1}$ in the charged state that may be the same as and/or similar to values give above for the first cross-sectional area $A_1$ of a member of the population of anode structures in the charged state. For example, in one embodiment, the at least one member of the subset of the population of anode structures 110 may have a first median cross-sectional area $ML_{A1}$ in the charged state that is at least 100 $\mu m^2$. By way of further example, in one embodiment the at least one member of the subset of the population of anode structures 110 may have a first median cross-sectional area $ML_{A1}$ in the charged state that is at least $1 \times 10^3$ $\mu m^2$. By way of yet further example, in one embodiment the at least one member of the subset of the population of anode structures 110 may have a first median cross-sectional area $ML_{A1}$ in the charged state that is at least $4.7 \times 10^3$ $\mu m^2$. By way of yet further example, the at least one member of the subset of the population of anode structures 110 may have a first median cross-sectional area $ML_{A1}$ in the charged state that is at least $6 \times 10^3$ $\mu m^2$. By way of further example, in one embodiment the at least one member of the subset of the population of anode structures 110 may have a first median cross-sectional area $ML_{A1}$ in the charged state that is at least $8 \times 10^3$ $\mu m^2$. In general, the first median cross-sectional area $ML_{A1}$ of the at least one member of the subset of the population of anode structures in the charged state may not exceed $1.5 \times 10^7$ $\mu m^2$, for example the first median cross-sectional area $ML_{A1}$ in the charged state of the at least one member may not exceed $6.8 \times 10^7$ $\mu m^2$, and may not even exceed $5 \times 10^6$ $\mu m^2$. For example, the first median cross-sectional area $ML_{A1}$ of the at least one member of the subset of the population of anode structures may be in the range of from 100 $\mu m^2$ to $1.5 \times 10^7$ $\mu m^2$, such as from $4.7 \times 10^3$ $\mu m^2$ to $6.8 \times 10^6$ $\mu m^2$, and even in the range of from $6 \times 10^3$ $\mu m^2$ to $5 \times 10^6$ $\mu m^2$.

Furthermore, in one embodiment, at least one member of the subset of the population of anode structures 110 may have a second median cross-sectional area $ML_{A2}$ in the discharged state that may be the same as and/or similar to values give above for the first cross-sectional area $A_2$ of a member of the population of anode structures in the charged state. For example, the at least one member of the subset of the population of anode structures 110 may have a second median cross-sectional area $ML_{A2}$ in the discharged state that is not more than $3 \times 10^7$ $\mu m^2$. By way of further example, in one embodiment the at least one member of the subset of the population of anode structures 110 may have a second median cross-sectional area $ML_{A2}$ in the discharged state that is not more than $1.5 \times 10^7$ $\mu m^2$. By way of further example, in one embodiment the at least one member of the subset of the population of anode structures 110 may have a second median cross-sectional area $ML_{A2}$ in the discharged state that is not more than $7.1 \times 10^6$ $\mu m^2$. By way of further example, in one embodiment the at least one member of the subset of the population of anode structures 110 may have a second median cross-sectional area $ML_{A2}$ in the discharged state that is not more than $5 \times 10^6$ $\mu m^2$. By way of further example, in one embodiment the at least one member of the subset of the population of anode structures 110 may have a second median cross-sectional area $ML_{A2}$ in the discharged state that is not more than $3 \times 10^6$ $\mu m^2$. In general, the second median cross-sectional area $ML_{A2}$ of the at least one member of the subset of the population of anode structures in the charged state will be at least $1.5 \times 10^3$ $\mu m^2$, for example the second median cross-sectional area $ML_{A2}$ of the at least one member in the discharged state may be at least $1.6 \times 10^3$ $\mu m^2$, and even at least $3 \times 10^3$ $\mu m^2$. For example, the second median cross-sectional area $ML_{A2}$ in the discharged state may be in the range of from 500 $\mu m^2$ to $3 \times 10^7$ $\mu m^2$, such as from $1.6\times10^3$ µm² to $7.1\times10^6$ µm², and even in the range of from $3\times10^3$ µm² to $5\times10^6$ µm².

In yet another embodiment, at least one member of the subset of the population of anode structures 110 may have a ratio of the first median cross-sectional area $ML_{A1}$ in the charged state to a second median cross-sectional area $ML_{A2}$ in the discharged state that is the same as and/or similar to the values given above for the ratio of the first cross-sectional area $A_1$ in the charged state to the second cross-sectional area $A_2$ in the discharged state. For example, in one embodiment the at least one member of the subset of the population of anode structures has a ratio of the first median cross-sectional area $ML_{A1}$ in the charged state to a second median cross-sectional area $ML_{A2}$ in the discharged state that is at least 1.01:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that is at least 1.05:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that is at least 1.5:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that is at least 2:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that is at least 3:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that is at least 4:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that is at least 5:1. For example, in one embodiment the at least one member of the subset of the population of anode structures has a ratio of the first median cross-sectional area $ML_{A1}$ in the charged state to a second median cross-sectional area $ML_{A2}$ in the discharged state that may be the range of from 1.01:1 to 5:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that may be in the range of from 1.01:1 to 4:1. By way of further example, in one embodiment the at least one member of the subset of the population of anode structures has a ratio of the first median cross-sectional area $ML_{A1}$ in the charged state to a second median cross-sectional area $ML_{A2}$ in the discharged state that may be in the range of from 1.01:1 to 3:1, and even in the range of from 1.5:1 to 3:1.

According to yet another embodiment, a median cross-sectional area $MO_A$ and/or $MO_C$ can be measured for a subset of the anode structure population and/or cathode structure population, respectively, by evaluating the median of the cross-sectional areas as measured in a plurality of longitudinal planes for each member (e.g., the $ML_A$ and/or $ML_C$), and then taking the median of this value as measured for a subset, such as at least two members, of the anode structure population or the anode structure population. That is, the $MO_A$ and/or $MO_C$ may be understood as an "overall" median of the cross-sectional areas as measured in a plurality of longitudinal planes, and across multiple anodes and/or cathodes. The subset of the anodes and/or cathodes across which the median is evaluated to obtain the $MO_A$ and/or $MO_C$ may correspond to any of the subsets described above. Similarly to the $MA_A$, $ML_A$, $MA_C$ and $ML_C$ values above, a subset of the population of anode structures has a first median cross-sectional area $MO_{A1}$ when the secondary battery is in a charged state, and a second median cross-sectional area $MO_{A2}$ when the secondary battery is in the discharged state, and a subset of the population of cathode structures has a first median cross-sectional area $MO_{C1}$ when the secondary battery is in a charged state, and a second median cross-sectional area $MO_{C2}$ when the secondary battery is in the discharged state, where $MO_{A1}$ is greater than $MO_{A2}$, and $MO_{C1}$ is less than $MO_{C2}$.

In one embodiment, the subset of the population of cathode structures 112 may have a first median cross-sectional area $MO_{C1}$ in the charged state that may be the same as and/or similar to values give above for the first cross-sectional area $C_1$ of a member of the population of cathode structures in the charged state. For example, in one embodiment, the subset of the population of cathode structures 112 may have a first median cross-sectional area $MO_{C1}$ in the charged state that is not more than $3\times10^7$ µm². By way of further example, in one embodiment, the subset of the population of cathode structures 112 may have a first median cross-sectional area $MO_{C1}$ in the charged state that is not more than $1\times10^7$ µm². By way of yet further example, in one embodiment the subset of the population of cathode structures 112 may have a first median cross-sectional area $MO_{C1}$ in the charged state that is not more than $9.3\times10^6$ µm². By way of yet further example, in one embodiment, the subset of the population of cathode structures 112 may have a first median cross-sectional area $MO_{C1}$ in the charged state that is not more than $8\times10^6$ µm². By way of further example, in one embodiment the subset of the population of cathode structures 112 may have a first median cross-sectional area $MO_{C1}$ in the charged state that is not more than $5\times10^6$ µm². In general, the first median cross-sectional area $MO_{C1}$ of the subset of the population of cathode structure may be at least $2.0\lambda10^6$ µm², for example the first median cross-sectional area $MO_{C1}$ in the charged state may be at least $2.6\times10^2$ µm², and even at least $5\times10^2$ µm². For example, the first median cross-sectional area $MO_{C1}$ of the subset of the population of cathode structures may be in the range of from $1\times10^2$ µm² to $3\times10^7$ µm², such as from $2.6\times10^2$ µm² to $9.03\times10^6$ µm², and even in the range of from $3\times10^2$ µm² to $8\times10^6$ µm².

Furthermore, in one embodiment, the subset of the population of cathode structures 112 may have a second median cross-sectional area $MO_{C2}$ in the discharged state that may be the same as and/or similar to values give above for the second cross-sectional area $C_2$ of a member of the population of cathode structures in the discharged state. For example, in one embodiment, the subset of the population of cathode structures 112 may have a second median cross-sectional area $MO_{C2}$ in the charged state in the discharged state that is at least $1.01\times10^2$ µm². By way of further example, in one embodiment the subset of the population of cathode structures 112 may have a second median cross-sectional area $MO_{C2}$ in the discharged state that is at least $1.05\times10^2$ µm². By way of further example, in one embodiment the subset of the population of cathode structures 112 may have a second median cross-sectional area $MO_{C2}$ in the discharged state that is at least $1.05 \times 10^3$ µm². By way of further example, the subset of the population of cathode structures 112 may have a second median cross-sectional area $MO_{C2}$ in the discharged state that is at least $1.1 \times 10^3$ µm². By way of further example, in one embodiment the subset of the population of cathode structures 112 may have a second median cross-sectional area $MO_{C2}$ in the discharged state that is at least $1.5 \times 10^3$ µm². In general, the second median cross-sectional area $MO_{C2}$ of the subset of the population of cathode structures in the discharged state will not exceed $1.5 \times 10^{10}$ µm², for example the second median cross-sectional area $MO_{C2}$ in the discharged state may not exceed $9.5 \times 10^6$ µm², and may even not exceed $1 \times 10^6$ µm². For example, the second median cross-sectional area $MO_{C2}$ of the subset of the population of cathode structures in the discharged state may be in the range of from $1.01 \times 10^2$ µm² to $1.5 \times 10^{10}$ µm², such as from $1.05 \times 10^3$ µm² to $9.5 \times 10^6$ µm², and even in the range of from $1.1 \times 10^2$ µm² to $1 \times 10^6$ µm².

In yet another embodiment, in one embodiment the subset of the population of cathode structures 112 may have a ratio of the second median cross-sectional area $MO_{C2}$ in the discharged state to a first median cross-sectional area $MO_{C1}$ in the charged state that may be the same as and/or similar to values give above for the ratio of the second cross-sectional area $C_2$ of a member of the population of cathode structures in the discharged state to the first cross-sectional area C1 of the member of the population of cathode structures in the charged state. For example, in one embodiment, the subset of the population of cathode structures has a ratio of the second median cross-sectional area $MO_{C2}$ in the discharged state to a first median cross-sectional area $MO_{C1}$ in the charged state that is at least 1.05:1. By way of further example, in one embodiment the subset of the population of cathode structures has a ratio of the second median cross-sectional area $MO_{C2}$ in the discharged state to a first median cross-sectional area $MO_{C1}$ in the charged state that is at least 1.1:1. By way of further example, in one embodiment the subset of the population of cathode structures has a ratio of the second median cross-sectional area $MO_{C2}$ in the discharged state to a first median cross-sectional area $MO_{C1}$ in the charged state that is at least 1.3:1. By way of further example, in one embodiment the subset of the population of cathode structures has a ratio of the second median cross-sectional area $MO_{C2}$ in the discharged state to a first median cross-sectional area $MO_{C1}$ in the charged state that is at least 2:1. By way of further example, in one embodiment the subset of the population of cathode structures has a ratio of the second median cross-sectional area $MO_{C2}$ in the discharged state to a first median cross-sectional area $MO_{C1}$ in the charged state that is at least 3:1. By way of further example, in one embodiment the subset of the population of cathode structures has a ratio of the second median cross-sectional area $MO_{C2}$ in the discharged state to a first median cross-sectional area $MO_{C1}$ in the charged state that is at least 4:1. By way of further example, in one embodiment the subset of the population of cathode structures has a ratio of the second median cross-sectional area $MO_{C2}$ in the discharged state to a first median cross-sectional area $MO_{C1}$ in the charged state that is at least 6:1. Generally, the ratio of the second median cross-sectional area $MO_{C2}$ to the first median cross-sectional area $MO_{C1}$ will not exceed about 15:1, and will not even exceed 10:1, and may not exceed for example 8:1. For example, the subset of the population of cathode structures has a ratio of the second median cross-sectional area $MO_{C2}$ in the discharged state to a first median cross-sectional area $MO_{C1}$ in the charged state that may be in the range of from 1.05:1 to 6:1. By way of further example, the subset of the population of cathode structures has a ratio of the second median cross-sectional area $MO_{C2}$ in the discharged state to a first median cross-sectional area $MO_{C1}$ in the charged state that may be in the range of from 1.1:1 to 4:1. By way of further example, the subset of the population of cathode structures has a ratio of the second median cross-sectional area $MO_{C2}$ in the discharged state to a first median cross-sectional area $MO_{C1}$ in the charged state that may be in the range of from 1.3:1 to 4:1. Furthermore, in one embodiment, the contraction of the first median cross-sectional area $MO_{C1}$ with respect to the second median cross-sectional area $MO_{C2}$ may be in the range of from 2% contraction to 90% contraction, such as from 5% contraction to 75% contraction, and even from 10% contraction to 70% contraction. That is, the first median cross-sectional area $MO_{C1}$ may be contracted by at least 2% with respect to the median cross-sectional area $MO_{C2}$, such as at least 5% and even at least 10%, with respect to $MO_{C2}$, but may be contracted less than 90% with respect to $MO_{C2}$, such as less than 80% and even less than 75% with respect to $MO_{C2}$, such as less than 70% with respect to $MO_{C2}$.

Furthermore, in one embodiment, the subset of the population of anode structures 110 may have a first median cross-sectional area $MO_{A1}$ in the charged state that may be the same as and/or similar to values give above for the first cross-sectional area $A_1$ of a member of the population of anode structures in the charged state. For example, in one embodiment, the subset of the population of anode structures 110 may have a first median cross-sectional area $MO_{A1}$ in the charged state that is greater than 100. By way of further example, in one embodiment the subset of the population of anode structures 110 may have a first median cross-sectional area $MO_{A1}$ in the charged state that is at least 100 µm². By way of yet further example, in one embodiment the subset of the population of anode structures 110 may have a first median cross-sectional area $MO_{A1}$ in the charged state that is at least $1 \times 10^3$ µm². By way of yet further example, the subset of the population of anode structures 110 may have a first median cross-sectional area $MO_{A1}$ in the charged state that is at least $4.7 \times 10^3$ µm². By way of further example, in one embodiment the subset of the population of anode structures 110 may have a first median cross-sectional area $MO_{A1}$ in the charged state that is at least $6 \times 10^3$ µm². By way of further example, in one embodiment the subset of the population of anode structures 110 may have a first median cross-sectional area $MO_{A1}$ in the charged state that is at least $8 \times 10^3$ µm². In general, the first median cross-sectional area $MO_{A1}$ of the subset of the population of anode structures in the charged state may not exceed $1.5 \times 10^7$ µm², for example the first median cross-sectional area $MO_{A1}$ in the charged state may not exceed $6.8 \times 10^7$ µm², and may even not exceed $5 \times 10^6$ µm². For example, the first median cross-sectional area $MO_{A1}$ in the charged state may be in the range of from 100 µm² to $1.5 \times 10^7$ µm², such as from $4.7 \times 10^3$ µm² to $6.8 \times 10^6$ µm², and may even be in the range of from $6 \times 10^3$ µm² to $5 \times 10^6$ µm².

Furthermore, in one embodiment, the subset of the population of anode structures 110 may have a second median cross-sectional area $MO_{A2}$ in the discharged state that may be the same as and/or similar to values give above for the second cross-sectional area $A_2$ of a member of the population of anode structures in the discharged state. For example, in one embodiment, the subset of the population of anode structures 110 may have a second median cross-sectional area $MO_{A2}$ in the discharged state that is no more than $3.3×10^7$ µm². By way of further example, in one embodiment the subset of the population of anode structures 110 may have a second median cross-sectional area $MO_{A2}$ in the discharged state that is no more than $1.5×10^7$ µm². By way of further example, in one embodiment the subset of the population of anode structures 110 may have a second median cross-sectional area $MO_{A2}$ in the discharged state that is no more than $7.1×10^6$ µm². By way of further example, in one embodiment the subset of the population of anode structures 110 may have a second median cross-sectional area $MO_{A2}$ in the discharged state that is no more than $5×10^6$ µm². By way of further example, in one embodiment the subset of the population of anode structures 110 may have a second median cross-sectional area $MO_{A2}$ in the discharged state that is no more than $3×10^6$ µm². In general, the second median cross-sectional area $MO_{A2}$ of the subset of the population of anode structures in the charged state will be at least $1.5×10^3$ µm², for example the second median cross-sectional area $MO_{A2}$ in the discharged state may be at least $1.6×10^3$ µm², and even at least $3×10^3$ µm². For example, the second median cross-sectional area $MO_{A2}$ of the subset of the population of anode structures in the charged state may be in the range of from 500 µm² to $3×10^7$ µm², such as from $1.6×10^3$ µm² to $7.1×10^6$ µm², and even in the range of from $3×10^3$ µm² to $5×10^6$ µm².

In yet another embodiment, the subset of the population of anode structures 110 may have a ratio of the first median cross-sectional area $MO_{A1}$ in the charged state to a second median cross-sectional area $MO_{A2}$ in the discharged state that may be the same as and/or similar to values give above for the ratio of the first cross-sectional area $A_1$ of a member of the population of anode structures in the charged state to the second cross-sectional area $A_2$ of the member of the population of anode structures in the discharged state. For example, in one embodiment the subset of the population of anode structures has a ratio of the first median cross-sectional area $MO_{A1}$ in the charged state to a second median cross-sectional area $MO_{A2}$ in the discharged state that is at least 1.01:1. By way of further example, in one embodiment the subset of the population of anode structures has a ratio of the first median cross-sectional area $MO_{A1}$ in the charged state to a second median cross-sectional area $MO_{A2}$ in the discharged state that is at least 1.05:1. By way of further example, in one embodiment the subset of the population of anode structures has a ratio of the first median cross-sectional area $MO_{A1}$ in the charged state to a second median cross-sectional area $MO_{A2}$ in the discharged state that is at least 1.5:1. By way of further example, in one embodiment the subset of the population of anode structures has a ratio of the first median cross-sectional area $MO_{A1}$ in the charged state to a second median cross-sectional area $MO_{A2}$ in the discharged state that is at least 2:1. By way of further example, in one embodiment the subset of the population of anode structures has a ratio of the first median cross-sectional area $MO_{A1}$ in the charged state to a second median cross-sectional area $MO_{A2}$ in the discharged state that is at least 3:1. By way of further example, in one embodiment the subset of the population of anode structures has a ratio of the first median cross-sectional area $MO_{A1}$ in the charged state to a second median cross-sectional area $MO_{A2}$ in the discharged state that is at least 4:1. By way of further example, in one embodiment the subset of the population of anode structures has a ratio of the first median cross-sectional area $MO_{A1}$ in the charged state to a second median cross-sectional area $MO_{A2}$ in the discharged state that is at least 5:1. For example, in one embodiment the subset of the population of anode structures has a ratio of the first median cross-sectional area $MO_{A1}$ in the charged state to a second median cross-sectional area $MO_{A2}$ in the discharged state that may be the range of from 1.01 to 4:1. By way of further example, in one embodiment the subset of the population of anode structures has a ratio of the first median cross-sectional area $MO_{A1}$ in the charged state to a second median cross-sectional area $MO_{A2}$ in the discharged state that may be in the range of from 1.01:1 to 3:1, and even in the range of from 1.5:1 to 3:1.

In yet another embodiment, the change in size of the member of the anode and/or cathode structure population that can occur upon charging and/or discharging of the secondary battery is reflected in the change in width of a subset of one or more of the anode and cathode structure population. As has also similarly been discussed above, a subset of the population of anode structures may have a first width $W_{A1}$ when the secondary battery is in the charged state, and a second width $W_{A2}$ when the secondary battery is in the discharged state, and a subset of the population of cathode structures may have a first width $W_{C1}$ when the secondary battery is in the charged state, and a second width $W_{C2}$ when the secondary battery is in the discharged state, where $W_{A1}$ is greater than $W_{A2}$ and $W_{C1}$ is less than $W_{C2}$. In one embodiment, the widths $W_A$ and $W_C$ are measured by measuring the distance between points on a line that is formed by bisection of the first longitudinal plane 113 with an orthogonal X-Y plane 123, where the Y-axis is parallel to the longitudinal direction, and the X-axis is parallel to a direction of the lengths $L_A$ and $L_C$ of the member of the anode and cathode structure populations, respectively. For example, referring to FIG. 1D, the widths may be measured along the line that forms from the bisection of the longitudinal plane 113 with an X-Y plane 123, from a first point 125a on the first side of the member, to a second point 125b on the same line on the second side of the member. In one embodiment, the X-Y plane 123 may be located at a midpoint of the height $H_A$ or $H_C$ of one or more of the members of the anode and/or cathode structure populations, where the height is measured in a direction orthogonal to both the longitudinal direction and the direction of the lengths $L_A$ and $L_C$ of the members of the anode and/or cathode structure populations. In another embodiment, the X-Y plane is located at a position along the height of the electrodes (e.g., $H_A$ and/or $H_C$) that is anywhere from 25% to 75% of the total height H of members of the cathode and/or anode structure populations. Alternatively and/or additionally, the width of the member of the anode structure and/or cathode structure population may correspond to the Feret diameter of the member as measured in the width direction (e.g., along the longitudinal axis) of the member, where the Feret diameter is the distance between two parallel planes restricting the member in the width direction, as measured in a direction parallel to the two planes.

Accordingly, in one embodiment, a subset of the population of cathode structures 112 have a first width $W_{C1}$ in the charged state that is no more than 5000 µm. By way of further example, in one embodiment a subset of the members of the population of cathode structures have a first width $W_{C1}$ in the charged state that is no more than 3000 µm. By way of yet further example, in one embodiment a subset of the members of the population of cathode structures have a first width $W_{C1}$ in the charged state that is less than $1.9×10^3$ µm. By way of yet further example, in one embodiment a subset of the members of the population of cathode structures have a first width $W_{C1}$ in the charged state that is no more than 1000 µm. By way of further example, in one embodiment a subset of the members of the population of cathode structures have a first width $W_{C1}$ in the charged state that is no more than 500 µm. Generally, the first width $W_{C1}$ in the charged state will be at least 2 µm, such as at least 5 µm, and even at least 15 µm. For example, in one embodiment, a subset of members of the population of cathode structures may have a first width $W_{C1}$ in the charged state that may be in the range of from 2 µm to 5000 µm, such as from 5 µm to 1900 µm, and even from 15 µm to 1000 µm.

In one embodiment, a subset of the members of the population of cathode structures have a second width $W_{C2}$ in the discharged state that is at least 5 µm. By way of further example, in one embodiment a subset of the members of the population of cathode structures have a second width $W_{C2}$ in the discharged state that is at least 10 µm. By way of further example, in one embodiment a subset of the members of the population of cathode structures have a second width $W_{C2}$ in the discharged state that is at least 20 µm. By way of further example, in one embodiment a subset of the members of the population of cathode structures have a second width $W_{C2}$ in the discharged state that is at least 50 µm. By way of further example, in one embodiment a subset of the members of the population of cathode structures have a second width $W_{C2}$ in the discharged state that is at least 100 µm. Generally, the second width $W_{C2}$ in the discharged state will be less than 5,000 µm, such as less than 2,000 µm and even less than 1000 µm. For example, in one embodiment, a subset of members of the population of cathode structures 112 have a second width $W_{C2}$ in the discharged state that is in the range of from 5 µm to 5,000 µm, such as from 20 µm to 2,000 µm, and even from 50 µm to 1000 µm.

In yet another embodiment, in one embodiment a ratio of the second width $W_{C2}$ of the cathode structure 112 in the discharged state to a first width $W_{C1}$ of the cathode structure 112 in the charged state for a subset of the population is at least 1.05:1. By way of further example, in one embodiment a ratio of the second width $W_{C2}$ of the cathode structure 112 to the first width $W_{C1}$ of the cathode structure 112 for a subset of the population is at least 1.1:1. By way of further example, in one embodiment a ratio of the second width $W_{C2}$ of the cathode structure 112 to the first width $W_{C2}$ of the cathode structure 112 for a subset of the population is at least 1.3:1. By way of further example, in one embodiment a ratio of the second width $W_{C2}$ of the cathode structure 112 to the first width $W_{C2}$ of the cathode structure 112 for a subset of the population is at least 2:1. By way of further example, in one embodiment a ratio of the second width $W_{C2}$ of the cathode structure 112 to the first width $W_{C1}$ of the cathode structure 112 for a subset of the population is at least 3:1. By way of further example, in one embodiment a ratio of the second width $W_{C2}$ of the cathode structure 112 to the first width $W_{C1}$ of the cathode structure 112 for a subset of the population is at least 4:1. By way of further example, in one embodiment a ratio of the second width $W_{C2}$ of the cathode structure 112 to the first width $W_{C1}$ of the cathode structure 112 for a subset of the population is at least 6:1. Generally a ratio of the second width $W_{C2}$ to the first width $W_{C1}$ will not exceed 15:1, such as not exceeding 10:1, and even not exceeding 8:1. For example, in one embodiment a ratio of the second width $W_{C2}$ of the cathode structure 112 to the first width $W_{C1}$ of the cathode structure 112 for a subset of the population may be in the range of from 1.05:1 to 15:1. By way of further example, in one embodiment a ratio of the second width $W_{C2}$ of the cathode structure 112 to the first width $W_{C1}$ of the cathode structure 112 for a subset of the population may be in the range of 1.1:1 to 6:1. By way of further example, in one embodiment a ratio of the second width $W_{C2}$ of the cathode structure 112 to the first width $W_{C1}$ of the cathode structure 112 for a subset of the population may be in the range of from 1.3:1 to 4:1. By way of further example, in one embodiment the contraction of the first width $W_{C1}$ with respect to the second width $W_{C2}$ may be in the range of from 2% contraction to 90% contraction, such as from 5% contraction to 75% contraction. That is, the first width $W_{C1}$ may be contracted by at least 2% with respect to the second median width $W_{C2}$, such as at least 5% and even at least 10% with respect to the second width $W_{C2}$, but may be contracted less than 90% with respect to the second width $W_{C2}$, such as less than 80% and even less than 75% with respect to the second width $W_{C2}$.

Furthermore, in one embodiment, a subset of the population of anode structures 110 may have a first width $W_{A1}$ in the charged state that is at least 50 µm. By way of further example, in one embodiment a subset of the members of the population of anode structures have a first width $W_{A1}$ in the charged state that is at least 75 µm. By way of yet further example, in one embodiment a subset of the members of the population of anode structures have a first width $W_{A1}$ in the charged state that is at least 90 µm. By way of yet further example, in one embodiment a subset of the members of the population of anode structures have a first width $W_{A1}$ in the charged state that is at least 150 µm. By way of further example, in one embodiment a subset of the members of the population of anode structures have a first width $W_{A1}$ in the charged state that is at least 200 µm. Generally, the first width $W_{A1}$ in the charged state will not exceed 2000 µm, such as not exceeding 1520 µm and even not exceeding 1000 µm. For example, in one embodiment, a subset of members of the population of anode structures 110 have a first width $W_{A1}$ in the charged state that is in the range of from 50 µm to 2000 µm, such as from 90 µm to 1520 µm, and even from 150 µm to 1000 µm.

In one embodiment, a subset of the members of the population of anode structures have a second width $W_{A2}$ in the discharged state that is no more than 2500 µm. By way of further example, in one embodiment a subset of the members of the population of anode structures have a second width $W_{A2}$ in the discharged state that is no more than 2000 µm. By way of further example, in one embodiment a subset of the members of the population of anode structures have a second width $W_{A2}$ in the discharged state that is no more than 1500 µm. By way of further example, in one embodiment a subset of the members of the population of anode structures have a second width $W_{A2}$ in the discharged state that is no more than 1000 µm. By way of further example, in one embodiment a subset of the members of the population of anode structures have a second width $W_{A2}$ in the discharged state that is no more than 800 µm. Generally, the second width $W_{A2}$ in the discharged state will be at least 15 µm, such as at least 30 µm, and even at least 60 µm. For example, in one embodiment, a subset of members of the population of anode structures 110 have a second width $W_{A2}$ in the discharged state that is in the range of from 15 µm to 2500 µm, such as from 30 µm to 1500 µm, and even from 60 µm to 1000 µm.

In yet another embodiment, a ratio of the first width $W_{A1}$ of the anode structure 110 in the charged state to a second width $W_{A2}$ of the anode structure 110 in the discharged state for a subset of the population is at least 1.01:1. By way of further example, in one embodiment a ratio of the first width $W_{A1}$ of the anode structure 110 in the charged state to a second width $W_{A2}$ of the anode structure 110 in the discharged state for a subset of the population is at least 1.05:1. By way of further example, in one embodiment a ratio of the first width $W_{A1}$ of the anode structure 110 in the charged state to a second width $W_{A2}$ of the anode structure 110 in the discharged state for a subset of the population is at least 1.5:1. By way of further example, in one embodiment a ratio of the first width $W_{A1}$ of the anode structure 110 in the charged state to a second width $W_{A2}$ of the anode structure 110 in the discharged state for a subset of the population is at least 2:1. By way of further example, in one embodiment a ratio of the first width $W_{A1}$ of the anode structure 110 in the charged state to a second width $W_{A2}$ of the anode structure 110 in the discharged state for a subset of the population is at least 3:1. By way of further example, in one embodiment a ratio of the first width $W_{A1}$ of the anode structure 110 in the charged state to a second width $W_{A2}$ of the anode structure 110 in the discharged state for a subset of the population is at least 4:1. By way of further example, in one embodiment a ratio of the first width $W_{A1}$ of the anode structure 110 in the charged state to a second width $W_{A2}$ of the anode structure 110 in the discharged state for a subset of the population is at least 5:1. For example, in one embodiment a ratio of the first width $W_{A1}$ of the anode structure 110 in the charged state to a second width $W_{A2}$ of the anode structure 110 in the discharged state for a subset of the population may be in the range of from 1.0:1 to 5:1. By way of further example, in one embodiment a ratio of the first width $W_{A1}$ of the anode structure 110 in the charged state to a second width $W_{A2}$ of the anode structure 110 in the discharged state for a subset of the population may be in the range of from 1.01:1 to 4:1. By way of further example, in one embodiment a ratio of the first width $W_{A1}$ of the anode structure 110 in the charged state to a second width $W_{A2}$ of the anode structure 110 in the discharged state for a subset of the population may be may be in the range of from 1.01:1 to 3:1, and may even be in the range of from 1.5:1 to 3:1.

In one embodiment, the sizes (e.g. dimensions and cross-sectional areas) for the members of the population of anode structures 110 and cathode structures 112 in the charged and discharged states, such as those described above, are those achieved in charging and/or discharging steps that are performed after an initial formation stage for the secondary battery 102 has already been performed. That is, in the manufacture of a secondary battery 102 having the electrode assembly 106, an initial formation stage may be performed that comprises at least one initial charging cycle of the secondary battery 102, which may be performed under carefully controlled conditions including one or more of current, temperature and duration, to promote the formation of the desired structure and contact between components of the secondary battery 102. The initial formation stage can comprise only a single initial charging cycle, or may comprise a plurality of charging cycles, according to the particular battery structure and composition, and which can be performed as a final stage in manufacturing to bring the secondary battery 102 to its full power and/or capacity. According to one embodiment, one or more dimensions of the anode and/or cathode structures may also change during the initial formation stage, as the secondary battery 102 is charged and/or discharged, as is also discussed in further detail below. Accordingly, in one embodiment, the dimensions of the cathode and anode structures 110, 112 referred to herein, as well as the changes therein, are those that occur during charging and/or discharging of the secondary battery subsequent to the initial formation stage. However, in another embodiment, the dimensions referred to herein, as well as the changes therein, may also correspond to those that occur as a part of the initial formation stage.

Figure 3:
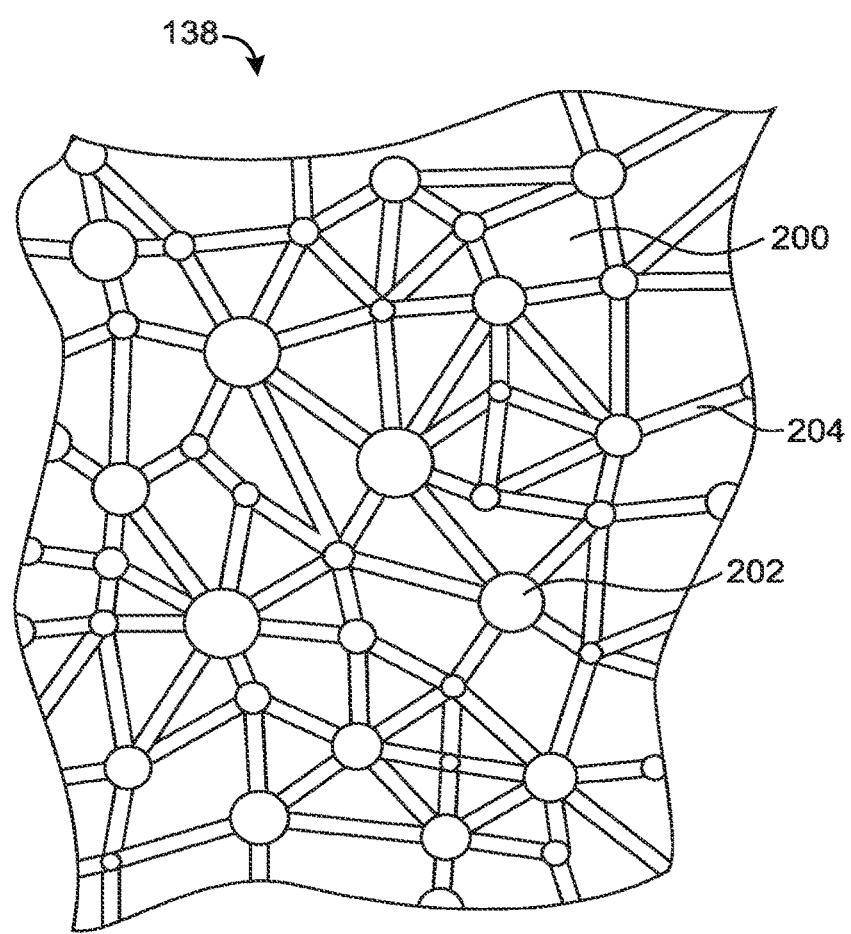
FIG. 3 is a schematic view of an embodiment of a layer of cathode active material.

In one embodiment, members of the population of cathode structures 110 comprise a cathode active material layer 138 having a porous structure, where the porosity of the cathode active material layer 138 may change according to the expansion/contraction of the cathode structures 112 upon charging/discharging of the secondary battery 102. For example, referring to FIG. 3, members of the population of cathode structures 112 may comprise a cathode active material layer 138 having cathode active material 202 distributed in a porous matrix 204 of material, with the porous matrix 204 comprising pores 200 and/or interstices formed therein. In the embodiment as shown in FIG. 3, the cathode active material layer 138 comprises particles 202 of cathode active material that are dispersed in the porous matrix 204. The cathode active material layer 138 may also optionally comprise filler particles 206 that are similarly dispersed in the porous matrix 204. In the embodiment as shown, the porous matrix is relatively highly porous, and comprises webs and/or strands of matrix material connecting the particles 202 of cathode active material and/or particles 206 of filler material, with pores 200 and/or interstices formed between adjacent webs and/or strands of matrix material. The porous matrix 204 may thus be understood, in one embodiment, to act as a binder that binds the particles of cathode active material together to form the cathode active material layer 138. In another embodiment, the porous matrix 204 can also and/or alternatively comprise thicker sections of matrix material having the particles 202 at least partially and even entirely embedded therein, with pores formed in the relatively thick matrix material sections. In certain embodiments the porosity (i.e. void fraction) of the matrix 204, which may be related to the volume and/or number of pores 202 and/or interstices in the matrix material, and which can vary according to the charge/discharge state of the secondary battery 102, can also be selected to provide performance of the cathode active material layer 138, as is discussed in more detail below.

Figure 4A:
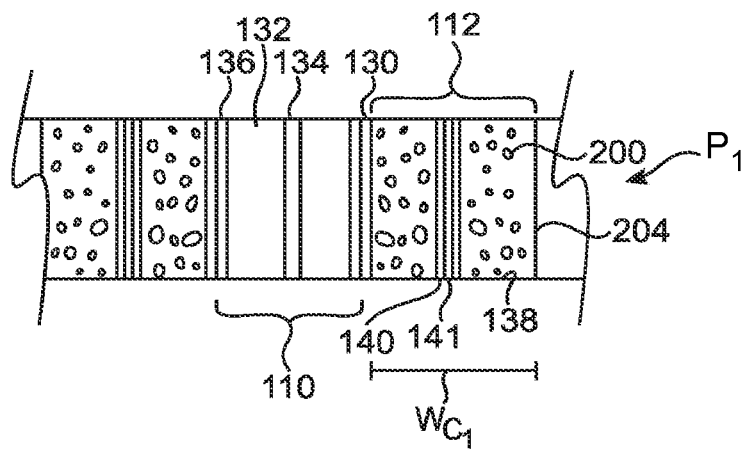
FIGS. 4A-4B are cross-sectional views of an embodiment of an electrode assembly with cathode structures having layers of cathode active material that are porous.
Figure 4B:
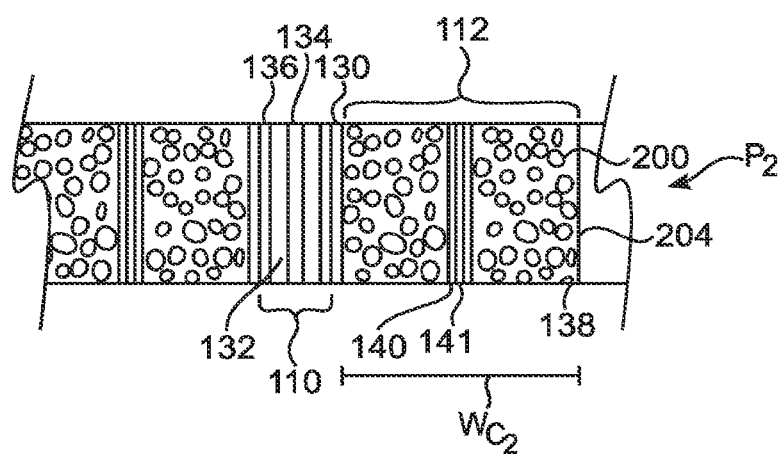

According to one embodiment, compression and/or expansion of members of the population of cathode structures 112 may result in compression and/or expansion of the cathode active material layer 138, such that the pores and/or interstices 200 increase in size and/or number upon expansion of members of the population of cathode structures 112, and decrease in size and/or number upon compression of members of the population of cathode structures 112. That is, the compression and/or expansion of the members of the population of cathode structures 112 during cycling of the secondary battery 102 between charged and discharged states results in a change in porosity of the cathode active material layer 138. In the embodiment shown in FIGS. 4A-4B, the members of the population of cathode structures 112 are depicted as being in a charged state with a width $W_{C1}$ in FIG. 4A, and a discharged state with a width $W_{C2}$ in FIG. 4B, where the width $W_{C2}$ is greater than the width $W_{C1}$. Similarly, the cross-sectional area $C_2$ of the members of the population of cathode structures 112 are higher in the discharged state depicted in FIG. 4B than the cross-sectional area $C_1$ in the charged state depicted in FIG. 4A. That is, the members of the population of cathode structures 112 are depicted as being in a more compressed state in FIG. 4A, and a more expanded state in FIG. 4B, corresponding to, e.g., a charged state and discharged state of the secondary battery 102, respectively. It is noted that FIGS. 4A-4B further depict an anode structure 110 having an anode active material layer 132, anode current collector 136, and anode backbone 134, separators 130 between the anode structure population members 110 and cathode structure population members 112, and cathode structures 112 having a cathode backbone 141 and cathode current collectors 140. However, it should be understood that the electrode assembly 106 having the anode and cathode structures 110, 112 is not limited thereto, and other structures and/or arrangements of components of the anode and cathode structures can also be provided. As can be seen by the embodiments shown in FIGS. 4A-4B, the expansion of the members of the population of cathode structures 112 from the charged state as depicted in FIG. 4A to the discharged state as depicted in FIG. 4B can result in an increase in the size and/or number of the pores and/or interstices 200, as the cathode active material layer 138 expands according to the increased volume of the discharged state. Conversely, the contraction of members of the population of cathode structures 112 from the discharged state as depicted in FIG. 4B to the charged state as depicted in FIG. 4A, results in compression of the cathode active material layer 138 and at least partial filling of the pores and/or interstices, as the cathode active material layer 138 is compressed down to the smaller volume of the charged state.

Accordingly, in one embodiment, members of the population of cathode structures 112 have a cathode active material layer 138 with a first porosity $P_1$ when the secondary battery 102 is in the charged state, and a second porosity $P_2$ when the secondary battery 102 is in the discharged state, with the first porosity being less than the second porosity. For example, in one embodiment, the first porosity may be less than 30%. By way of further example, in one embodiment, the first porosity may be less than 20%. By way of further example, in one embodiment, the first porosity may be less than 10%. By way of further example, in one embodiment, the first porosity may be less than 5%. For example, in one embodiment, the first porosity may be in the range of from 1% to 30%. By way of further example, in one embodiment, the first porosity may be in the range of from 2% to 20%. By way of further example, in one embodiment, the first porosity may be in the range of from 5% to 10%. Furthermore, in one embodiment, the second porosity in the discharged may be at least 50%. For example, in one embodiment, the second porosity may be at least 60%. By way of further example, in one embodiment, the second porosity may be at least 70%. By way of further example, in one embodiment the second porosity may be at least 75%. For example, in one embodiment, the second porosity may be in the range of from 50% to 90%. By way of further example, in one embodiment, the second porosity may be in the range of from 60% to 80%. By way of further example, in one embodiment, the second porosity may be in the range of from 70% to 75%. The porosity of the cathode active material layer 138 is the ratio of the volume of pores and/or interstices 200 in between cathode active material 202 in the cathode active material layer 138, to the volume taken up by the entire mass of the cathode active material layer 138.

In yet another embodiment, a ratio of the porosity $P_2$ of the cathode active material layer 138 in the discharged state to the porosity $P_1$ of the cathode active material layer 138 in the charged state is at least 1.1:1. By way of further example, in one embodiment, a ratio of the porosity $P_2$ of the cathode active material layer 138 in the discharged state to the porosity $P_1$ of the cathode active material layer 138 in the charged state is at least 1.5:1. By way of further example, in one embodiment, a ratio of the porosity $P_2$ of the cathode active material layer 138 in the discharged state to the porosity $P_1$ of the cathode active material layer 138 in the charged state is at least 2:1. By way of further example, in one embodiment, a ratio of the porosity $P_2$ of the cathode active material layer 138 in the discharged state to the porosity $P_1$ of the cathode active material layer 138 in the charged state is at least 5:1. By way of further example, in one embodiment, a ratio of the porosity $P_2$ of the cathode active material layer 138 in the discharged state to the porosity $P_1$ of the cathode active material layer 138 in the charged state is at least 10:1. By way of further example, in one embodiment, a ratio of the porosity $P_2$ of the cathode active material layer 138 in the discharged state to the porosity $P_1$ of the cathode active material layer 138 in the charged state is at least 15:1. For example, in one embodiment, a ratio of the porosity $P_2$ of the cathode active material layer 138 in the discharged state to the porosity $P_1$ of the cathode active material layer 138 in the charged state is in the range of from 2:1 to 30:1. For example, in one embodiment, a ratio of the porosity $P_2$ of the cathode active material layer 138 in the discharged state to the porosity $P_1$ of the cathode active material layer 138 in the charged state is in the range of from 3:1 to 20:1. By way of further example, in one embodiment, a ratio of the porosity $P_2$ of the cathode active material layer 138 in the discharged state to the porosity $P_1$ of the cathode active material layer 138 in the charged state is in the range of from 5:1 to 15:1.

In one embodiment, the cathode active material layer 138 comprises cathode active material in the form of particles 202. For example, in one embodiment, the cathode active material comprises particles 202 of at least one of transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates and combinations thereof. In one embodiment, the cathode active material layer 138 comprises at least 40% by weight of cathode active material 202. For example, in one embodiment, the cathode active material layer 138 comprises at least 50% by weight of cathode active material. By way of further example, in one embodiment, the cathode active material layer 138 comprises at least 60% by weight of cathode active material. For example, the cathode active material layer 138 may comprise a weight percent of cathode active material in the range of from 40% to 99%. For example, in one embodiment, a weight percent of cathode active material in the cathode active material layer 138 may be in the range of from 50% to 99%. Furthermore, in one embodiment, the cathode active material layer 138 comprises at least one filler material, which may also be in the form of particles. For example, the cathode active material layer 138 may comprise filler particles comprising at least one of carbon-containing material such as carbon black, polymer-containing beads such as beads formed from one or more of polyethylene, polypropylene, polyvinylidene fluoride, polytetrafluoroethylene, polyacrylic acid, carboxymethyl cellulose, polyvinylalcohol, starch, regenerated cellulose, diacetyl cellulose, hydroxypropyl cellulose, polyvinyl chloride, polyvinyl pyrrolidone, polybutadiene, polyethylene oxide, polyacrylates, rubbers, e.g. ethylene-propylene-diene monomer (EPDM) rubber, sulfonated EPDM, fluorinated rubbers, styrene butadiene rubber (SBR), polyacrylonitrile (PAN), polymethyl methacrylate (PMMA), polyacrylic acid (PAA), cross-linked polyethylene (PEX, XLPE), polyethylene (PE), polyethylene terephthalate (PET), polyphenyl ether (PPE), polyvinyl chloride (PVC), polyvinylidene chloride (PVDC), polyamide (PA), polyimide (PI), polycarbonate (PC), polytetrafluoroethylene (PTFE), polystyrene (PS), polyurethane (PU), polyester (PE), acrylonitrile butadiene styrene (ABS), polyoxymethylene (POM), polysulfone (PES), styrene-acrylonitrile (SAN), ethylene vinyl acetate (EVA), styrene maleic anhydride (SMA), combinations of these, and other inert polymers that have elastic modulus between 1E-5 GPa and 10 GPa), and are inert in the battery. In particular, concentrations and particle sizes of these materials can be chosen by engineering design of properties in order to achieve a predetermined compressibility of the cathode structure. For example, in one embodiment, to obtain a cathode structure with a cathode active material layer having a relatively high compressibility, polymers with a relatively low elastic modulus (Young's Modulus) can be provided in relatively high concentrations in the cathode active material layer. The particles of filler and/or cathode active material may be dispersed in the matrix material, as shown for example in FIG. 3.

In one embodiment, the cathode active material 202 comprises particles (e.g., one or more of cathode active material particles and filler particles) having an average particle size in the range of from 0.1 µm to 500 µm. By way of further example, in one embodiment, the cathode active material 202 comprises particles having a weight average particle size in the range of from 0.15 µm to 300 µm. By way of further example, in one embodiment, the cathode active material 202 comprises particles having an average particle size in the range of from 0.2 µm to 200 µm.

In one embodiment, the cathode active material layer 138 comprises filler material in a range of from 0.05% by weight to 20% by weight of the cathode active material layer. By way of further example, in one embodiment, the cathode active material layer 138 comprises filler material in a range of from 0.1% by weight to 10% by weight. By way of further example, in one embodiment, the cathode active material layer 138 comprises filler material in a range of from 0.5% by weight to 5% by weight.

In yet another embodiment, a ratio by weight of cathode active material to filler material in the cathode active material layer 138 is in a range of from 1.5:1 to 30:1. In yet another embodiment, a ratio by weight of cathode active material to filler in the cathode active material layer 138 is in a range of from 2:1 to 20:1. In yet another embodiment, a ratio by weight of cathode active material to filler in the cathode active material layer 138 is in a range of from 3:1 to 15:1.

According to one embodiment, the cathode active material layer 138 comprises particles of cathode active material and/or filler particles that are dispersed in the matrix of polymeric material. In one embodiment, the particles of cathode active material may be dispersed substantially uniformly throughout the matrix of polymeric material. Alternatively, in another embodiment, the particles of cathode active material may be distributed non-uniformly throughout the matrix of polymeric material, such as to provide a gradient of the cathode active material throughout the cathode active material layer 138, with a higher concentration of particles on one side of the cathode active material layer 138 than on another side of the cathode active material layer. In one embodiment, the polymeric material may comprise a fluoropolymer derived from monomers comprising at least one of vinylidene fluoride, hexafluoropropylene, tetrafluoropropene, and the like. In another embodiment, the polymeric material may be a polyolefin such as at least one of polyethylene, polypropylene, or polybutene, having any of a range of varying molecular weights and densities. In another embodiment, the polymeric material is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the polymeric material is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the polymeric material is selected from the group consisting of acrylates, styrenes, epoxies, and silicones. In yet another embodiment, the polymeric material can comprise one or more of polyethylene, polypropylene, polyvinylidene fluoride, polytetrafluoroethylene, polyacrylic acid, carboxymethyl cellulose, polyvinylalcohol, starch, regenerated cellulose, diacetyl cellulose, hydroxypropyl cellulose, polyvinyl chloride, polyvinyl pyrrolidone, polybutadiene, polyethylene oxide, polyacrylates, rubbers, e.g. ethylene-propylene-diene monomer (EPDM) rubber, sulfonated EPDM, fluorinated rubbers, styrene butadiene rubber (SBR), polyacrylonitrile (PAN), polymethyl methacrylate (PMMA), polyacrylic acid (PAA), cross-linked polyethylene (PEX, XLPE), polyethylene (PE), polyethylene terephthalate (PET), polyphenyl ether (PPE), polyvinyl chloride (PVC), polyvinylidene chloride (PVDC), polyamide (PA), polyimide (PI), polycarbonate (PC), polytetrafluoroethylene (PTFE), polystyrene (PS), polyurethane (PU), polyester (PE), acrylonitrile butadiene styrene (ABS), polyoxymethylene (POM), polysulfone (PES), styrene-acrylonitrile (SAN), ethylene vinyl acetate (EVA), styrene maleic anhydride (SMA), combinations of these, and other inert polymers that have elastic modulus between 1E-5 GPa and 10 GPa), and are inert in the battery. In particular, similarly to the filler particles above, the concentrations these materials can be chosen by engineering design of properties in order to achieve a predetermined compressibility of the cathode structure. For example, in one embodiment, to obtain a cathode structure with a cathode active material layer having a relatively high compressibility, polymers with a relatively low elastic modulus (Young's Modulus) can be provided in relatively high concentrations in the cathode active material layer. In another embodiment, the polymeric material is a copolymer or blend of two or more of the aforementioned polymers.

In one embodiment, members of the population of cathode structure 112 have a compressibility that imparts good performance during charging/discharging cycles in the secondary battery. For example, in one embodiment, one or more members of the population cathode structures 112 may exhibit a compression, as defined by a $(Dimension_1 - Dimension_2)/(Dimension_1) \times 100$, where $Dimension_1$ is a dimension of the cathode structures (such as width or cross-section) in the discharged state), and $Dimension_2$ is a dimension of the cathode structure in the charged state, of at least 5% at a pressure of at least 0.7 MPa (100 psi). By way of further example, one or more members of the population of the cathode structure may exhibit a compression of at least 10% at a pressure of 0.7 MPa (100 psi). By way of further example, one or more members of the population of cathode structures may exhibit a compression of at least 25% at a pressure of 0.7 MPa (100 psi). By way of further example, one or more members of the population of cathode structures may exhibit a compression of at least 5% at a pressure of 70 MPa (10,000 psi). By way of further example, one or more members of the population of cathode structures may exhibit a compression of at least 10% at a pressure of 70 MPa (10,000 psi). For example, in one embodiment, one or more members of the population of cathode structures 112 may exhibit a compression in the range of from 5% to 75% at a pressure of 0.7 MPa (100 psi). By way of further example, in one embodiment, one or more members of the population of cathode structures 112 may exhibit a compression in the range of from 0.5% to 75% at a pressure of 70 MPa (10,000 psi). By way of further example, in one embodiment, one or more members of the population of cathode structures 112 may exhibit a compression in the range of from 20% to 50% at a pressure of 0.7 MPa (100 psi). By way of further example, in one embodiment, one or more members of the population of cathode structures 112 may exhibit a compression in the range of from 20% to 50% at a pressure of 70 MPa (10,000 psi).

In one embodiment, the members of the population of cathode structures 112 have a cathode active material layer 138 with filler particles that are both compressible and elastic. That is, the filler particles can comprise particles such as polymeric beads or other materials that can compress with compression of cathode structure, and that have an elasticity that allows the particles to at least partially recover their shape prior to compression. In one embodiment, the filler particles having a predetermined level of elasticity may help facilitate expansion of the cathode structures during discharge of the secondary battery, without excessively inhibiting compression of the cathode structures during charging of the secondary battery. The filler particles may also comprise an elasticity as measured according to Young's Modulus in the range of from 0.1 GPa to 10 Gpa, such as from 0.1 to 4.1 GPa, and even from 2.5 GPa to 10 Gpa.

In one embodiment, the members of the population of cathode structures 112 have a cathode active material layer 138 with filler particles that are incompressible and porous. The filler particles can comprise structures such as hollow micro-spheres, micro-fibers, micro-tubes, micro-cylinders, micro-skeletons, and other microscopic and nanoscopic object shapes and sizes that are compatible in the battery. The porous filler particles can comprise an incompressible material such as for example a porous ceramic material, or a porous material having a hard ceramic cell, that resists compression, while also providing a porous interior. These porous, incompressible particles can be used as electrolyte reservoirs in the matrix of the electrode. When the electrode is in its compressed form, the electrolyte stored in the porosity of these particles can act towards reducing the ionic resistance of the matrix electrode.

According to one aspect, the filler materials that act as electrolyte reservoirs can be made from ceramics, polymers, metals, metal oxides, or other compatible materials. The amount, size, shape, and material properties of the filler particles can be tailored for the particular use and the pressures generated by the battery during operation.

In one embodiment, the compressibility and porosity of the filler material can be tailored to the application and the pressures generated by the battery during operation. In one instance, the filler particles are incompressible under the pressures applied by the battery during operation, and the electrolyte stored inside the filler particles do not appreciably change in volume during charge and discharge. In other embodiments, the filler material is less compressible than the electrode matrix, so that even though the electrolyte volume in the filler particle is lower in the compressed state than in the uncompressed state, it is greater than the electrolyte volume in the matrix, thereby, providing ionic conductivity.

The porosity of the filler material designed for use as an electrolyte reservoir is preferably high in order to maximize the amount of electrolyte in the particle during battery operation. Preferably, the porosity may be greater than 60%, such as greater than 70%, greater than 80%, and even greater than 90% by volume fo the filler material. According to one aspect, the pore sizes of the filler material may be generally greater than 5 nm, such as greater than 10 nm, and even greater than 50 nm, in order to facilitate ion transport.

The filler materials that are used to constitute an electrolyte reservoir may, in one embodiment, be made of materials that have a elasticity according to the Young's modulus of greater than 10 GPa, such greater than 50 GPa, and even greater than 100 Gpa.

In one embodiment, the secondary battery 102 having the members of the anode and cathode structure population 110, 112 that are capable of expanding and/or contracting, such as inverse relation to one another, may be capable of providing synergistic effects in terms of simultaneously imparting both a relatively high areal capacity and/or energy density, and a relatively high rate of discharge (e.g., as measured by the rate capability) of the secondary battery. For example, the secondary battery 102 may in certain aspects be capable of preserving porosity of the cathod structure 110 under compression thereof. Without being limited to any one particular theory, it is believed that the expansion/contraction of the members of the population of cathode structures 112 upon discharge/charge of the secondary battery 102 allows for cathode structures 112 to be used that provide a relatively high areal capacity, without sacrificing the rate at which discharge of the secondary battery can occur. By way of clarification, it is noted that the areal capacity of a secondary battery 102 may be related to the relatively high cathode volume per unit geometrical area (i.e., the cathode active material volume) that can be provided. In general, a relatively higher volume of cathode per unit geometrical area will result in a relatively higher areal capacity. However, batteries with cathodes having a relatively high volume, such as those having a relatively high thickness in the longitudinal direction, may also experience a reduction in discharge as compared to thinner cathodes, due to the larger amount of cathode active material that is present in the interior of the cathode as opposed to at a cathode surface. However, without being limited by any theory, it is believed that the expansion/contraction of the cathode structures 112, and the change in porosity of the cathode active material layers 138 that occurs with the expansion/contraction, may allow for a rate of discharge that at least partially compensates for any reduction that might otherwise be observed with a cathode structure 112 having a relatively high volume. That is, it is hypothesized that the expansion of the cathode and increased porosity in the cathode during discharge may facilitate contact of the electrolyte with the cathode active material, even at more interior regions of the cathode, thereby facilitating an increased discharge rate. Accordingly, aspects of the present disclosure may allow for a relatively large volume of cathode active material to be provided (with respect to the total volume of cathode structures, anode structures, and separators), while maintaining a relatively high rate of discharge, and thus a high rate capability of the secondary battery.

For example, in one embodiment, the areal capacity of the secondary battery may be determined as the capacity of the battery per median opposing surface area of members of the anode structure population of the battery, where the opposing surface area is the area of the portion of the anode surface that faces a cathode surface directly adjacent to the anode in the stacking direction. The areal capacity may be measured in units of mA·h/cm². For example, referring to FIG. 1D, the opposing surface area OA may be that portion of the anode surface area between points 126a and 126b along the length LA of the anode, multiplied by the height $H_A$, where the point 126b is a distal end of the anode, and the point 126a is a point just short of the base of the anode, located across from the distal end of the facing cathode 112, and thus 126a and 126b mark the end of the surface region of the anode that directly faces the opposing cathode 112 surface. Accordingly, in one embodiment, the areal capacity of the secondary battery is at least 3 mA·h/cm² at 0.1 C. By way of further example, in one embodiment, the energy density of the secondary battery is at least 5 mA·h/cm² at 0.1 C. By way of further example, in one embodiment, the energy density of the secondary battery is at least 8 mA·h/cm² at 0.1 C. By way of further example, in one embodiment, the energy density of the secondary battery is at least 10 mA·h/cm² at 0.1 C By way of further example, in one embodiment, the energy density of the secondary battery is at least 15 mA·h/cm² at 0.1 C. By way of further example, in one embodiment, the energy density of the secondary battery is at least 20 mA·h/cm² at 0.1 C. By way of further example, in one embodiment, the energy density of the secondary battery is at least 25 mA·h/cm² at 0.1 C. For example, in one embodiment, the energy density of the secondary battery 102 is in a range of from 3 to 50 mA·h/cm² at 0.1 C By way of further example, in one embodiment, the energy density of the secondary battery 102 is in a range of from 5 to 25 mA·h/cm² at 0.1 C. By way of further example, in one embodiment, the energy density of the secondary battery 102 is in a range of from 8 to 20 mA·h/cm² at 0.1 C.

In one embodiment, the secondary battery 102 may provide a higher discharge rate that can be quantified according to the rate capability of the secondary battery. The rate capability of the secondary battery refers to the ratio of the capacity of the secondary battery at a first C-rate to the capacity of the secondary battery at a second C-rate, expressed as a percentage. For example, the rate capability may calculated according to Capacity$_1$/Capacity$_2$×100, where Capacity$_1$ is the capacity for discharge at the first C-rate, such as a C-rate of 1 C, and Capacity$_2$ is the capacity for discharge at a second C-rate, such as a C-rate of C/10, and may be expressed as the calculated percentage for a specified ratio $C_x/C_y$, where $C_x$ is the first C-rate, and $C_y$ is the second C-rate. In particular, the rate capability metric may serve as a measure of the efficiency of the rate of discharge of the secondary battery when discharged at a higher rate as compared to a lower rate. By way of clarification, it is noted that practice, increasing the speed of discharge of a secondary battery results in the generation of impedances and other forces that can build up to oppose to higher current. Accordingly, the rate capability may be a measure of the change in capacity that occurs due to changes in discharge rate. In one embodiment, the secondary battery may be capable of providing a rate capability of 1 C:C/10 of at least 75%. By way of further example, the secondary battery may be capable of providing a rate capability of 1 C:C/10 of at least 80%. By way of further example, the secondary battery may be capable of providing a rate capability of 1 C:C/10 of at least 90%. By way of further example, the secondary battery may be capable of providing a rate capability of 1 C:C/10 of at least 95%. By way of further example, the secondary battery may be capable of providing a 2 C:C/10 rate of at least 75%. By way of further example, the secondary battery may be capable of providing a rate capability of 2 C:C/10 of at least 80%. By way of further example, the secondary battery may be capable of providing a rate capability of 2 C:C/10 of at least 90%. By way of further example, the secondary battery may be capable of providing a rate capability of 2 C:C/10 of at least 95%. By way of further example, the secondary battery may be capable of providing a 5:C/10 rate of at least 75%. By way of further example, the secondary battery may be capable of providing a rate capability of 5:C/10 of at least 80%. By way of further example, the secondary battery may be capable of providing a rate capability of 5 C:C/10 of at least 90%. By way of further example, the secondary battery may be capable of providing a rate capability of 5 C:C/10 of at least 95%.

In one embodiment, the secondary battery has an areal capacity of at least 3 mA·h/cm² at 0.1 C, and a rate capability of 1 C/0.1 C of at least 75%. For example, in one embodiment, the secondary battery may have an areal capacity of at least 5 mA·h/cm² at 0.1 C, and a rate capability of 1 C/0.1 C of at least 75%, such as a rate capability of 1 C/0.1 C of at least 80% and even at least 90%, such as 95%. By way of further example, in one embodiment, the secondary battery may have an areal capacity of at least 8 mA·h/cm² at 0.1 C, and a rate capability of 1 C/0.1 C of at least 75%, such as a rate capability of 1 C/0.1 C of at least 80% and even at least 90%, such as 95%. By way of further example, in one embodiment, the secondary battery may have an areal capacity of at least 10 mA·h/cm² at 0.1 C, and a rate capability of 1 C/0.1 C of at least 75%, such as a rate capability of 1 C/0.1 C of at least 80% and even at least 90%, such as 95%. By way of further example, in one embodiment, the secondary battery may have an areal capacity of at least 15 mA·h/cm² at 0.1 C, and a rate capability of 1 C/0.1 C of at least 75%, such as a rate capability of 1 C/0.1 C of at least 80% and even at least 90%, such as 95%. By way of further example, in one embodiment, the secondary battery may have an areal capacity of at least 20 mA·h/cm² at 0.1 C, and a rate capability of 1 C/0.1 C of at least 75%, such as a rate capability of 1 C/0.1 C of at least 80% and even at least 90%, such as 95%. By way of further example, in one embodiment, the secondary battery may have an areal capacity of at least 25 mA·h/cm² at 0.1 C, and a rate capability of 1 C/0.1 C of at least 75%, such as a rate capability of 1 C/0.1 C of at least 80% and even at least 90%, such as 95%.

In yet another embodiment, without being limited to any particular theory, it is believed that the electrode assembly 106 having the expanding/contracting cathode structures 112 may be capable of providing an electrolyte pumping effect that increases movement and flow of electrolyte to the cathode active material in the cathode structures and helps to maintain a high rate of discharge of the secondary battery 102 having the cathode structures 112. By way of clarification, and without being limited to any one particular theory, it is noted that a volume occupied by the electrolyte in the secondary battery 102 includes the volume occupied by the electrolyte in between members of the population of cathode and anode structures 112, 110, and also includes any open volume due to the presence of pores, etc., in the members of the population of anode structures 110, and the open volume in the members of the population of cathode structures 112, resulting from the porosity thereof. As the secondary battery 102 is charged, any pores in the members of the population of anode structures 110 become increasingly filled with intercalated and/or inter-alloyed carrier ions, such that a volume of electrolyte occupying the members of the population of anode structures 110 decreases. Furthermore, the increase in size of the members of the population of anode structures 110 due to this intercalation and/or inter-alloying may compress the members of the population of cathode structures 112, as discussed above, thereby reducing the open pore volume in the cathode structure members such that a volume of electrolyte occupying the cathode structures 112 decreases when the secondary battery 102 is being charged. Conversely, discharging of the secondary battery 102 may result in de-intercalation and/or de-alloying of the carrier ions, to provide more available volume in the anode structure, and may also result in expansion of the cathode structures, which can increase the porosity and the available volume for electrolyte in the pores/open volume of the members of the cathode structure population. That is, the electrolyte may occupy a volume $V_1$ in the pores of the members of the population of cathode structures 112 in the charged state that is smaller than a volume $V_2$ in the pores of the members of the population of cathode structures 112 in the discharged state. By way of explanation, and not being limited by any theory, it is believed that this change in available volume (between $V_1$ and $V_2$) for the electrolyte in the members of the population of cathode structures 112 (and even in the anode structure population) in cycling between charged and discharged states may provide an electrolyte pumping effect whereby the electrolyte is agitated and/or "pumped" into and about the pores of the cathode active material layer 138 during cycling. Thus, the "pumping" of the electrolyte into and about pores of the cathode active material layer 138 may bring the electrolyte into contact with cathode active material, and can enhance the rate of discharge of the cathode active material layer due to the increased contact of the cathode active material with the electrolyte during the discharge process. The volume $V_2$ of the pores of the members of the population of cathode structures 112 in the discharged state may be related to the porosity of the cathode active material layer 138 in the discharged state, and the volume $V_1$ of the pores of the members of the population of cathode structures 112 in the charged state may be related to the porosity of the cathode active material layer 138 in the charged state. In one embodiment, a ratio $V_2:V_1$ of the volume of the cathode active material layer 138 available for the electrolyte in the discharged state to the volume in the charged state may be at least 1.1:1. For example, in one embodiment, the ratio $V_2:V_1$ may be at least 1.5:1. For example, in one embodiment, the ratio $V_2:V_1$ may be at least 2:1. For example, in one embodiment, the ratio $V_2:V_1$ may be at least 5:1. By way of further example, in one embodiment the ratio $V_2:V_1$ may be at least 10:1. By way of yet a further example, in one embodiment the ratio $V_2:V_1$ may be at least 15:1. For example, the ratio $V_2$ to $V_1$ may be in the range of from 1.1:1 to 30:1, such as from 1.5:1 to 20:1, and even from 3:1 to 15:1. In yet another embodiment, porous filler particles may also be provided to facilitate a predetermined pore volume in one or more of the charge and/or discharged states.

In yet another embodiment, a method of formation of a secondary battery for cycling between charged and discharged states may be provided. According to one aspect, the method of formation may comprise at least one initial formation charging step, in which the secondary battery 102 is charged such that members of the population of anode structures 110 expand, with the result that the expanding anode structures 110 compress members of the population of cathode structures 112. Generally speaking, the formation stage may involve one or more initial charging steps that are performed under conditions that re-arrange and/or optimize internal structures and morphologies, such that the secondary battery can be charged up to its rated capacity. For example, the formation stage may involve one or more charging steps performed under carefully controlled conditions of current, temperature and duration, for example to minimize impedance in the secondary battery and optimize contact between electrolyte and electrodes. In one embodiment, during the formation stage, the members of the population of anode structures 110 may compress the compressible layers 138 of cathode active material to a size that is less than an original size of the cathode active material layers 138 prior to the initial formation stage. The initial formation stage may thus provide for in situ formation of members of the population of cathode structures 112 having a predetermined size, cross-sectional area and/or volume, as well as a predetermined density, porosity, and/or volume % of the cathode active material in the cathode active material layers 138 of the cathode structure population members. In one embodiment, the initial formation stage compresses a subset of the population of cathode structures 112 such that the cross-sectional area decreases from an initial cross-sectional area $C_i$ prior to the initial formation step to a post-formation cross-sectional area $C_f$ after the initial formation stage that is less than 95% of the initial cross-sectional area $C_i$. By way of further example, in one embodiment, the initial formation stage compresses a subset of the population of cathode structures 112 such that the cross-sectional area decreases from an initial cross-sectional area $C_i$ prior to the initial formation stage to a post-formation cross-sectional area $C_f$ after the initial formation stage that is less than 90% of the initial cross-sectional area $C_i$. By way of further example, in one embodiment, the initial formation stage compresses a subset of the population of cathode structures 112 such that the cross-sectional area decreases from an initial cross-sectional area $C_i$ prior to the initial formation stage to a post-formation cross-sectional area $C_f$ after the initial formation stage that is less than 80% of the initial cross-sectional area $C_i$. By way of further example, in one embodiment, the initial formation stage may compress a subset of the population of cathode structures 112 such that the cross-sectional area decreases from an initial cross-sectional area $C_i$ prior to the initial formation stage to a post-formation cross-sectional area $C_f$ after the initial formation stage that is less than 70% of the initial cross-sectional area $C_i$. Generally, the post-formation cross-sectional area $C_f$ will be at least 25% of the initial cross-sectional area $C_i$. For example, the initial formation step may compress a subset of the population of the cathode structures 112 to a cross-sectional area $C_f$ that is in the range of from 25% to 95% of $C_i$, such as in a range of from 30% to 80% of $C_i$, and even in a range of from 40% to 60% of $C_i$. Furthermore, according to one embodiment, a median cross-sectional area, as measured either according to $MA_C$ (e.g., a median of cross-sectional areas for more than one cathode member), $ML_C$ (e.g., a median of cross-sectional areas at different longitudinal planes long a cathode member), and/or $MO_C$ (e.g., a median of MAc and MLc), as discussed above, may be used to determine the extent of compression of a subset of the population of cathode structures during the initial formation, and may exhibit median cross-sectional areas post-formation as a % of the median cross-sectional areas pre-formation that are similar to and/or the same as the ranges for $C_f$ as a % of $C_i$ above.

Also, the formation stage may result in the increase in size of the members of the population of anode structures. For example, the initial cross-sectional area $A_1$ of a subset of the population of anode structures may increase to a post-formation cross-sectional area $A_f$ that provides a ratio of $A_f:A_i$ that is at least 1.1:1, such as at least 1.3:1, and even at least 1.5:1. For example, the ratio $A_f:A_i$ may be at least 2:1, and may even be at least 3:1, such as at least 4:1, and even at least 5:1. For example, a cross-sectional area $C_i$ of the subset of the population of cathode structures before the initial formation step may be in the range of from 800 µm² to 8×10⁶ µm², such as from 1000 µm² to 5×10⁶ µm², and even from 1500 µm² to 3×10⁶ µm². By contrast, the cross-sectional area $C_f$ of the subset of the population of cathode structures after the initial formation step may be in the range of from 3500 µm² to 8×10⁶ µm², such as from 4000 µm² to 5.05×10⁶ µm², and even from 500 µm² to 3×10⁶. Furthermore, according to one embodiment, a median cross-sectional area, as measured either according to $MA_A$ (e.g., a median of cross-sectional areas for more than one anode member), $ML_A$ (e.g., a median of cross-sectional areas at different longitudinal planes long an anode member), and/or $MO_A$ (e.g., a median of $MA_A$ and $ML_A$), as discussed above, may be used to determine the extent of expansion of a subset of the population of anode structures during the initial formation stage, and may exhibit median cross-sectional areas post-formation as a % of the median cross-sectional areas pre-formation that are similar to and/or the same as the ranges for the ratio of $A_f$ to $A_i$ as above.

In yet another embodiment, the initial formation stage may comprise charging the secondary battery 102 to compress the cathode active material layers 138 to decrease the porosity thereof, and/or to increase a volume % of the cathode active material layers 138 occupied by particles of cathode active material and/or filler (e.g., to densify the cathode active material layers). By way of example, in one embodiment, the volume % of particles in the cathode active material layers 138 before the initial formation stage may be no more than 50%, such as no more than 30% and even no more than 25%. By contrast, a volume % of particles in the cathode active material layers 138 after the initial formation stage may be at least 60%, such as at least 75% and even at least 85%, such as at least 95%.

According to yet another embodiment, the initial formation stage may comprise charging the secondary battery 102 such that the members of the population of anode structures 110 expand and compress the microporous separator 130 against the cathode structures 112 and/or anode structures, at a pressure that causes the microporous separator to at least partially adhere to members of the populations of cathode and anode structures. That is, in a case where the microporous separator 130 comprises a polymeric or other material capable of at least partially plasticizing and/or otherwise adhering to members of the populations of cathode structures 112 and/or anode structure 110, the compression of the microporous separator 130 against the members can cause the separator and members to at least partially adhere to each other. In one embodiment, the at least partial adhesion of the microporous separator to the cathode structure and/or anode structure members can cause the cathode structure members to expand upon discharge of the secondary battery 102. By way of clarification, it is noted that charging of the secondary battery expands the members of the population of anode structures 110, and this expansion may also stretch portions of an elastic microporous separator 130 that are adjacent to the anode structure members. Furthermore, when the members of the population of anode structures 110 contract during discharge of the secondary battery 102, the elastic microporous separator may also contract back to a more relaxed state, such as substantially conformally with the contracting profile of the anode structure population members 110. However, as the separator 130 is at least partially adhered to the members, the contraction of the separator also exerts a force to pull a surface of the members of the population of cathode structures 112 that is at least partially adhered to the microporous separator, thereby causing the members to expand in size. That is, the at least partial adhesion of the separator 130 to the members of the population of cathode structures 112 and/or anode structure 110 may thus cause the cathode structure population members 112 to expand in concert with contraction of the members of the population of anode structures 110 during discharge of the secondary battery 102, for example such that the cathode structure population members 112 expand in size in a manner that is inversely related to the contraction in size of the anode structure population members 110. In one embodiment, the initial formation stage comprises charging the secondary battery 102 such that the members of the population of anode structures 110 expand and compress the microporous separator 130 against the members of the population of cathode structures 112 at a pressure sufficient to at least partially fuse a polymeric material of the microporous separator at a surface of the microporous separator 130, to a polymeric matrix material at a contacting surface of the cathode active material layer 138 of the cathode structure 112, and to a contacting surface of the anode structure 110, such that the cathode active material layer 138 expands and/or contracts in concert with flexing and/or contracting of the separator, during cycling of the secondary battery 102.

In one embodiment, the initial formation stage comprises charging the secondary battery such that members of the population of anode structures expand and exert a pressure to compress the microporous separators 130 against members of the population of cathode structures and/or anode structures at a pressure of at least 1,000 psi. In another embodiment, the microporous separators are compressed against the members of the cathode structure population and/or anode structure population during the initial formation stage at a pressure of at least 3,000 psi. In yet another embodiment, the microporous separators are compressed against the members of the population of cathode structures and/or anode structures during the initial formation stage at a pressure of at least 5,000 psi. In yet another embodiment, the microporous separators are compressed against the members of the population of cathode structures and/or anode structures during the initial formation stage at a pressure of at least 10,000 psi.

Embodiments of the energy storage device 100 such as the secondary battery 102 and components thereof, having the compressible cathode structures 112, are described in further detail below.

Electrode Assembly

Referring again to FIGS. 1A-1B, in one embodiment, an interdigitated electrode assembly 106 includes a population of anode structures 110, a population of cathode structures 112, and an electrically insulating microporous separator 130 electrically insulating the anode structures 110 from the cathode structures 112. In one embodiment, the anode structures 110 comprise an anode active material layer 132, an anode backbone 134 that supports the anode active material layer 132, and an anode current collector 136, which may be an ionically porous current collector to allow ions to pass therethrough, as shown in the embodiment depicted in FIG. 7. Similarly, in one embodiment, the cathode structures 112 comprise a cathode active material layer 138, a cathode current collector 140, and a cathode backbone 141 that supports one or more of the cathode current collector 140 and/or the cathode active material layer 138, as shown for example in the embodiment depicted in FIG. 7. The electrically insulating microporous separator 130 allows carrier ions to pass therethrough during charge and/or discharge processes, to travel between the anode structures 110 and cathode structures 112 in the electrode assembly 106. Furthermore, it should be understood that the anode and cathode structures 110 and 112, respectively, are not limited to the specific embodiments and structures described herein, and other configurations, structures, and/or materials other than those specifically described herein can also be provided to form the anode structures 110 and cathode structures 112. For example, the anode and cathode structures 110, 112 can be provided in a form where the structures are substantially absent any anode and/or cathode backbones 134, 141, such as in a case where the region of the anode and/or cathode structures 110, 112 that would contain the backbones is instead made up of anode active material and/or cathode active material.

According to the embodiment as shown in FIGS. 1A-1B, the members of the anode and cathode structure populations 110 and 112, respectively, are arranged in alternating sequence, with a direction of the alternating sequence corresponding to the stacking direction D. The electrode assembly 106 according to this embodiment further comprises mutually perpendicular longitudinal, transverse, and vertical axes, with the longitudinal axis $A_{EA}$ generally corresponding or parallel to the stacking direction D of the members of the electrode and counter-electrode structure populations. As shown in the embodiment in FIG. 1A, the longitudinal axis $A_{EA}$ is depicted as corresponding to the Y axis, the transverse axis is depicted as corresponding to the X axis, and the vertical axis is depicted as corresponding to the Z axis.

Further, the electrode assembly 106 has a maximum width $W_{EA}$ measured in the longitudinal direction (i.e., along the y-axis), a maximum length $L_{EA}$ bounded by the lateral surface and measured in the transverse direction (i.e., along the x-axis), and a maximum height $H_{EA}$ also bounded by the lateral surface and measured in the vertical direction (i.e., along the z-axis). The maximum width $W_{EA}$ can be understood as corresponding to the greatest width of the electrode assembly 106 as measured from opposing points of the longitudinal end surfaces 116, 118 of the electrode assembly 106 where the electrode assembly is widest in the longitudinal direction. For example, referring to the embodiment of the electrode assembly 106 in FIG. 1A, the maximum width $W_{EA}$ can be understood as corresponding simply to the width of the assembly 106 as measured in the longitudinal direction. However, referring to the embodiment of the electrode assembly 106 shown in FIG. 5H, it can be seen that the maximum width $W_{EA}$ corresponds to the width of the electrode assembly as measured from the two opposing points 300a, 300b, where the electrode assembly is widest in the longitudinal direction, as opposed to a width as measured from opposing points 301a, 301b where the electrode assembly 106 is more narrow. Similarly, the maximum length $L_{EA}$ can be understood as corresponding to the greatest length of the electrode assembly as measured from opposing points of the lateral surface 142 of the electrode assembly 106 where the electrode assembly is longest in the transverse direction. Referring again to the embodiment in FIG. 1A, the maximum length $L_{EA}$ can be understood as simply the length of the electrode assembly 106, whereas in the embodiment shown in FIG. 5H, the maximum length $L_{EA}$ corresponds to the length of the electrode assembly as measured from two opposing points 302a, 302b, where the electrode assembly is longest in the transverse direction, as opposed to a length as measured from opposing points 303a, 303b where the electrode assembly is shorter. Along similar lines, the maximum height $H_{EA}$ can be understood as corresponding to the greatest height of the electrode assembly as measured from opposing points of the lateral surface 143 of the electrode assembly where the electrode assembly is highest in the vertical direction. That is, in the embodiment shown in FIG. 1A, the maximum height $H_{EA}$ is simply the height of the electrode assembly. While not specifically depicted in the embodiment shown in FIG. 5H, if the electrode assembly had different heights at points across one or more of the longitudinal and transverse directions, then the maximum height $H_{EA}$ of the electrode assembly would be understood to correspond to the height of the electrode assembly as measured from two opposing points where the electrode assembly is highest in the vertical direction, as opposed to a height as measured from opposing points where the electrode assembly is shorter, as analogously described for the maximum width $W_{EA}$ and maximum length $L_{EA}$. The maximum length $L_{EA}$, maximum width $W_{EA}$, and maximum height $H_{EA}$ of the electrode assembly 106 may vary depending upon the energy storage device 100 and the intended use thereof. For example, in one embodiment, the electrode assembly 106 may include maximum lengths $L_{EA}$, widths $W_{EA}$, and heights $H_{EA}$ typical of conventional secondary battery dimensions. By way of further example, in one embodiment, the electrode assembly 106 may include maximum lengths $L_{EA}$, widths $W_{EA}$, and heights $H_{EA}$ typical of thin-film battery dimensions.

In some embodiments, the dimensions $L_{EA}$, $W_{EA}$, and $H_{EA}$ are selected to provide an electrode assembly 106 having a maximum length $L_{EA}$ along the transverse axis (X axis) and/or a maximum width $W_{EA}$ along the longitudinal axis (Y axis) that is longer than the maximum height $H_{EA}$ along the vertical axis (Z axis). For example, in the embodiment shown in FIG. 1A, the dimensions $L_{EA}$, $W_{EA}$, and $H_{EA}$ are selected to provide an electrode assembly 106 having the greatest dimension along the transverse axis (X axis) that is orthogonal with electrode structure stacking direction D, as well as along the longitudinal axis (Y axis) coinciding with the electrode structure stacking direction D. That is, the maximum length $L_{EA}$ and/or maximum width $W_{EA}$ may be greater than the maximum height $H_{EA}$. For example, in one embodiment, a ratio of the maximum length $L_{EA}$ to the maximum height $H_{EA}$ may be at least 2:1. By way of further example, in one embodiment a ratio of the maximum length $L_{EA}$ to the maximum height $H_{EA}$ may be at least 5:1. By way of further example, in one embodiment, the ratio of the maximum length $L_{EA}$ to the maximum height $H_{EA}$ may be at least 10:1. By way of further example, in one embodiment, the ratio of the maximum length $L_{EA}$ to the maximum height $H_{EA}$ may be at least 15:1. By way of further example, in one embodiment, the ratio of the maximum length $L_{EA}$ to the maximum height $H_{EA}$ may be at least 20:1. The ratios of the different dimensions may allow for optimal configurations within an energy storage device to maximize the amount of active materials, thereby increasing energy density.

In some embodiments, the maximum width $W_{EA}$ may be selected to provide a width of the electrode assembly 106 that is greater than the maximum height $H_{EA}$. For example, in one embodiment, a ratio of the maximum width $W_{EA}$ to the maximum height $H_{EA}$ may be at least 2:1. By way of further example, in one embodiment, the ratio of the maximum width $W_{EA}$ to the maximum height $H_{EA}$ may be at least 5:1. By way of further example, in one embodiment, the ratio of the maximum width $W_{EA}$ to the maximum height $H_{EA}$ may be at least 10:1. By way of further example, in one embodiment, the ratio of the maximum width $W_{EA}$ to the maximum height $H_{EA}$ may be at least 15:1. By way of further example, in one embodiment, the ratio of the maximum width $W_{EA}$ to the maximum height $H_{EA}$ may be at least 20:1.

According to one embodiment, a ratio of the maximum width $W_{EA}$ to the maximum length $L_{EA}$ may be selected to be within a predetermined range that provides for an optimal configuration. For example, in one embodiment, a ratio of the maximum width $W_{EA}$ to the maximum length $L_{EA}$ may be in the range of from 1:5 to 5:1. By way of further example, in one embodiment a ratio of the maximum width $W_{EA}$ to the maximum length $L_{EA}$ may be in the range of from 1:3 to 3:1. By way of yet a further example, in one embodiment a ratio of the maximum width $W_{EA}$ to the maximum length $L_{EA}$ may be in the range of from 1:2 to 2:1.

In the embodiment as shown in FIG. 1A, the electrode assembly 106 has the first longitudinal end surface 116 and the opposing second longitudinal end surface 118 that is separated from the first longitudinal end surface 116 along the longitudinal axis $A_{EA}$. The electrode assembly 106 further comprises a lateral surface 142 that at least partially surrounds the longitudinal axis $A_{EA}$, and that connects the first and second longitudinal end surfaces 116, 118. In one embodiment, the maximum width $W_{EA}$ is the dimension along the longitudinal axis $A_{EA}$ as measured from the first longitudinal end surface 116 to the second longitudinal end surface 118. Similarly, the maximum length $L_{EA}$ may be bounded by the lateral surface 142, and in one embodiment, may be the dimension as measured from opposing first and second regions 144, 146 of the lateral surface 142 along the transverse axis that is orthogonal to the longitudinal axis. The maximum height $H_{EA}$, in one embodiment, may be bounded by the lateral surface 142 and may be measured from opposing first and second regions 148, 150 of the lateral surface 142 along the vertical axis that is orthogonal to the longitudinal axis.

For the purposes of clarity, only four anode structures 110 and four cathode structures 112 are illustrated in the embodiment shown in FIG. 1A. For example, the alternating sequence of members of the anode and cathode structure populations 110 and 112, respectively, may include any number of members for each population, depending on the energy storage device 100 and the intended use thereof, and the alternating sequence of members of the anode and cathode structure populations 110 and 112 may be interdigitated, for example, as shown in FIG. 1A. By way of further example, in one embodiment, each member of the population of anode structures 110 may reside between two members of the population of cathode structures 112, with the exception of when the alternating sequence terminates along the stacking direction, D. By way of further example, in one embodiment, each member of the population of cathode structures 112 may reside between two members of the population of anode structures 110, with the exception of when the alternating sequence terminates along the stacking direction, D. By way of further example, in one embodiment, and stated more generally, the population of anode structures 110 and the population of cathode structures 112 each have N members, each of N-1 anode structure members 110 is between two cathode structure members 112, each of N-1 cathode structure members 112 is between two anode structure members 110, and N is at least 2. By way of further example, in one embodiment, N is at least 4. By way of further example, in one embodiment, N is at least 5. By way of further example, in one embodiment, N is at least 10. By way of further example, in one embodiment, N is at least 25. By way of further example, in one embodiment, N is at least 50. By way of further example, in one embodiment, N is at least 100 or more. In one embodiment, members of the anode and/or cathode populations extend sufficiently from an imaginary backplane (e.g., a plane substantially coincident with a surface of the anode assembly) to have a surface area (ignoring porosity) that is greater than twice the geometrical footprint (i.e., projection) of the members in the backplane. In certain embodiments, the ratio of the surface area of a non-laminar (i.e., three-dimensional) anode and/or cathode structure to its geometric footprint in the imaginary backplane may be at least about 5, at least about 10, at least about 50, at least about 100, or even at least about 500. In general, however, the ratio will be between about 2 and about 1000. In one such embodiment, members of the anode population are non-laminar in nature. By way of further example, in one such embodiment, members of the cathode population are non-laminar in nature. By way of further example, in one such embodiment, members of the anode population and members of the cathode population are non-laminar in nature.

According to one embodiment, the electrode assembly 106 has longitudinal ends 117, 119 at which the electrode assembly 106 terminates. According to one embodiment, the alternating sequence of anode and cathode structures 110, 112, respectively, in the electrode assembly 106 terminates in a symmetric fashion along the longitudinal direction, such as with anode structures 110 at each end 117, 119 of the electrode assembly 106 in the longitudinal direction, or with cathode structures 112 at each end 117, 119 of the electrode assembly 106, in the longitudinal direction. In another embodiment, the alternating sequence of anode 110 and cathode structures 112 may terminate in an asymmetric fashion along the longitudinal direction, such as with an anode structure 110 at one end 117 of the longitudinal axis $A_{EA}$, and a cathode structure 112 at the other end 119 of the longitudinal axis $A_{EA}$. According to yet another embodiment, the electrode assembly 106 may terminate with a substructure of one or more of an anode structure 110 and/or cathode structure 112 at one or more ends 117, 119 of the electrode assembly 106. By way of example, according to one embodiment, the alternating sequence of the anode 110 and cathode structures 112 can terminate at one or more substructures of the anode 110 and cathode structures 112, including an anode backbone 134, cathode backbone 141, anode current collector 136, cathode current collector 140, anode active material layer 132, cathode active material layer 138, and the like, and may also terminate with a structure such as the separator 130, and the structure at each longitudinal end 117, 119 of the electrode assembly 106 may be the same (symmetric) or different (asymmetric). The longitudinal terminal ends 117, 119 of the electrode assembly 106 can comprise the first and second longitudinal end surfaces 116, 118 that are contacted by the first and second primary growth constraints 154, 156 to constrain overall growth of the electrode assembly 106.

According to yet another embodiment, the electrode assembly 106 has first and second transverse ends 145, 147 (see, e.g., FIG. 1A) that may contact one or more electrode and/or counter electrode tabs 190, 192 (see, e.g., FIG. 9) that may be used to electrically connect the electrode and/or counter-electrode structures 110, 112 to a load and/or a voltage supply (not shown). For example, the electrode assembly 106 can comprise an electrode bus 194 (see, e.g., FIG. 1A), to which each anode structure 110 can be connected, and that pools current from each member of the population of electrode structures 110. Similarly, the electrode assembly 106 can comprise a cathode bus 196 to which each cathode structure 112 may be connected, and that pools current from each member of the population of cathode structures 112. The anode and/or cathode buses 194, 196 each have a length measured in direction D, and extending substantially the entire length of the interdigitated series of anode structures 110, 112. In the embodiment illustrated in FIG. 9, the anode tab 190 and/or cathode tab 192 includes anode tab extensions 191, 193 which electrically connect with, and run substantially the entire length of anode and/or cathode bus 194, 196. Alternatively, the anode and/or cathode tabs 190, 192 may directly connect to the anode and/or cathode bus 194, 196, for example, an end or position intermediate thereof along the length of the buses 194, 196, without requiring the tab extensions 191, 193. Accordingly, in one embodiment, the anode and/or cathode buses 194, 196 can form at least a portion of the terminal ends 145, 147 of the electrode assembly 106 in the transverse direction, and connect the electrode assembly to the tabs 190, 192 for electrical connection to a load and/or voltage supply (not shown). Furthermore, in yet another embodiment, the electrode assembly 106 comprises first and second terminal ends 149, 153 disposed along the vertical (Z) axis. For example, according to one embodiment, each anode 110 and/or cathode structure 112, is provided with a top and bottom coating of separator material, as shown in FIG. 1A, where the coatings form the terminal ends 149, 153 of the electrode assembly 106 in the vertical direction. The terminal ends 149, 153 that may be formed of the coating of separator material can comprise first and second surface regions 148, 150 of the lateral surface 142 along the vertical axis that can be placed in contact with the first and second secondary growth constraints 158, 160 to constrain growth in the vertical direction.

In general, the electrode assembly 106 can comprise longitudinal end surfaces 116, 118 that are planar, co-planar, or non-planar. For example, in one embodiment the opposing longitudinal end surfaces 116, 118 may be convex. By way of further example, in one embodiment the opposing longitudinal end surfaces 116, 118 may be concave. By way of further example, in one embodiment the opposing longitudinal end surfaces 116, 118 are substantially planar. In certain embodiments, electrode assembly 106 may include opposing longitudinal end surfaces 116, 118 having any range of two-dimensional shapes when projected onto a plane. For example, the longitudinal end surfaces 116, 118 may independently have a smooth curved shape (e.g., round, elliptical, hyperbolic, or parabolic), they may independently include a series of lines and vertices (e.g., polygonal), or they may independently include a smooth curved shape and include one or more lines and vertices. Similarly, the lateral surface 142 of the electrode assembly 106 may be a smooth curved shape (e.g., the electrode assembly 106 may have a round, elliptical, hyperbolic, or parabolic cross-sectional shape) or the lateral surface 142 may include two or more lines connected at vertices (e.g., the electrode assembly 106 may have a polygonal cross-section). For example, in one embodiment, the electrode assembly 106 has a cylindrical, elliptic cylindrical, parabolic cylindrical, or hyperbolic cylindrical shape. By way of further example, in one such embodiment, the electrode assembly 106 may have a prismatic shape, having opposing longitudinal end surfaces 116, 118 of the same size and shape and a lateral surface 142 (i.e., the faces extending between the opposing longitudinal end surfaces 116 and 118) being parallelogram-shaped. By way of further example, in one such embodiment, the electrode assembly 106 has a shape that corresponds to a triangular prism, the electrode assembly 106 having two opposing triangular longitudinal end surfaces 116 and 118 and a lateral surface 142 consisting of three parallelograms (e.g., rectangles) extending between the two longitudinal ends. By way of further example, in one such embodiment, the electrode assembly 106 has a shape that corresponds to a rectangular prism, the electrode assembly 106 having two opposing rectangular longitudinal end surfaces 116 and 118, and a lateral surface 142 comprising four parallelogram (e.g., rectangular) faces. By way of further example, in one such embodiment, the electrode assembly 106 has a shape that corresponds to a pentagonal prism, hexagonal prism, etc. wherein the electrode assembly 106 has two pentagonal, hexagonal, etc., respectively, opposing longitudinal end surfaces 116 and 118, and a lateral surface comprising five, six, etc., respectively, parallelograms (e.g., rectangular) faces.

Figure 5C:
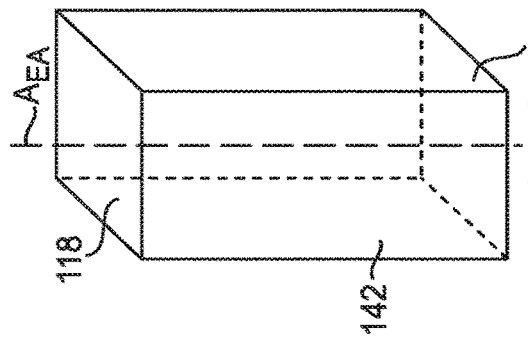
FIGS. 5A-5H show exemplary embodiments of different shapes and sizes for an electrode assembly.
Figure 5E:
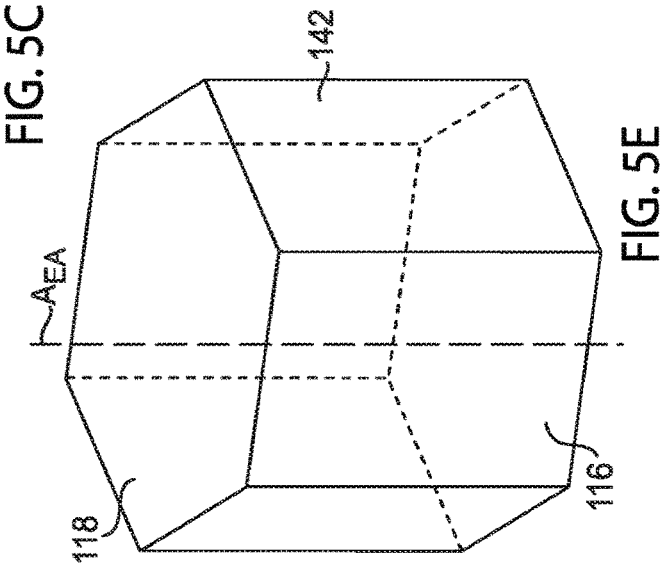
Figure 5B:
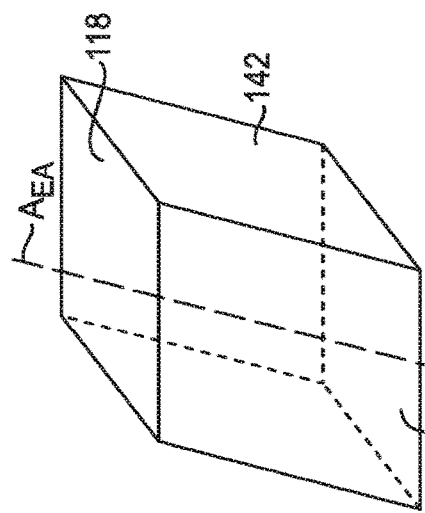
Figure 5D:
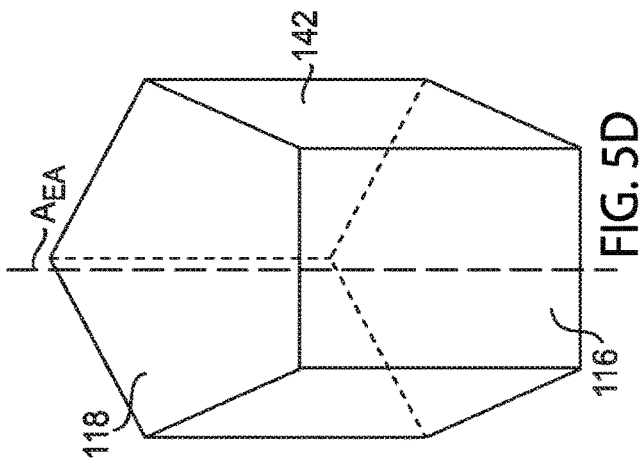
Figure 5A:
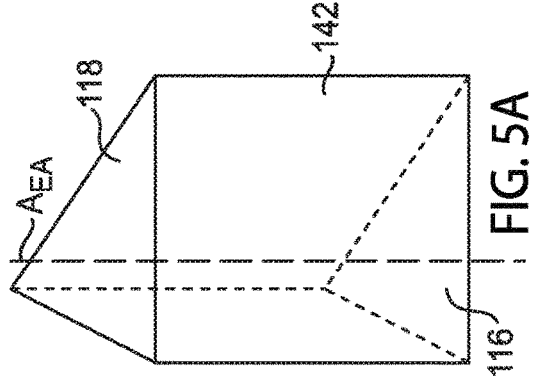
Figure 5F:
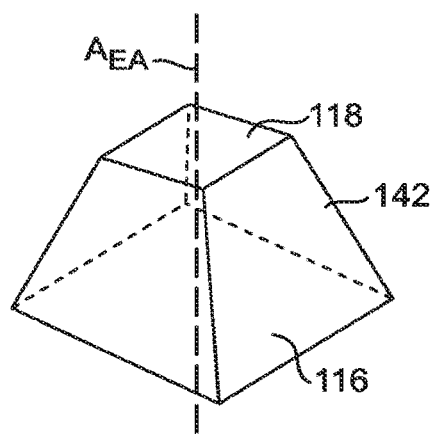
Figure 5G:
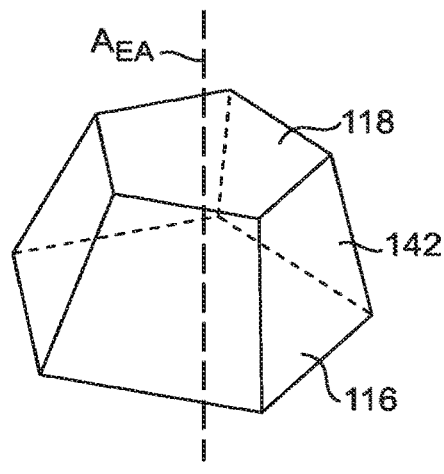
Figure 5H:
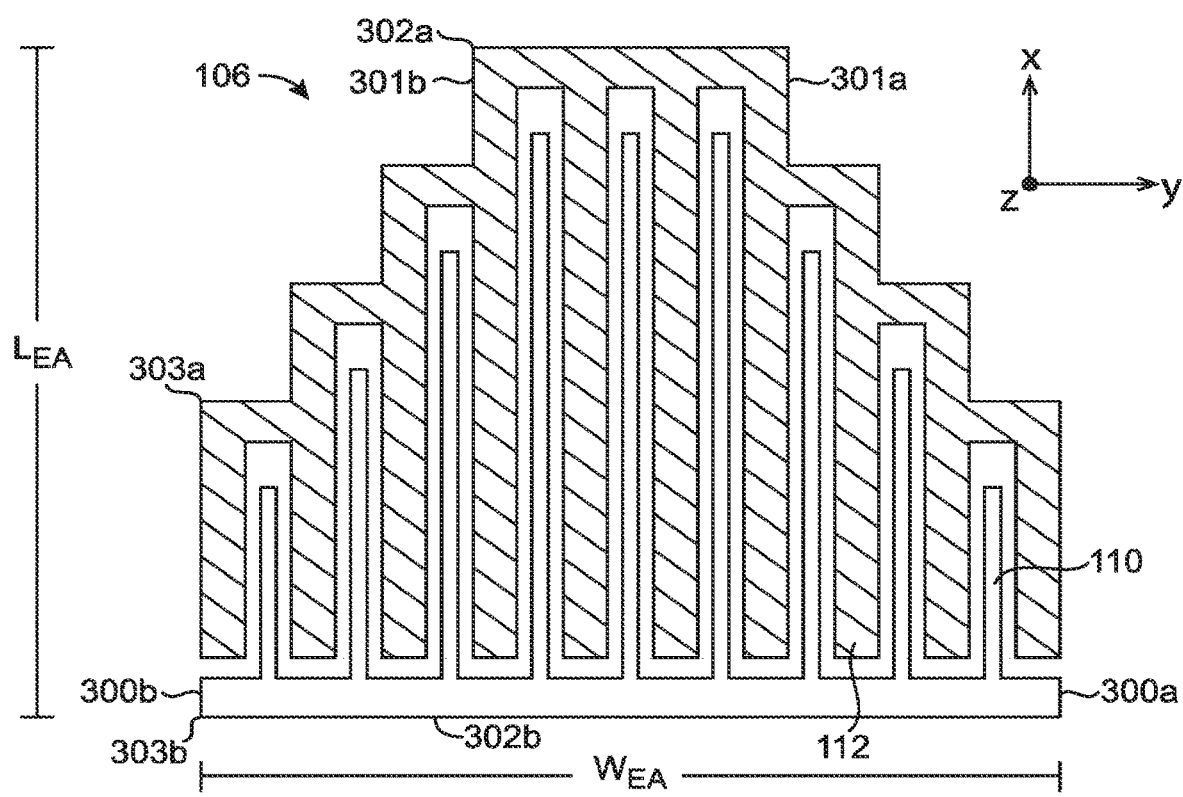

Referring now to FIGS. 5A-5H, several exemplary geometric shapes are schematically illustrated for electrode assembly 106. More specifically, in FIG. 5A, electrode assembly 106 has a triangular prismatic shape with opposing first and second longitudinal end surfaces 116, 118 separated along longitudinal axis $A_{EA}$, and a lateral surface 142 including the three rectangular faces connecting the longitudinal end surfaces 116, 118, that are about the longitudinal axis $A_{EA}$. In FIG. 5B, electrode assembly 106 has a parallelopiped shape with opposing first and second parallelogram longitudinal end surfaces 116, 118 separated along longitudinal axis $A_{EA}$, and a lateral surface 142 including the four parallelogram-shaped faces connecting the two longitudinal end surfaces 116, 118, and surrounding longitudinal axis $A_{EA}$. In FIG. 5C, electrode assembly 106 has a rectangular prism shape with opposing first and second rectangular longitudinal end surfaces 116, 118 separated along longitudinal axis $A_{EA}$, and a lateral surface 142 including the four rectangular faces connecting the two longitudinal end surfaces 116, 118 and surrounding longitudinal axis $A_{EA}$. In FIG. 5D, electrode assembly 106 has a pentagonal prismatic shape with opposing first and second pentagonal longitudinal end surfaces 116, 118 separated along longitudinal axis $A_{EA}$, and a lateral surface 142 including the five rectangular faces connecting the two longitudinal end surfaces 116, 118 and surrounding longitudinal axis $A_{EA}$. In FIG. 5E, electrode assembly 106 has a hexagonal prismatic shape with opposing first and second hexagonal longitudinal end surfaces 116, 118 separated along longitudinal axis $A_{EA}$, and a lateral surface 142 including the six rectangular faces connecting the two longitudinal end surfaces 116, 118 and surrounding longitudinal axis $A_{EA}$. In FIG. 5F, the electrode assembly has a square pyramidal frustum shape with opposing first and second square end surfaces 116, 118 separated along longitudinal axis $A_{EA}$, and a lateral surface 142 including four trapezoidal faces connecting the two longitudinal end surfaces 116, 118 and surrounding longitudinal axis $A_{EA}$, with the trapezoidal faces tapering in dimension along the longitudinal axis from a greater dimension at the first surface 116 to a smaller dimension at the second surface 118, and the size of the second surface being smaller than that of the first surface. In FIG. 5G, the electrode assembly has a pentagonal pyramidal frustum shape with opposing first and second square end surfaces 116, 118 separated along longitudinal axis $A_{EA}$, and a lateral surface 142 including five trapezoidal faces connecting the two longitudinal end surfaces 116, 118 and surrounding longitudinal axis $A_{EA}$, with the trapezoidal faces tapering in dimension along the longitudinal axis from a greater dimension at the first surface 116 to a smaller dimension at the second surface 118, and the size of the second surface being smaller than that of the first surface. In FIG. 5H, the electrode assembly 106 has a pyramidal shape in the longitudinal direction, by virtue of electrode and counter-electrode structures 110, 112 having lengths that decrease from a first length towards the middle of the electrode assembly 106 on the longitudinal axis, to second lengths at the longitudinal ends 117, 119 of the electrode assembly 106.

Electrode Constraints

In one embodiment, a set of electrode constraints 108 is provided that that restrains overall macroscopic growth of the electrode assembly 106, as illustrated for example in FIGS. 1A-1B. The set of electrode constraints 108 may be capable of restraining growth of the electrode assembly 106 along one or more dimensions, such as to reduce swelling and deformation of the electrode assembly 106, and thereby improve the reliability and cycling lifetime of an energy storage device 100 having the set of electrode constraints 108. As discussed above, without being limited to any one particular theory, it is believed that carrier ions traveling between the anode structures 110 and cathode structures 112 during charging and/or discharging of a secondary battery 102 can become inserted into anode active material, causing the anode active material and/or the anode structure 110 to expand. This expansion of the anode structure 110 can cause the electrodes and/or electrode assembly 106 to deform and swell, thereby compromising the structural integrity of the electrode assembly 106, and/or increasing the likelihood of electrical shorting or other failures. In one example, excessive swelling and/or expansion and contraction of the anode active material layer 132 during cycling of an energy storage device 100 can cause fragments of anode active material to break away and/or delaminate from the anode active material layer 132, thereby compromising the efficiency and cycling lifetime of the energy storage device 100. In yet another example, excessive swelling and/or expansion and contraction of the anode active material layer 132 can cause anode active material to breach the electrically insulating microporous separator 130, thereby causing electrical shorting and other failures of the electrode assembly 106. Accordingly, the set of electrode constraints 108 inhibit this swelling or growth that can otherwise occur with cycling between charged and discharged states to improve the reliability, efficiency, and/or cycling lifetime of the energy storage device 100.

According to one embodiment, the set of electrode constraints 108 comprises a primary growth constraint system 151 to restrain growth and/or swelling along the longitudinal axis (e.g., Y-axis in FIGS. 1A-1B) of the electrode assembly 106. In another embodiment, the set of electrode constraints 108 may include a secondary growth constraint system 152 that restrains growth along the vertical axis (e.g., Z-axis in FIG. 1). In yet another embodiment, the set of electrode constraints 108 may include a tertiary growth constraint system 155 that restrains growth along the transverse axis (e.g., X-axis in FIG. 4C). In one embodiment, the set of electrode constraints 108 comprises primary growth and secondary growth constraint systems 151, 152, respectively, and even tertiary growth constraint systems 155 that operate cooperatively to simultaneously restrain growth in one or more directions, such as along the longitudinal and vertical axis (e.g., Y axis and Z axis), and even simultaneously along all of the longitudinal, vertical, and transverse axes (e.g., Y, Z, and X axes). For example, the primary growth constraint system 151 may restrain growth that can otherwise occur along the stacking direction D of the electrode assembly 106 during cycling between charged and discharged states, while the secondary growth constraint system 152 may restrain swelling and growth that can occur along the vertical axis, to prevent buckling or other deformation of the electrode assembly 106 in the vertical direction. By way of further example, in one embodiment, the secondary growth constraint system 152 can reduce swelling and/or expansion along the vertical axis that would otherwise be exacerbated by the restraint on growth imposed by the primary growth constraint system 151. The tertiary growth constraint system 155 can also optionally reduce swelling and/or expansion along the transverse axis that could occur during cycling processes. That is, according to one embodiment, the primary growth and secondary growth constraint systems 151, 152, respectively, and optionally the tertiary growth constraint system 155, may operate together to cooperatively restrain multi-dimensional growth of the electrode assembly 106.

Figure 6A:
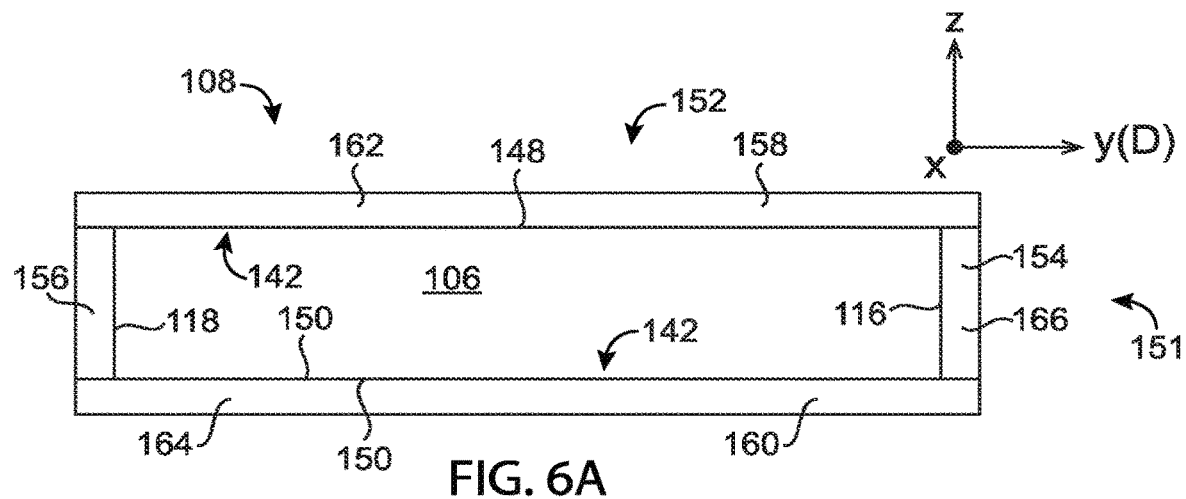
FIG. 6A illustrates a cross-section of an embodiment of the electrode assembly taken along the line A-A' as shown in FIG. 1B, and further illustrates elements of primary and secondary growth constraint systems.
Figure 6B:
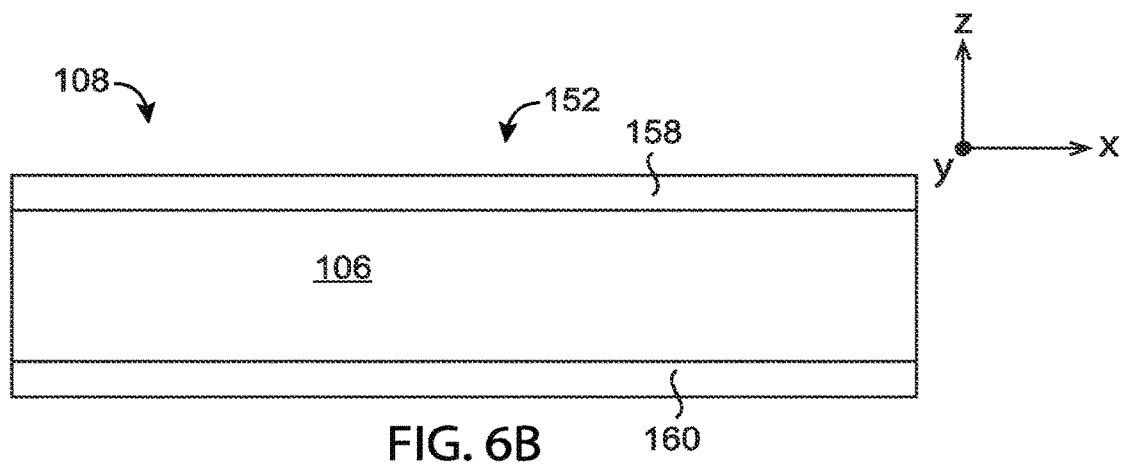
FIG. 6B illustrates a cross-section of an embodiment of the electrode assembly taken along the line B-B' as shown in FIG. 1B, and further illustrates elements of primary and secondary growth constraint systems.

Referring to FIGS. 6A-6B, an embodiment of a set of electrode constraints 108 is shown having a primary growth constraint system 151 and a secondary growth constraint system 152 for an electrode assembly 106. FIG. 6A shows a cross-section of the electrode assembly 106 in FIG. 1 taken along the longitudinal axis (Y axis), such that the resulting 2-D cross-section is illustrated with the vertical axis (Z axis) and longitudinal axis (Y axis). FIG. 6B shows a cross-section of the electrode assembly 106 in FIG. 1 taken along the transverse axis (X axis), such that the resulting 2-D cross-section is illustrated with the vertical axis (Z axis) and transverse axis (X axis). As shown in FIG. 6A, the primary growth constraint system 151 can generally comprise first and second primary growth constraints 154, 156, respectively, that are separated from one another along the longitudinal direction (Y axis). For example, in one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In yet another version, one or more of the first and second primary growth constraints 154, 156 may be interior to a longitudinal end 117, 119 of the electrode assembly 106, such as when one or more of the primary growth constraints comprise an internal structure of the electrode assembly 106. The primary growth constraint system 151 can further comprise at least one primary connecting member 162 that connects the first and second primary growth constraints 154, 156, and that may have a principal axis that is parallel to the longitudinal direction. For example, the primary growth constraint system 151 can comprise first and second primary connecting members 162, 164, respectively, that are separated from each other along an axis that is orthogonal to the longitudinal axis, such as along the vertical axis (Z axis) as depicted in the embodiment. The first and second primary connecting members 162, 164, respectively, can serve to connect the first and second primary growth constraints 154, 156, respectively, to one another, and to maintain the first and second primary growth constraints 154, 156, respectively, in tension with one another, so as to restrain growth along the longitudinal axis of the electrode assembly 106.

According to one embodiment, the set of electrode constraints 108 including the primary growth constraint system 151 may be capable of restraining growth of the electrode assembly 106 in the longitudinal direction (i.e., electrode stacking direction, D) such that any increase in the Feret diameter of the electrode assembly in the longitudinal direction over 20 consecutive cycles of the secondary battery is less than 20% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction such that any increase in the Feret diameter of the electrode assembly in the longitudinal direction over 500 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery to less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 20%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction such that any increase in the Feret diameter of the electrode assembly in the longitudinal direction over 800 consecutive cycles of the secondary battery is less than 10% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 10%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction over 5 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery, is less than 5. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 5% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 5% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 5%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction per cycle of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 5 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 1% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery to less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery to less than 1%.

By charged state it is meant that the secondary battery 102 is charged to at least 75% of its rated capacity, such as at least 80% of its rated capacity, and even at least 90% of its rated capacity, such as at least 95% of its rated capacity, and even 100% of its rated capacity. By discharged state it is meant that the secondary battery is discharged to less than 25% of its rated capacity, such as less than 20% of its rated capacity, and even less than 10%, such as less than 5%, and even 0% of its rated capacity. Furthermore, it is noted that the actual capacity of the secondary battery 102 may vary over time and with the number of cycles the battery has gone through. That is, while the secondary battery 102 may initially exhibit an actual measured capacity that is close to its rated capacity, the actual capacity of the battery will decrease over time, with the secondary battery 102 being considered to be at the end of its life when the actual capacity drops below 80% of the rated capacity as measured in going from a charged to a discharged state.

Further shown in FIGS. 6A and 6B, the set of electrode constraints 108 can further comprise the secondary growth constraint system 152, that can generally comprise first and second secondary growth constraints 158, 160, respectively, that are separated from one another along a second direction orthogonal to the longitudinal direction, such as along the vertical axis (Z axis) in the embodiment as shown. For example, in one embodiment, the first secondary growth constraint 158 at least partially extends across a first region 148 of the lateral surface 142 of the electrode assembly 106, and the second secondary growth constraint 160 at least partially extends across a second region 150 of the lateral surface 142 of the electrode assembly 106 that opposes the first region 148. In yet another version, one or more of the first and second secondary growth constraints 154, 156 may be interior to the lateral surface 142 of the electrode assembly 106, such as when one or more of the secondary growth constraints comprise an internal structure of the electrode assembly 106. In one embodiment, the first and second secondary growth constraints 158, 160, respectively, are connected by at least one secondary connecting member 166, which may have a principal axis that is parallel to the second direction, such as the vertical axis. The secondary connecting member 166 may serve to connect and hold the first and second secondary growth constraints 158, 160, respectively, in tension with one another, so as to restrain growth of the electrode assembly 106 along a direction orthogonal to the longitudinal direction, such as for example to restrain growth in the vertical direction (e.g., along the Z axis). In the embodiment depicted in FIG. 6A, the at least one secondary connecting member 166 can correspond to at least one of the first and second primary growth constraints 154, 156. However, the secondary connecting member 166 is not limited thereto, and can alternatively and/or in addition comprise other structures and/or configurations.

According to one embodiment, the set of constraints including the secondary growth constraint system 152 may be capable of restraining growth of the electrode assembly 106 in a second direction orthogonal to the longitudinal direction, such as the vertical direction (Z axis), such that any increase in the Feret diameter of the electrode assembly in the second direction over 20 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 20%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 20%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 20% between charged and discharged states.

In embodiment, the set of constraints including the secondary growth constraint system 152 may be capable of restraining growth of the electrode assembly 106 in the second direction such that any increase in the Feret diameter of the electrode assembly in the second direction over 10 consecutive cycles of the secondary battery is less than 10% between charged and discharged states. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 10%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 10%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 10%.

In embodiment, the set of constraints including the secondary growth constraint system 152 may be capable of restraining growth of the electrode assembly 106 in the second direction such that any increase in the Feret diameter of the electrode assembly in the second direction over 5 consecutive cycles of the secondary battery is less than 5% between charged and discharged states. By way of further example, in one embodiment the secondary growth constraint system 152 may be capable of restraining growth of the electrode assembly 106 in the second direction such that any increase in the Feret diameter of the electrode assembly in the second direction over 10 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 5%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 5%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 5%.

In embodiment, the set of constraints including the secondary growth constraint system 152 may be capable of restraining growth of the electrode assembly 106 in the second direction such that any increase in the Feret diameter of the electrode assembly in the second direction per cycle of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 5 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 10 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 1%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 1% between charged and discharged states. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 1%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 1%.

Figure 6C:
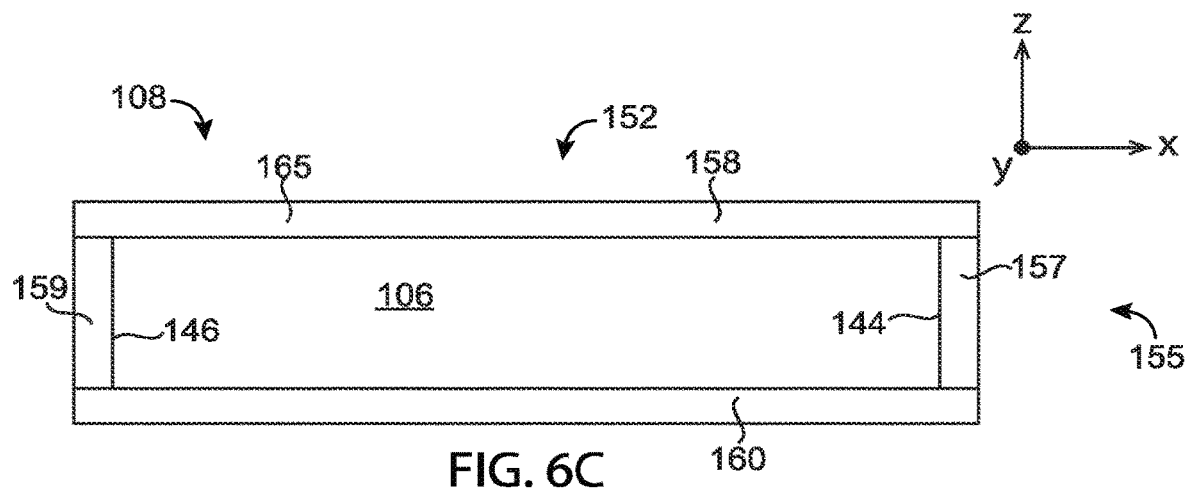
FIG. 6C illustrates a cross-section of an embodiment of the electrode assembly taken along the line B-B' as shown in FIG. 1B, and further illustrates elements of primary and secondary growth constraint systems.

FIG. 6C shows an embodiment of a set of electrode constraints 108 that further includes a tertiary growth constraint system 155 to constrain growth of the electrode assembly in a third direction that is orthogonal to the longitudinal and second directions, such as the transverse direction (X) direction. The tertiary growth constraint system 155 can be provided in addition to the primary and secondary growth constraint systems 151, 152, respectively, to constrain overall growth of the electrode assembly 106 in three dimensions, and/or may be provided in combination with one of the primary or secondary growth constraint systems 151, 152, respectively, to constrain overall growth of the electrode assembly 106 in two dimensions. FIG. 6C shows a cross-section of the electrode assembly 106 in FIG. 1A taken along the transverse axis (X axis), such that the resulting 2-D cross-section is illustrated with the vertical axis (Z axis) and transverse axis (X axis). As shown in FIG. 6C, the tertiary growth constraint system 155 can generally comprise first and second tertiary growth constraints 157, 159, respectively, that are separated from one another along the third direction such as the transverse direction (X axis). For example, in one embodiment, the first tertiary growth constraint 157 at least partially extends across a first region 144 of the lateral surface 142 of the electrode assembly 106, and the second tertiary growth constraint 159 at least partially extends across a second region 146 of the lateral surface 142 of the electrode assembly 106 that opposes the first region 144 in the transverse direction. In yet another version, one or more of the first and second tertiary growth constraints 157, 159 may be interior to the lateral surface 142 of the electrode assembly 106, such as when one or more of the tertiary growth constraints comprise an internal structure of the electrode assembly 106. In one embodiment, the first and second tertiary growth constraints 157, 159, respectively, are connected by at least one tertiary connecting member 165, which may have a principal axis that is parallel to the third direction. The tertiary connecting member 165 may serve to connect and hold the first and second tertiary growth constraints 157, 159, respectively, in tension with one another, so as to restrain growth of the electrode assembly 106 along a direction orthogonal to the longitudinal direction, for example, to restrain growth in the transverse direction (e.g., along the X axis). In the embodiment depicted in FIG. 6C, the at least one tertiary connecting member 165 can correspond to at least one of the first and second secondary growth constraints 158, 160. However, the tertiary connecting member 165 is not limited thereto, and can alternatively and/or in addition comprise other structures and/or configurations. For example, the at least one tertiary connecting member 165 can, in one embodiment, correspond to at least one of the first and second primary growth constraints 154, 156 (not shown).

According to one embodiment, the set of constraints having the tertiary growth constraint system 155 may be capable of restraining growth of the electrode assembly 106 in a third direction orthogonal to the longitudinal direction, such as the transverse direction (X axis), such that any increase in the Feret diameter of the electrode assembly in the third direction over 20 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 20%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 20%.

In one embodiment, the set of constraints having the tertiary growth constraint system 155 may be capable of restraining growth of the electrode assembly 106 in the third direction such that any increase in the Feret diameter of the electrode assembly in the third direction over 10 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 10%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 10% between charged and discharged states. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 10%.

In one embodiment, the set of constraints having the tertiary growth constraint system 155 may be capable of restraining growth of the electrode assembly 106 in the third direction such that any increase in the Feret diameter of the electrode assembly in the third direction over 5 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 10 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 5%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 5%.

In one embodiment, the set of constraints having the tertiary growth constraint system 155 may be capable of restraining growth of the electrode assembly 106 in the third direction such that any increase in the Feret diameter of the electrode assembly in the third direction per cycle of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 5 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 10 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 1%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 1% between charged and discharged states. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 1%.

According to one embodiment, the primary and secondary growth constraint systems 151, 152, respectively, and optionally the tertiary growth constraint system 155, are configured to cooperatively operate such that portions of the primary growth constraint system 151 cooperatively act as a part of the secondary growth constraint system 152, and/or portions of the secondary growth constraint system 152 cooperatively act as a part of the primary growth constraint system 151, and the portions of any of the primary and/or secondary constraint systems 151, 152, respectively, may also cooperatively act as a part of the tertiary growth constraint system, and vice versa. For example, in the embodiment shown in in FIGS. 6A and 6B, the first and second primary connecting members 162, 164, respectively, of the primary growth constraint system 151 can serve as at least a portion of, or even the entire structure of, the first and second secondary growth constraints 158, 160 that constrain growth in the second direction orthogonal to the longitudinal direction. In yet another embodiment, as mentioned above, one or more of the first and second primary growth constraints 154, 156, respectively, can serve as one or more secondary connecting members 166 to connect the first and second secondary growth constrains 158, 160, respectively. Conversely, at least a portion of the first and second secondary growth constraints 158, 160, respectively, can act as first and second primary connecting members 162, 164, respectively, of the primary growth constraint system 151, and the at least one secondary connecting member 166 of the secondary growth constraint system 152 can, in one embodiment, act as one or more of the first and second primary growth constraints 154, 156, respectively. In yet another embodiment, at least a portion of the first and second primary connecting members 162, 164, respectively, of the primary growth constraint system 151, and/or the at least one secondary connecting member 166 of the secondary growth constraint system 152 can serve as at least a portion of, or even the entire structure of, the first and second tertiary growth constraints 157, 159, respectively, that constrain growth in the transverse direction orthogonal to the longitudinal direction. In yet another embodiment, one or more of the first and second primary growth constraints 154, 156, respectively, and/or the first and second secondary growth constraints 158, 160, respectively, can serve as one or more tertiary connecting members 166 to connect the first and second tertiary growth constraints 157, 159, respectively. Conversely, at least a portion of the first and second tertiary growth constraints 157, 159, respectively, can act as first and second primary connecting members 162, 164, respectively, of the primary growth constraint system 151, and/or the at least one secondary connecting member 166 of the secondary growth constraint system 152, and the at least one tertiary connecting member 165 of the tertiary growth constraint system 155 can in one embodiment act as one or more of the first and second primary growth constraints 154, 156, respectively, and/or one or more of the first and second secondary growth constraints 158, 160, respectively. Alternatively and/or additionally, the primary and/or secondary and/or tertiary growth constraints can comprise other structures that cooperate to restrain growth of the electrode assembly 106. Accordingly, the primary and secondary growth constraint systems 151, 152, respectively, and optionally the tertiary growth constraint system 155, can share components and/or structures to exert restraint on the growth of the electrode assembly 106.

In one embodiment, the set of electrode constraints 108 can comprise structures such as the primary and secondary growth constraints, and primary and secondary connecting members, that are structures that are external to and/or internal to the battery enclosure 104, or may be a part of the battery enclosure 104 itself. For example, the set of electrode constraints 108 can comprise a combination of structures that includes the battery enclosure 104 as well as other structural components. In one such embodiment, the battery enclosure 104 may be a component of the primary growth constraint system 151 and/or the secondary growth constraint system 152; stated differently, in one embodiment, the battery enclosure 104, alone or in combination with one or more other structures (within and/or outside the battery enclosure 104, for example, the primary growth constraint system 151 and/or a secondary growth constraint system 152) restrains growth of the electrode assembly 106 in the electrode stacking direction D and/or in the second direction orthogonal to the stacking direction, D. For example, one or more of the primary growth constraints 154, 156 and secondary growth constraints 158, 160 can comprise a structure that is internal to the electrode assembly. In another embodiment, the primary growth constraint system 151 and/or secondary growth constraint system 152 does not include the battery enclosure 104, and instead one or more discrete structures (within and/or outside the battery enclosure 104) other than the battery enclosure 104 restrains growth of the electrode assembly 106 in the electrode stacking direction, D, and/or in the second direction orthogonal to the stacking direction, D. The electrode assembly 106 may be restrained by the set of electrode constraints 108 at a pressure that is greater than the pressure exerted by growth and/or swelling of the electrode assembly 106 during repeated cycling of an energy storage device 100 or a secondary battery having the electrode assembly 106.

In one exemplary embodiment, the primary growth constraint system 151 includes one or more discrete structure(s) within the battery enclosure 104 that restrains growth of the anode structure 110 in the stacking direction D by exerting a pressure that exceeds the pressure generated by the anode structure 110 in the stacking direction D upon repeated cycling of a secondary battery 102 having the anode structure 110 as a part of the electrode assembly 106. In another exemplary embodiment, the primary growth constraint system 151 includes one or more discrete structures within the battery enclosure 104 that restrains growth of the cathode structure 112 in the stacking direction D by exerting a pressure in the stacking direction D that exceeds the pressure generated by the anode structure 112 in the stacking direction D upon repeated cycling of a secondary battery 102 having the cathode structure 112 as a part of the electrode assembly 106. The secondary growth constraint system 152 can similarly include one or more discrete structures within the battery enclosure 104 that restrain growth of at least one of the anode structures 110 and cathode structures 112 in the second direction orthogonal to the stacking direction D, such as along the vertical axis (Z axis), by exerting a pressure in the second direction that exceeds the pressure generated by the anode or cathode structure 110, 112, respectively, in the second direction upon repeated cycling of a secondary battery 102 having the anode or cathode structures 110, 112, respectively.

In yet another embodiment, the first and second primary growth constraints 154, 156, respectively, of the primary growth constraint system 151 restrain growth of the electrode assembly 106 by exerting a pressure on the first and second longitudinal end surfaces 116, 118 of the electrode assembly 106, meaning, in a longitudinal direction, that exceeds a pressure exerted by the first and second primary growth constraints 154, 156 on other surfaces of the electrode assembly 106 that would be in a direction orthogonal to the longitudinal direction, such as opposing first and second regions of the lateral surface 142 of the electrode assembly 106 along the transverse axis and/or vertical axis. That is, the first and second primary growth constraints 154, 156 may exert a pressure in a longitudinal direction (Y axis) that exceeds a pressure generated thereby in directions orthogonal thereto, such as the transverse (X axis) and vertical (Z axis) directions. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 3. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D by a factor of at least 4. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

Similarly, in one embodiment, the first and second secondary growth constraints 158, 160, respectively, of the primary growth constraint system 151 restrain growth of the electrode assembly 106 by exerting a pressure on first and second opposing regions of the lateral surface 142 of the electrode assembly 106 in a second direction orthogonal to the longitudinal direction, such as first and second opposing surface regions along the vertical axis 148, 150, respectively (i.e., in a vertical direction), that exceeds a pressure exerted by the first and second secondary growth constraints 158, 160, respectively, on other surfaces of the electrode assembly 106 that would be in a direction orthogonal to the second direction. That is, the first and second secondary growth constraints 158, 160, respectively, may exert a pressure in a vertical direction (Z axis) that exceeds a pressure generated thereby in directions orthogonal thereto, such as the transverse (X axis) and longitudinal (Y axis) directions. For example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 by the secondary growth constraint system 152 in at least one, or even both, of the two directions that are perpendicular thereto, by a factor of at least 3. By way of further example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 by the secondary growth constraint system 152 in at least one, or even both, of the two directions that are perpendicular thereto, by a factor of at least 4. By way of further example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 in at least one, or even both, of the two directions that are perpendicular thereto, by a factor of at least 5.

In yet another embodiment, the first and second tertiary growth constraints 157, 159, respectively, of the tertiary growth constraint system 155 restrain growth of the electrode assembly 106 by exerting a pressure on first and second opposing regions of the lateral surface 142 of the electrode assembly 106 in a direction orthogonal to the longitudinal direction and the second direction, such as first and second opposing surface regions along the transverse axis 161, 163, respectively (i.e., in a transverse direction), that exceeds a pressure exerted by the tertiary growth constraint system 155 on other surfaces of the electrode assembly 106 that would be in a direction orthogonal to the transverse direction. That is, the first and second tertiary growth constraints 157, 159, respectively, may exert a pressure in a transverse direction (X axis) that exceeds a pressure generated thereby in directions orthogonal thereto, such as the vertical (Z axis) and longitudinal (Y axis) directions. For example, in one such embodiment, the tertiary growth constraint system 155 restrains growth of the electrode assembly 106 with a pressure on first and second opposing surface regions 144, 146 (i.e., in the transverse direction) that exceeds the pressure maintained on the electrode assembly 106 by the tertiary growth constraint system 155 in at least one, or even both, of the two directions that are perpendicular thereto, by a factor of at least 3. By way of further example, in one such embodiment, the tertiary growth constraint system 155 restrains growth of the electrode assembly 106 with a pressure on first and second opposing surface regions 144, 146, respectively (i.e., in the transverse direction), that exceeds the pressure maintained on the electrode assembly 106 by the tertiary growth constraint system 155 in at least one, or even both, of the two directions that are perpendicular thereto, by a factor of at least 4. By way of further example, in one such embodiment, the tertiary growth constraint system 155 restrains growth of the electrode assembly 106 with a pressure on first and second opposing surface regions 144, 146, respectively (i.e., in the transverse direction), that exceeds the pressure maintained on the electrode assembly 106 in at least one, or even both, of the two directions that are perpendicular thereto, by a factor of at least 5.

In one embodiment, the set of electrode constraints 108, which may include the primary growth constraint system 151, the secondary growth constraint system 152, and optionally the tertiary growth constraint system 155, is configured to exert pressure on the electrode assembly 106 along two or more dimensions thereof (e.g., along the longitudinal and vertical directions, and optionally along the transverse direction), with a pressure being exerted along the longitudinal direction by the set of electrode constraints 108 being greater than any pressure(s) exerted by the set of electrode constraints 108 in any of the directions orthogonal to the longitudinal direction (e.g., the Z and X directions). That is, when the pressure(s) exerted by the primary, secondary, and optionally tertiary growth constraint systems 151, 152, 155, respectively, making up the set of electrode constraints 108 are summed together, the pressure exerted on the electrode assembly 106 along the longitudinal axis exceeds the pressure(s) exerted on the electrode assembly 106 in the directions orthogonal thereto. For example, in one such embodiment, the set of electrode constraints 108 exerts a pressure on the first and second longitudinal end surfaces 116, 118 (i.e., in the stacking direction D) that exceeds the pressure maintained on the electrode assembly 106 by the set of electrode constraints 108 in at least one or even both of the two directions that are perpendicular to the stacking direction D, by a factor of at least 3. By way of further example, in one such embodiment, the set of electrode constraints 108 exerts a pressure on first and second longitudinal end surfaces 116, 118 (i.e., in the stacking direction D) that exceeds the pressure maintained on the electrode assembly 106 by the set of electrode constraints 108 in at least one, or even both, of the two directions that are perpendicular to the stacking direction D by a factor of at least 4. By way of further example, in one such embodiment, the set of electrode constraints 108 exerts a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

According to one embodiment, the first and second longitudinal end surfaces 116, 118, respectively, have a combined surface area that is less than a predetermined amount of the overall surface area of the entire electrode assembly 106. For example, in one embodiment, the electrode assembly 106 may have a geometric shape corresponding to that of a rectangular prism with first and second longitudinal end surfaces 116, 118, respectively, and a lateral surface 142 extending between the end surfaces 116, 118, respectively, that makes up the remaining surface of the electrode assembly 106, and that has opposing surface regions 144, 146 in the X direction (i.e., the side surfaces of the rectangular prism) and opposing surface regions 148, 150 in the Z direction (i.e., the top and bottom surfaces of the rectangular prism, wherein X, Y and Z are dimensions measured in directions corresponding to the X, Y, and Z axes, respectively). The overall surface area is thus the sum of the surface area covered by the lateral surface 142 (i.e., the surface area of the opposing surfaces 144, 146, 148, and 150 in X and Z), added to the surface area of the first and second longitudinal end surfaces 116, 118, respectively. In accordance with one aspect of the present disclosure, the sum of the surface areas of the first and second longitudinal end surfaces 116, 118, respectively, is less than 33% of the surface area of the total surface of the electrode assembly 106. For example, in one such embodiment, the sum of the surface areas of the first and second longitudinal end surfaces 116, 118, respectively, is less than 25% of the surface area of the total surface of the electrode assembly 106. By way of further example, in one embodiment, the sum of the surface areas of the first and second longitudinal end surfaces 116, 118, respectively, is less than 20% of the surface area of the total surface of the electrode assembly. By way of further example, in one embodiment, the sum of the surface areas of the first and second longitudinal end surfaces 116, 118, respectively, is less than 15% of the surface area of the total surface of the electrode assembly. By way of further example, in one embodiment, the sum of the surface areas of the first and second longitudinal end surfaces 116, 118, respectively, is less than 10% of the surface area of the total surface of the electrode assembly.

In yet another embodiment, the electrode assembly 106 is configured such that a surface area of a projection of the electrode assembly 106 in a plane orthogonal to the stacking direction (i.e., the longitudinal direction), is smaller than the surface areas of projections of the electrode assembly 106 onto other orthogonal planes. For example, referring to the electrode assembly 106 embodiment shown in FIG. 1A (e.g., a rectangular prism), it can be seen that surface area of a projection of the electrode assembly 106 into a plane orthogonal to the stacking direction (i.e., the X-Z plane) corresponds to $L_{EA} \times H_{EA}$. Similarly, a projection of the electrode assembly 106 into the Z-Y plane corresponds to $W_{EA} \times H_{EA}$, and a projection of the electrode assembly 106 into the X-Y plane corresponds to $L_{EA} \times W_{EA}$. Accordingly, the electrode assembly 106 is configured such that the stacking direction intersects the plane in which the projection having the smallest surface area lies. Accordingly, in the embodiment in FIG. 2, the electrode assembly 106 is positioned such that the stacking direction intersects the X-Z plane in which the smallest surface area projection corresponding to $H_{EA} \times L_{EA}$ lies. That is, the electrode assembly is positioned such that the projection having the smallest surface area (e.g., $H_{EA} \times L_{EA}$) is orthogonal to the stacking direction.

In yet another embodiment, the secondary battery 102 can comprise a plurality of electrode assemblies 106 that are stacked together to form an electrode stack, and can be constrained by one or more shared electrode constraints. For example, in one embodiment, at least a portion of one or more of the primary growth constraint system 151 and the secondary growth constraint system 152 can be shared by a plurality of electrode assemblies 106 forming the electrode assembly stack. By way of further example, in one embodiment, a plurality of electrode assemblies forming an electrode assembly stack may be constrained in a vertical direction by a secondary growth constraint system 152 having a first secondary growth constraint 158 at a top electrode assembly 106 of the stack, and a second secondary growth constraint 160 at a bottom electrode assembly 106 of the stack, such that the plurality of electrode assemblies 106 forming the stack are constrained in the vertical direction by the shared secondary growth constraint system. Similarly, portions of the primary growth constraint system 151 could also be shared. Accordingly, in one embodiment, similarly to the single electrode assembly described above, a surface area of a projection of the stack of electrode assemblies 106 in a plane orthogonal to the stacking direction (i.e., the longitudinal direction), is smaller than the surface areas of projections of the stack of electrode assemblies 106 onto other orthogonal planes. That is, the plurality of electrode assemblies 106 may be configured such that the stacking direction (i.e., longitudinal direction) intersects and is orthogonal to a plane that has a projection of the stack of electrode assemblies 106 that is the smallest of all the other orthogonal projections of the electrode assembly stack.

Figure 7:
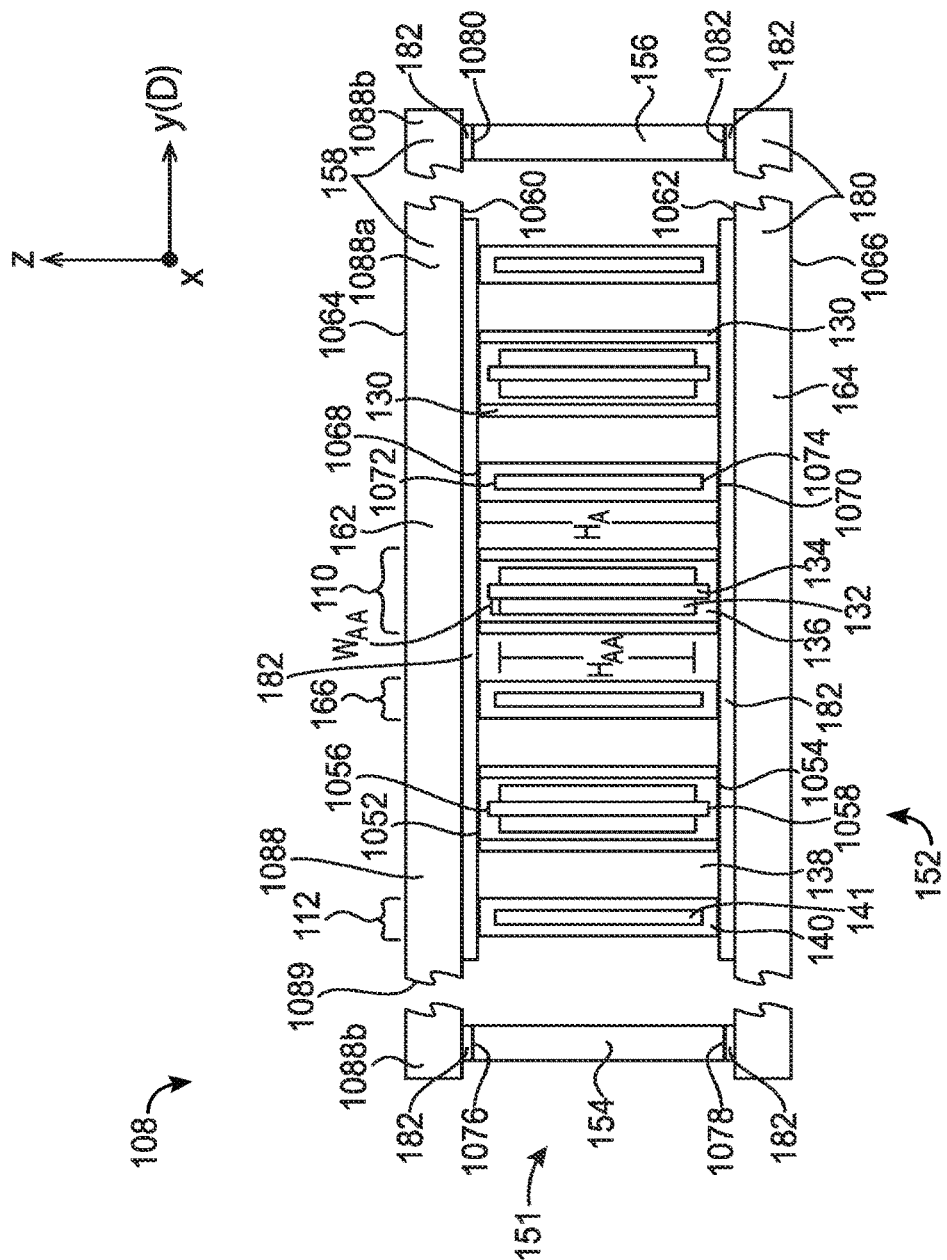
FIG. 7 illustrates a cross-section of an embodiment of the electrode assembly taken along the line A-A' as shown in FIG. 1B, further including a set of electrode constraints, including one embodiment of a primary constraint system and one embodiment of a secondary constraint system.

According to one embodiment, the electrode assembly 106 further comprises anode structures 110 that are configured such that a surface area of a projection of the anode structures 110 into a plane orthogonal to the stacking direction (i.e., the longitudinal direction), is larger than the surface areas of projections of the electrode structures 100 onto other orthogonal planes. For example, referring to the embodiments as shown in FIGS. 1A and 7, the anodes 110 can each be understood to have a length $L_A$ measured in the transverse direction, a width $W_A$ measured in the longitudinal direction, and a height $H_A$ measured in the vertical direction. The projection into the X-Z plane as shown in FIGS. 1A and 7 thus has a surface area $L_A \times H_A$, the projection into the Y-Z plane has a surface area $W_A \times H_A$, and the projection into the XY plane has a surface area $L_A \times W_A$. Of these, the plane corresponding to the projection having the largest surface area is the one that is selected to be orthogonal to the stacking direction. Similarly, the anodes 110 may also be configured such that a surface area of a projection of the anode active material layer 132 into a plane orthogonal to the stacking direction is larger than the surface areas of projections of the electrode active material layer onto other orthogonal planes. For example, in the embodiments shown in FIGS. 1A and 7, the anode active material layer may have a length $L_{AA}$ measured in the transverse direction, a width $W_{AA}$ measured in the longitudinal direction, and a height $H_{AA}$ measured in the vertical direction, from the surface areas of projections can be calculated ($L_A$, $L_{AA}$, $W_A$, $W_{AA}$, $H_A$ and $H_{AA}$ may also correspond to the maximum of these dimensions, in a case where the dimensions of the anode structure and/or anode active material layer 132 vary along one or more axes). In one embodiment, by positioning the anode structures 110 such that the plane having the highest projection surface area of the anode structure 110 and/or anode active material layer 132 is orthogonal to the stacking direction, a configuration can be achieved whereby the surface of the anode structure 110 having the greatest surface area of anode active material faces the direction of travel of the carrier ions, and thus experiences the greatest growth during cycling between charged and discharged states due to intercalation and/or alloying.

In one embodiment, the anode structure 110 and electrode assembly 106 can be configured such that the largest surface area projection of the anode structure 110 and/or anode active material layer 132, and the smallest surface area projection of the electrode assembly 106 are simultaneously in a plane that is orthogonal to the stacking direction. For example, in a case as shown in FIGS. 1A and 7, where the projection of the anode active material layer 132 in the X-Z plane ($L_{AA} \times H_{AA}$) of the anode active material layer 132 is the highest, the anode structure 110 and/or anode active material layer 132 is positioned with respect to the smallest surface area projection of the electrode assembly ($L_{EA} \times H_{EA}$) such the projection plane for both projections is orthogonal to the stacking direction. That is, the plane having the greatest surface area projection of the anode structure 110 and/or anode active material is parallel to (and/or in the same plane with) the plane having the smallest surface area projection of the electrode assembly 106. In this way, according to one embodiment, the surfaces of the anode structures that are most likely to experience the highest volume growth, i.e., the surfaces having the highest content of anode active material layer, and/or surfaces that intersect (e.g., are orthogonal to) a direction of travel of carrier ions during charge/discharge of a secondary battery, face the surfaces of the electrode assembly 106 having the lowest surface area. An advantage of providing such a configuration may be that the growth constraint system used to constrain in this greatest direction of growth, e.g. along the longitudinal axis, can be implemented with growth constraints that themselves have a relatively small surface area, as compared to the area of other surfaces of the electrode assembly 106, thereby reducing the volume required for implementing a constraint system to restrain growth of the electrode assembly.

In one embodiment, the constraint system 108 occupies a relatively low volume % of the combined volume of the electrode assembly 106 and constraint system 108. That is, the electrode assembly 106 can be understood as having a volume bounded by its exterior surfaces (i.e., the displacement volume), namely the volume enclosed by the first and second longitudinal end surfaces 116, 118 and the lateral surface 42 connecting the end surfaces. Portions of the constraint system 108 that are external to the electrode assembly 106 (i.e., external to the longitudinal end surfaces 116, 118 and the lateral surface), such as where first and second primary growth constraints 154, 156 are located at the longitudinal ends 117, 119 of the electrode assembly 106, and first and second secondary growth constraints 158, 160 are at the opposing ends of the lateral surface 142, the portions of the constrain system 108 similarly occupy a volume corresponding to the displacement volume of the constraint system portions. Accordingly, in one embodiment, the external portions of the set of electrode constraints 108, which can include external portions of the primary growth constraint system 151 (i.e., any of the first and second primary growth constraints 154, 156 and at least one primary connecting member that are external, or external portions thereof), as well as external portions of the secondary growth constraint system 152 (i.e., any of the first and second secondary growth constraints 158, 160 and at least one secondary connecting member that are external, or external portions thereof) occupies no more than 80% of the total combined volume of the electrode assembly 106 and external portion of the set of electrode constraints 108. By way of further example, in one embodiment the external portions of the set of electrode constraints occupies no more than 60% of the total combined volume of the electrode assembly 106 and the external portion of the set of electrode constraints. By way of yet a further example, in one embodiment the external portion of the set of electrode constraints 106 occupies no more than 40% of the total combined volume of the electrode assembly 106 and the external portion of the set of electrode constraints. By way of yet a further example, in one embodiment the external portion of the set of electrode constraints 106 occupies no more than 20% of the total combined volume of the electrode assembly 106 and the external portion of the set of electrode constraints. In yet another embodiment, the external portion of the primary growth constraint system 151 (i.e., any of the first and second primary growth constraints 154, 156 and at least one primary connecting member that are external, or external portions thereof) occupies no more than 40% of the total combined volume of the electrode assembly 106 and the external portion of the primary growth constraint system 151. By way of further example, in one embodiment the external portion of the primary growth constraint system 151 occupies no more than 30% of the total combined volume of the electrode assembly 106 and the external portion of the primary growth constraint system 151. By way of yet a further example, in one embodiment the external portion of the primary growth constraint system 151 occupies no more than 20% of the total combined volume of the electrode assembly 106 and the external portion of the primary growth constraint system 151. By way of yet a further example, in one embodiment the external portion of the primary growth constraint system 151 occupies no more than 10% of the total combined volume of the electrode assembly 106 and the external portion of the primary growth constraint system 151. In yet another embodiment, the external portion of the secondary growth constraint system 152 (i.e., any of the first and second secondary growth constraints 158, 160 and at least one secondary connecting member that are external, or external portions thereof) occupies no more than 40% of the total combined volume of the electrode assembly 106 and the external portion of the secondary growth constraint system 152. By way of further example, in one embodiment, the external portion of the secondary growth constraint system 152 occupies no more than 30% of the total combined volume of the electrode assembly 106 and the external portion of the secondary growth constraint system 152. By way of yet another example, in one embodiment, the external portion of the secondary growth constraint system 152 occupies no more than 20% of the total combined volume of the electrode assembly 106 and the external portion of the secondary growth constraint system 152. By way of yet another example, in one embodiment, the external portion of the secondary growth constraint system 152 occupies no more than 10% of the total combined volume of the electrode assembly 106 and the external portion of the secondary growth constraint system 152.

According to one embodiment, a projection of the members of the anode and cathode populations onto first and second longitudinal end surfaces 116, 118 circumscribes a first and second projected area 2002a, 2002b. In general, first and second projected areas 2002a, 2002b will typically comprise a significant fraction of the surface area of the first and second longitudinal end surfaces 122, 124, respectively. For example, in one embodiment the first and second projected areas each comprise at least 50% of the surface area of the first and second longitudinal end surfaces, respectively. By way of further example, in one such embodiment the first and second projected areas each comprise at least 75% of the surface area of the first and second longitudinal end surfaces, respectively. By way of further example, in one such embodiment the first and second projected areas each comprise at least 90% of the surface area of the first and second longitudinal end surfaces, respectively.

In certain embodiments, the longitudinal end surfaces 116, 118 of the electrode assembly 106 will be under a significant compressive load. For example, in some embodiments, each of the longitudinal end surfaces 116, 118 of the electrode assembly 106 will be under a compressive load of at least 0.7 kPa (e.g., averaged over the total surface area of each of the longitudinal end surfaces, respectively). For example, in one embodiment, each of the longitudinal end surfaces 116, 118 of the electrode assembly 106 will be under a compressive load of at least 1.75 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 2.8 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 3.5 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 5.25 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 7 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 8.75 kPa (e.g., averaged over the total surface area of each of the longitudinal end surfaces, respectively). In general, however, the longitudinal end surfaces 116, 118 of the electrode assembly 106 will be under a compressive load of no more than about 10 kPa (e.g., averaged over the total surface area of each of the longitudinal end surfaces, respectively). The regions of the longitudinal end surface of the electrode assembly that are coincident with the projection of members of the electrode and counter-electrode populations onto the longitudinal end surfaces (i.e., the projected surface regions) may also be under the above compressive loads (as averaged over the total surface area of each projected surface region, respectively). In each of the foregoing exemplary embodiments, the longitudinal end surfaces 116, 118 of the electrode assembly 106 will experience such compressive loads when an energy storage device 100 having the electrode assembly 106 is charged to at least about 80% of its rated capacity.

According to one embodiment, the secondary growth constraint system 152 is capable of restraining growth of the electrode assembly 106 in the vertical direction (Z direction) by applying a restraining force at a predetermined value, and without excessive skew of the growth restraints. For example, in one embodiment, the secondary growth constraint system 152 may restrain growth of the electrode assembly 106 in the vertical direction by applying a restraining force to opposing vertical regions 148, 150 of greater than 1000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 5% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 3% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 1% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 in the vertical direction with less than 15% displacement at less than or equal to 10,000 psi and a skew of less than 0.2 mm/m after 50 battery cycles. By way of further example, in one embodiment, the secondary growth constraint system 152 may restrain growth of the electrode assembly 106 in the vertical direction by applying a restraining force to opposing vertical regions 148, 150 with less than 5% displacement at less than or equal to 10,000 psi and a skew of less than 0.2 mm/m after 150 battery cycles.

Figure 6D:
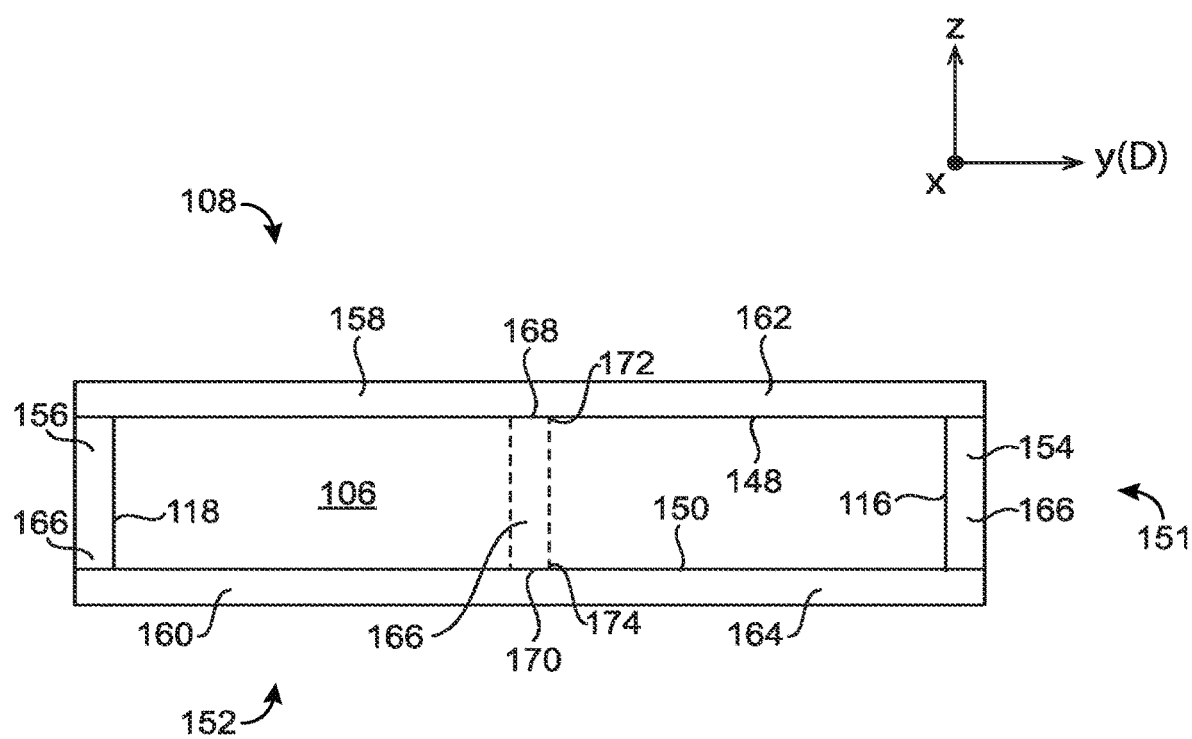
FIG. 6D illustrates a cross section of an embodiment of the electrode assembly taken along the line A-A1' as shown in FIG. 1B.

Referring now to FIG. 6D, an embodiment of an electrode assembly 106 with a set of electrode constraints 108 is shown, with a cross-section taken along the line A-A' as shown in FIG. 1B. In the embodiment shown in FIG. 6D, the primary growth constraint system 151 can comprise first and second primary growth constraints 154, 156, respectively, at the longitudinal end surfaces 116, 118 of the electrode assembly 106, and the secondary growth constraint system 152 comprises first and second secondary growth constraints 158, 160 at the opposing first and second surface regions 148, 150 of the lateral surface 142 of the electrode assembly 106. According to this embodiment, the first and second primary growth constraints 154, 156 can serve as the at least one secondary connecting member 166 to connect the first and second secondary growth constrains 158, 160 and maintain the growth constraints in tension with one another in the second direction (e.g., vertical direction) that is orthogonal to the longitudinal direction. However, additionally and/or alternatively, the secondary growth constraint system 152 can comprise at least one secondary connecting member 166 that is located at a region other than the longitudinal end surfaces 116, 118 of the electrode assembly 106. Also, the at least one secondary connecting member 166 can be understood to act as at least one of a first and second primary growth constraint 154, 156 that is internal to the longitudinal ends 116, 118 of the electrode assembly, and that can act in conjunction with either another internal primary growth restraint and/or a primary growth restraint at a longitudinal end 116, 118 of the electrode assembly 106 to restrain growth. Referring to the embodiment shown in FIG. 6D, a secondary connecting member 166 can be provided that is spaced apart along the longitudinal axis away from the first and second longitudinal end surfaces 116, 118, respectively, of the electrode assembly 106, such as toward a central region of the electrode assembly 106. The secondary connecting member 166 can connect the first and second secondary growth constraints 158, 160, respectively, at an interior position from the electrode assembly end surfaces 116, 118, and may be under tension between the secondary growth constraints 158, 160 at that position. In one embodiment, the secondary connecting member 166 that connects the secondary growth constraints 158, 160 at an interior position from the end surfaces 116, 118 is provided in addition to one or more secondary connecting members 166 provided at the electrode assembly end surfaces 116, 118, such as the secondary connecting members 166 that also serve as primary growth constraints 154, 156 at the longitudinal end surfaces 116, 118. In another embodiment, the secondary growth constraint system 152 comprises one or more secondary connecting members 166 that connect with first and second secondary growth constraints 158, 160, respectively, at interior positions that are spaced apart from the longitudinal end surfaces 116, 118, with or without secondary connecting members 166 at the longitudinal end surfaces 116, 118. The interior secondary connecting members 166 can also be understood to act as first and second primary growth constraints 154, 156, according to one embodiment. For example, in one embodiment, at least one of the interior secondary connecting members 166 can comprise at least a portion of an anode or cathode structure 110, 112, as described in further detail below.

More specifically, with respect to the embodiment shown in FIG. 6D, secondary growth constraint system 152 may include a first secondary growth constraint 158 that overlies an upper region 148 of the lateral surface 142 of electrode assembly 106, and an opposing second secondary growth constraint 160 that overlies a lower region 150 of the lateral surface 142 of electrode assembly 106, the first and second secondary growth constraints 158, 160 being separated from each other in the vertical direction (i.e., along the Z-axis). Additionally, secondary growth constraint system 152 may further include at least one interior secondary connecting member 166 that is spaced apart from the longitudinal end surfaces 116, 118 of the electrode assembly 106. The interior secondary connecting member 166 may be aligned parallel to the Z axis and connects the first and second secondary growth constraints 158, 160, respectively, to maintain the growth constraints in tension with one another, and to form at least a portion of the secondary constraint system 152. In one embodiment, the at least one interior secondary connecting member 166, either alone or with secondary connecting members 166 located at the longitudinal end surfaces 116, 118 of the electrode assembly 106, may be under tension between the first and secondary growth constraints 158, 160 in the vertical direction (i.e., along the Z axis), during repeated charge and/or discharge of an energy storage device 100 or a secondary battery 102 having the electrode assembly 106, to reduce growth of the electrode assembly 106 in the vertical direction. Furthermore, in the embodiment as shown in FIG. 5, the set of electrode constraints 108 further comprises a primary growth constraint system 151 having first and second primary growth constraints 154, 156, respectively, at the longitudinal ends 117, 119 of the electrode assembly 106, that are connected by first and second primary connecting members 162, 164, respectively, at the upper and lower lateral surface regions 148, 150, respectively, of the electrode assembly 106. In one embodiment, the secondary interior connecting member 166 can itself be understood as acting in concert with one or more of the first and second primary growth constraints 154, 156, respectively, to exert a constraining pressure on each portion of the electrode assembly 106 lying in the longitudinal direction between the secondary interior connecting member 166 and the longitudinal ends 117, 119 of the electrode assembly 106 where the first and second primary growth constraints 154, 156, respectively, can be located.

In one embodiment, one or more of the primary growth constraint system 151 and secondary growth constraint system 152 includes first and second primary growth constraints 154, 156, respectively, and/or first and second secondary growth constraints 158, 160, respectively, that include a plurality of constraint members. That is, each of the primary growth constraints 154, 156 and/or secondary growth constraints 158, 160 may be a single unitary member, or a plurality of members may be used to make up one or more of the growth constraints. For example, in one embodiment, the first and second secondary growth constraints 158, 160, respectively, can comprise single constraint members extending along the upper and lower surface regions 148, 150, respectively, of the electrode assembly lateral surface 142. In another embodiment, the first and second secondary growth constraints 158, 160, respectively, comprise a plurality of members extending across the opposing surface regions 148, 150, of the lateral surface. Similarly, the primary growth constraints 154, 156 may also be made of a plurality of members, or can each comprise a single unitary member at each electrode assembly longitudinal end 117, 119. To maintain tension between each of the primary growth constraints 154, 156 and secondary growth constraints 158, 160, the connecting members (e.g., 162, 164, 165, 166) are provided to connect the one or plurality of members comprising the growth constraints to the opposing growth constraint members in a manner that exerts pressure on the electrode assembly 106 between the growth constraints.

In one embodiment, the at least one secondary connecting member 166 of the secondary growth constraint system 152 forms areas of contact 168, 170 with the first and second secondary growth constraints 158, 160, respectively, to maintain the growth constraints in tension with one another. The areas of contact 168, 170 are those areas where the surfaces at the ends 172, 174 of the at least one secondary connecting member 166 touches and/or contacts the first and second secondary growth constraints 158, 160, respectively, such as where a surface of an end of the at least one secondary connecting member 166 is adhered or glued to the first and second secondary growth constraints 158, 160, respectively. The areas of contact 168, 170 may be at each end 172, 174 and may extend across a surface area of the first and second secondary growth constraints 158, 160, to provide good contact therebetween. The areas of contact 168, 170 provide contact in the longitudinal direction (Y axis) between the second connecting member 166 and the growth constraints 158, 160, and the areas of contact 168, 170 can also extend into the transverse direction (X-axis) to provide good contact and connection to maintain the first and second secondary growth constraints 158, 160 in tension with one another. In one embodiment, the areas of contact 168, 170 provide a ratio of the total area of contact (e.g., the sum of all areas 168, and the sum of all areas 170) of the one or more secondary connecting members 166 in the longitudinal direction (Y axis) with the growth constraints 158, 160, per $W_{EA}$ of the electrode assembly 106 in the longitudinal direction that is at least 1%. For example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction is at least 2%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 5%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 10%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 25%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 50%. In general, a ratio of the total area of contact of the one or more secondary connecting members 166 in the longitudinal direction (Y axis) with the growth constraints 158, 160, per $W_{EA}$ of the electrode assembly 106 in the longitudinal direction, will be less than 100%, such as less than 90%, and even less than 75%, as the one or more connecting members 166 typically do not have an area of contact 168, 170 that extends across the entire longitudinal axis. However, in one embodiment, an area of contact 168, 170 of the secondary connecting members 166 with the growth constraints 158, 160, may extend across a significant portion of the transverse axis (X axis), and may even extend across the entire $L_{EA}$ of the electrode assembly 106 in the transverse direction. For example, a ratio of the total area of contact (e.g., the sum of all areas 168, and the sum of all areas 170) of the one or more secondary connecting members 166 in the transverse direction (X axis) with the growth constraints 158, 160, per $L_{EA}$ of the electrode assembly 106 in the transverse direction, may be at least about 50%. By way of further example, a ratio of the total area of contact of the one or more secondary connecting members 166 in the transverse direction (X axis) with the growth constraints 158, 160, per $L_{EA}$ of the electrode assembly 106 in the transverse direction (X-axis), may be at least about 75%. By way of further example, a ratio of the total area of contact of the one or more secondary connecting members 166 in the transverse direction (X axis) with the growth constraints 158, 160, per $L_{EA}$ of the electrode assembly 106 in the transverse direction (X axis), may be at least about 90%. By way of further example, a ratio of the total area of contact of the one or more secondary connecting members 166 in the transverse direction (X axis) with the growth constraints 158, 160, per $L_{EA}$ of the electrode assembly 106 in the transverse direction (X axis), may be at least about 95%.

According to one embodiment, the areas of contact 168, 170 between the one or more secondary connecting members 166 and the first and second secondary growth constraints 158, 160, respectively, are sufficiently large to provide for adequate hold and tension between the growth constraints 158, 160 during cycling of an energy storage device 100 or a secondary battery 102 having the electrode assembly 106. For example, the areas of contact 168, 170 may form an area of contact with each growth constraint 158, 160 that makes up at least 2% of the surface area of the lateral surface 142 of the electrode assembly 106, such as at least 10% of the surface area of the lateral surface 142 of the electrode assembly 106, and even at least 20% of the surface area of the lateral surface 142 of the electrode assembly 106. By way of further example, the areas of contact 168, 170 may form an area of contact with each growth constraint 158, 160 that makes up at least 35% of the surface area of the lateral surface 142 of the electrode assembly 106, and even at least 40% of the surface area of the lateral surface 142 of the electrode assembly 106. For example, for an electrode assembly 106 having upper and lower opposing surface regions 148, 150, respectively, the at least one secondary connecting member 166 may form areas of contact 168, 170 with the growth constraints 158, 160 along at least 5% of the surface area of the upper and lower opposing surface regions 148, 150, respectively, such as along at least 10% of the surface area of the upper and lower opposing surface regions 148, 150, respectively, and even at least 20% of the surface area of the upper and lower opposing surface regions 148, 150, respectively. By way of further example, an electrode assembly 106 having upper and lower opposing surface regions 148, 150, respectively, the at least one secondary connecting member 166 may form areas of contact 168, 170 with the growth constraints 158, 160 along at least 40% of the surface area of the upper and lower opposing surface regions 148, 150, respectively, such as along at least 50% of the surface area of the upper and lower opposing surface regions 148, 150, respectively. By forming a contact between the at least one connecting member 166 and the growth constraints 158, 160 that makes up a minimum surface area relative to a total surface area of the electrode assembly 106, proper tension between the growth constraints 158, 160 can be provided. Furthermore, according to one embodiment, the areas of contact 168, 170 can be provided by a single secondary connecting member 166, or the total area of contact may be the sum of multiple areas of contact 168, 170 provided by a plurality of secondary connecting members 166, such as one or a plurality of secondary connecting members 166 located at longitudinal ends 117, 119 of the electrode assembly 106, and/or one or a plurality of interior secondary connecting members 166 that are spaced apart from the longitudinal ends 117, 119 of the electrode assembly 106.

Further still, in one embodiment, the primary and secondary growth constraint systems 151, 152, respectively, (and optionally the tertiary growth constraint system) are capable of restraining growth of the electrode assembly 106 in both the longitudinal direction and the second direction orthogonal to the longitudinal direction, such as the vertical direction (Z axis) (and optionally in the third direction, such as along the X axis), to restrain a volume growth % of the electrode assembly.

Figure 8:
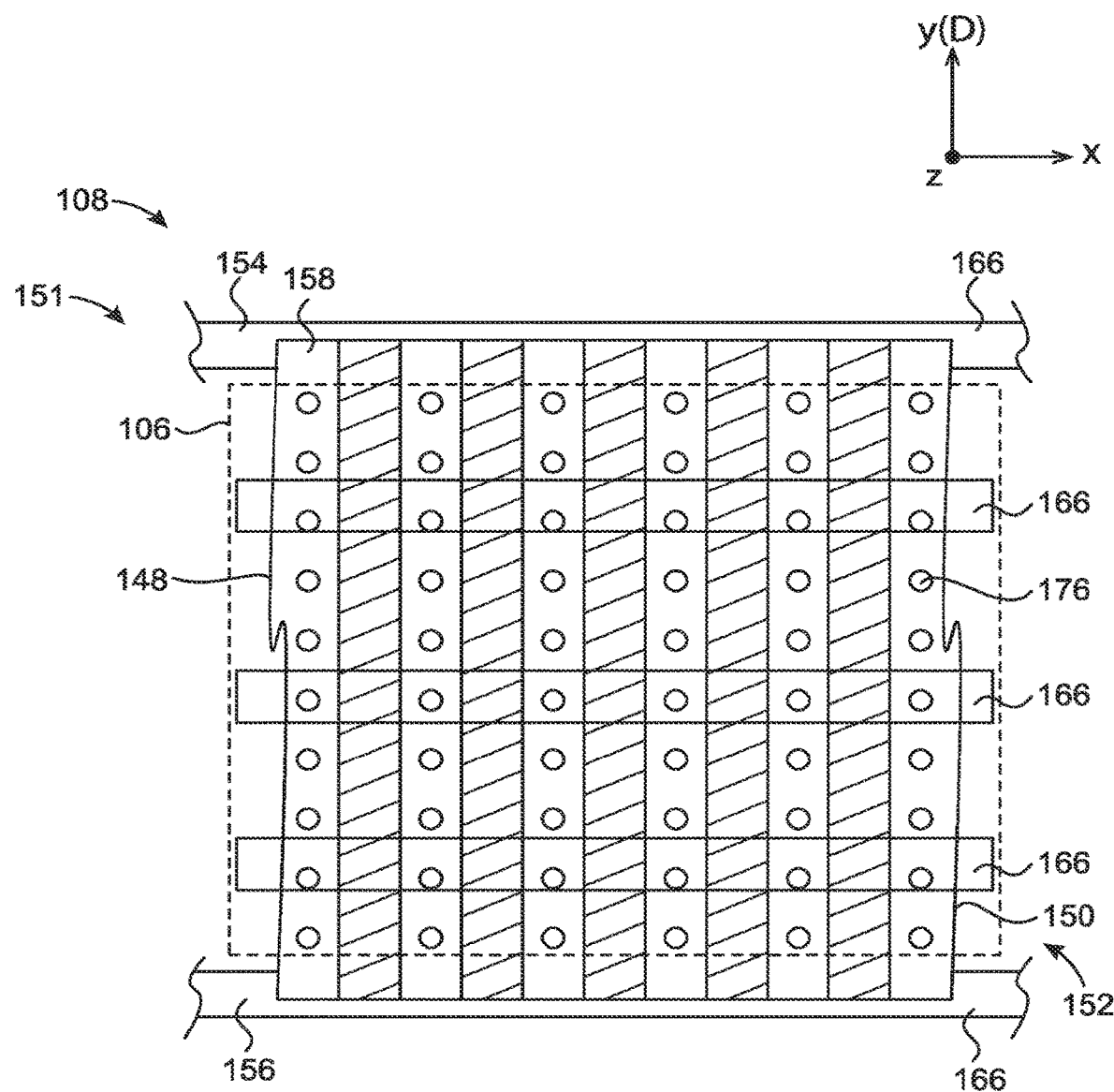
FIG. 8 illustrates one embodiment of a top view of a porous growth constraint over an electrode assembly.

In certain embodiments, one or more of the primary and secondary growth constraint systems 151, 152, respectively, comprises a member having pores therein, such as a member made of a porous material. For example, referring to FIG. 8 depicting a top view of a secondary growth constraint 158 over an electrode assembly 106, the secondary growth constraint 158 can comprise pores 176 that permit electrolyte to pass therethrough, so as to access an electrode assembly 106 that is at least partially covered by the secondary growth constraint 158. In one embodiment, the first and second secondary growth constraints 158, 160, respectively, have the pores 176 therein. In another embodiment, each of the first and second primary growth constraints 154, 156, respectively, and the first and second secondary growth constraints 158, 160, respectively, have the pores 176 therein. In yet another embodiment, only one or only a portion of the first and second secondary growth constraints 158, 160, respectively, contain the pores therein. In yet a further embodiment, one or more of the first and second primary connecting members 162, 164, respectively, and the at least one secondary connecting member 166 contains pores therein. Providing the pores 176 may be advantageous, for example, when the energy storage device 100 or secondary battery 102 contains a plurality of electrode assemblies 106 stacked together in the battery enclosure 104, to permit electrolyte to flow between the different electrode assemblies 106 in, for example, the secondary battery 102 as shown in the embodiment depicted in FIG. 9. For example, in one embodiment, a porous member making up at least a portion of the primary and secondary growth constraint system 151, 152, respectively, may have a void fraction of at least 0.25. By way of further example, in some embodiments, a porous member making up at least a portion of the primary and secondary growth constraint systems 151, 152, respectively, may have a void fraction of at least 0.375. By way of further example, in some embodiments, a porous member making up at least a portion of the primary and secondary growth constraint systems 151, 152, respectively, may have a void fraction of at least 0.5. By way of further example, in some embodiments, a porous member making up at least a portion of the primary and secondary growth constraint systems 151, 152, respectively, may have a void fraction of at least 0.625. By way of further example, in some embodiments, a porous member making up at least a portion of the primary and secondary growth constraint systems 151, 152, respectively, may have a void fraction of at least 0.75.

In one embodiment, the set of electrode constraints 108 may be assembled and secured to restrain growth of the electrode assembly 106 by at least one of adhering, bonding, and/or gluing components of the primary growth constraint system 151 to components of the secondary growth constraint system 152. For example, components of the primary growth constraint system 151 may be glued, welded, bonded, or otherwise adhered and secured to components of the secondary growth constraint system 152. For example, as shown in FIG. 6A, the first and second primary growth constraints 154, 156, respectively, can be adhered to first and second primary connecting members 162, 164, respectively, that may also serve as first and second secondary growth constraints 158, 160, respectively. Conversely, the first and second secondary growth constraints 158, 150, respectively, can be adhered to at least one secondary connecting member 166 that serves as at least one of the first and second primary growth constraints 154, 156, respectively, such as growth constraints at the longitudinal ends 117, 119 of the electrode assembly 106. Referring to FIG. 6D, the first and second secondary growth constraints 158, 160, respectively, can also be adhered to at least one secondary connecting member 166 that is an interior connecting member 166 spaced apart from the longitudinal ends 117, 119. In one embodiment, by securing portions of the primary and secondary growth constraint systems 151, 152, respectively, to one another, the cooperative restraint of the electrode assembly 106 growth can be provided.

Constraint System Sub-Architecture

According to one embodiment, as discussed above, one or more of the first and second secondary growth constraints 158, 160, respectively, can be connected together via a secondary connecting member 166 that is a part of an interior structure of the electrode assembly 106, such as a part of an anode 110 and/or cathode structure 112. In one embodiment, by providing connection between the constraints via structures within the electrode assembly 106, a tightly constrained structure can be realized that adequately compensates for strain produced by growth of the anode structure 110. For example, in one embodiment, the first and second secondary growth constraints 158, 160, respectively, may constrain growth in a direction orthogonal to the longitudinal direction, such as the vertical direction, by being placed in tension with one another via connection through a connecting member 166 that is a part of an anode 110 or cathode structure 112. In yet a further embodiment, growth of an anode structure 110 can be countered by connection of the secondary growth constraints 158, 160 through a cathode structure 112 that serves as the secondary connecting member 166.

In general, in certain embodiments, components of the primary growth constraint system 151 and the secondary growth constraint system 152 may be attached to the anode 110 and/or cathode structures 112, respectively, within an electrode assembly 106, and components of the secondary growth constraint system 152 may also be embodied as the anode 110 and/or cathode structures 112, respectively, within an electrode assembly 106, not only to provide effective restraint but also to more efficiently utilize the volume of the electrode assembly 106 without excessively increasing the size of an energy storage device 110 or a secondary battery 102 having the electrode assembly 106. For example, in one embodiment, the primary growth constraint system 151 and/or secondary growth constraint system 152 may be attached to one or more anode structures 110. By way of further example, in one embodiment, the primary growth constraint system 151 and/or secondary growth constraint system 152 may be attached to one or more cathode structures 112. By way of further example, in certain embodiments, the at least one secondary connecting member 166 may be embodied as the population of anode structures 110. By way of further example, in certain embodiments, the at least one secondary connecting member 166 may be embodied as the population of cathode structures 112.

Referring now to FIG. 7, a Cartesian coordinate system is shown for reference having a vertical axis (Z axis), a longitudinal axis (Y axis), and a transverse axis (X axis); wherein the X axis is oriented as coming out of the plane of the page; and a designation of the stacking direction D, as described above, co-parallel with the Y axis. More specifically, FIG. 7 shows a cross section, along the line A-A' as in FIG. 1B, of a set of electrode constraints 108, including one embodiment of both a primary growth constraint system 151 and one embodiment of a secondary growth constraint system 152. Primary growth constraint system 151 includes a first primary growth constraint 154 and a second primary growth constraint 156, as described above, and a first primary connecting member 162 and a second primary connecting member 164, as described above. Secondary growth constraint system 152 includes a first secondary growth constraint 158, a second secondary growth constraint 160, and at least one secondary connecting member 166 embodied as the population of anode structures 110 and/or the population of cathode structures 112; therefore, in this embodiment, the at least one secondary connecting member 166, anode structures 110, and/or cathode structures 112 can be understood to be interchangeable. Furthermore, the separator 130 may also form a portion of a secondary connecting member 166. Further, in this embodiment, first primary connecting member 162 and first secondary growth constraint 158 are interchangeable, as described above. Further still, in this embodiment, second primary connecting member 164 and second secondary growth constraint 160 are interchangeable, as described above. More specifically, illustrated in FIG. 7 is one embodiment of a flush connection of the secondary connecting member 166 corresponding to the anode 110 or cathode structure 112 with the first secondary growth constraint 158 and second secondary growth constraint 160. The flush connection may further include a layer of glue 182 between the first secondary growth constraint 158 and secondary connecting member 166, and a layer of glue 182 between the second secondary growth constraint 160 and secondary connecting member 166. The layers of glue 182 affix first secondary growth constraint 158 to secondary connecting members 166, and affix the second secondary growth constraint 160 to secondary connecting member 166.

Also, one or more of the first and second primary growth constraints 154, 156, first and second primary connecting members 162, 164, first and second secondary growth constraints 158, 160, and at least one secondary connecting member 166 may be provided in the form of a plurality of segments 1088 or parts that can be joined together to form a single member. For example, as shown in the embodiment as illustrated in FIG. 7, a first secondary growth constraint 158 is provided in the form of a main middle segment 1088a and first and second end segments 1088b located towards the longitudinal ends 117, 119 of the electrode assembly 106, with the middle segment 1088a being connected to each first and second end segment 1088b by a connecting portion 1089 provided to connect the segments 1088, such as notches formed in the segments 1088 that can be interconnected to join the segments 1088 to one another. A second secondary growth constraint 160 may similarly be provided in the form of a plurality of segments 1088 that can be connected together to form the constraint, as shown in FIG. 7. In one embodiment, one or more of the secondary growth constraints 158, 160, at least one primary connecting member 162, and/or at least one secondary connecting member 166 may also be provided in the form of a plurality of segments 1088 that can be connected together via a connecting portions such as notches to form the complete member. According to one embodiment, the connection of the segments 1088 together via the notch or other connecting portion may provide for pre-tensioning of the member formed of the plurality of segments when the segments are connected.

Further illustrated in FIG. 7, in one embodiment, are members of the anode population 110 having an anode active material layer 132, an ionically porous anode current collector 136, and an anode backbone 134 that supports the anode active material layer 132 and the anode current collector 136. Similarly, in one embodiment, illustrated in FIG. 7 are members of the cathode population 112 having a cathode active material layer 138, a cathode collector 140, and a cathode backbone 141 that supports the cathode active material layer 138 and the cathode current collector 140.

While members of the anode population 110 have been illustrated and described herein to include the anode active material layer 132 being directly adjacent to the anode backbone 134, and the anode current collector 136 directly adjacent to and effectively surrounding the anode backbone 134 and the anode active material layer 132, those of skill in the art will appreciate other arrangements of the anode population 110 have been contemplated. For example, in one embodiment (not shown), the anode population 110 may include the anode active material layer 132 being directly adjacent to the anode current collector 136, and the anode current collector 136 being directly adjacent to the anode backbone 134. Stated alternatively, the anode backbone 134 may be effectively surrounded by the anode current collector 136, with the anode active material layer 132 flanking and being directly adjacent to the anode current collector 136. As will be appreciated by those of skill in the art, any suitable configuration of the anode population 110 and/or the cathode population 112 may be applicable to the inventive subject matter described herein, so long as the anode active material layer 132 is separated from the cathode active material layer 138 via separator 130. Also, the anode current collector 136 is required to be ion permeable if it is located between the anode active material layer 132 and separator 130; and the cathode current collector 140 is required to be ion permeable if it is located between the cathode active material layer 138 and separator 130.

For ease of illustration, only three members of the anode population 110 and four members of the cathode population 112 are depicted, in practice, however, an energy storage device 100 or secondary battery 102 using the inventive subject matter herein may include additional members of the anode 110 and cathode 112 populations depending on the application of the energy storage device 100 or secondary battery 102, as described above. Further still, illustrated in FIG. 7 is a microporous separator 130 electrically insulating the anode active material layer 132 from the cathode active material layer 138.

Furthermore, to connect the first and second secondary growth constraints 158, 160, respectively, the constraints 158, 160 can be attached to the at least one connecting member 166 by a suitable means, such as by gluing as shown, or alternatively by being welded, such as by being welded to the current collectors 136, 140. For example, the first and/or second secondary growth constraints 158, 160, respectively, can be attached to a secondary connecting member 166 corresponding to at least one of an anode structure 110 and/or cathode structure 112, such as at least one of an anode and/or cathode backbone 134, 141, respectively, an anode and/or cathode current collector 136, 140, respectively, by at least one of adhering, gluing, bonding, welding, and the like. According to one embodiment, the first and/or second secondary growth constraints 158, 160, respectively, can be attached to the secondary connecting member 166 by mechanically pressing the first and/or second secondary growth constraint 158, 160, respectively, to an end of one or more secondary connecting member 166, such as ends of the population of anode 100 and/or cathode structures 112, while using a glue or other adhesive material to adhere one or more ends of the anode 110 and/or cathode structures 112 to at least one of the first and/or second secondary growth constraints 158, 160, respectively.

Population of Anode Structures

Referring again to FIG. 7, each member of the population of anode structures 110 may also include a top 1052 adjacent to the first secondary growth constraint 158, a bottom 1054 adjacent to the second secondary growth constraint 160, and a lateral surface (not marked) surrounding a vertical axis $A_{ES}$ (not marked) parallel to the Z axis, the lateral surface connecting the top 1052 and the bottom 1054. The anode structures 110 further include a length $L_A$, a width $W_A$, and a height $H_A$. The length $L_A$ being bounded by the lateral surface and measured along the X axis. The width $W_A$ being bounded by the lateral surface and measured along the Y axis, and the height $H_A$ being measured along the vertical axis $A_{ES}$ or the Z axis from the top 1052 to the bottom 1054.

The $L_A$ of the members of the anode population 110 will vary depending upon the energy storage device 100 or the secondary battery 102 and their intended use(s). In general, however, the members of the anode population 110 will typically have a $L_A$ in the range of about 5 mm to about 500 mm. For example, in one such embodiment, the members of the anode population 110 have a $L_A$ of about 10 mm to about 250 mm. By way of further example, in one such embodiment, the members of the anode population 110 have a $L_A$ of about 20 mm to about 100 mm.

The $W_A$ of the members of the anode population 110 will also vary depending upon the energy storage device 100 or the secondary battery 102 and their intended use(s). In general, however, each member of the anode population 110 will typically have a $W_A$ within the range of about 0.01 mm to 2.5 mm. For example, in one embodiment, the $W_A$ of each member of the anode population 110 will be in the range of about 0.025 mm to about 2 mm. By way of further example, in one embodiment, the $W_A$ of each member of the anode population 110 will be in the range of about 0.05 mm to about 1 mm.

The $H_A$ of the members of the anode population 110 will also vary depending upon the energy storage device 100 or the secondary battery 102 and their intended use(s). In general, however, members of the anode population 110 will typically have a $H_A$ within the range of about 0.05 mm to about 10 mm. For example, in one embodiment, the $H_A$ of each member of the anode population 110 will be in the range of about 0.05 mm to about 5 mm. By way of further example, in one embodiment, the $H_A$ of each member of the anode population 110 will be in the range of about 0.1 mm to about 1 mm.

In another embodiment, each member of the population of anode structures 110 may include an anode structure backbone 134 having a vertical axis $A_{ESB}$ parallel to the Z axis. The anode structure backbone 134 may also include a layer of anode active material 132 surrounding the anode structure backbone 134 about the vertical axis $A_{ESB}$. Stated alternatively, the anode structure backbone 134 provides mechanical stability for the layer of anode active material 132, and may provide a point of attachment for the primary growth constraint system 151 and/or secondary constraint system 152. In certain embodiments, the layer of anode active material 132 expands upon insertion of carrier ions into the layer of anode active material 132, and contracts upon extraction of carrier ions from the layer of anode active material 132. The anode structure backbone 134 may also include a top 1056 adjacent to the first secondary growth constraint 158, a bottom 1058 adjacent to the second secondary growth constraint 160, and a lateral surface (not marked) surrounding the vertical axis $A_{ESB}$ and connecting the top 1056 and the bottom 1058. The anode structure backbone 134 further includes a length LESB, a width $W_{ESB}$, and a height $H_{ESB}$. The length LESB being bounded by the lateral surface and measured along the X axis. The width $W_{ESB}$ being bounded by the lateral surface and measured along the Y axis, and the height $H_{ESB}$ being measured along the Z axis from the top 1056 to the bottom 1058.

The LESB of the anode structure backbone 134 will vary depending upon the energy storage device 100 or the secondary battery 102 and their intended use(s). In general, however, the anode structure backbone 134 will typically have a LESB in the range of about 5 mm to about 500 mm. For example, in one such embodiment, the anode structure backbone 134 will have a LESB of about 10 mm to about 250 mm. By way of further example, in one such embodiment, the anode structure backbone 134 will have a LESB of about 20 mm to about 100 mm. According to one embodiment, the anode structure backbone 134 may be the substructure of the anode structure 110 that acts as the at least one connecting member 166.

The $W_{ESB}$ of the anode structure backbone 134 will also vary depending upon the energy storage device 100 or the secondary battery 102 and their intended use(s). In general, however, each anode structure backbone 134 will typically have a $W_{ESB}$ of at least 1 micrometer. For example, in one embodiment, the $W_{ESB}$ of each anode structure backbone 134 may be substantially thicker, but generally will not have a thickness in excess of 500 micrometers. By way of further example, in one embodiment, the $W_{ESB}$ of each anode structure backbone 134 will be in the range of about 1 to about 50 micrometers.

The $H_{ESB}$ of the anode structure backbone 134 will also vary depending upon the energy storage device 100 or the secondary battery 102 and their intended use(s). In general, however, the anode structure backbone 134 will typically have a $H_{ESB}$ of at least about 50 micrometers, more typically at least about 100 micrometers. Further, in general, the anode structure backbone 134 will typically have a $H_{ESB}$ of no more than about 10,000 micrometers, and more typically no more than about 5,000 micrometers. For example, in one embodiment, the $H_{ESB}$ of each anode structure backbone 134 will be in the range of about 0.05 mm to about 10 mm. By way of further example, in one embodiment, the $H_{ESB}$ of each anode structure backbone 134 will be in the range of about 0.05 mm to about 5 mm. By way of further example, in one embodiment, the $H_{ESB}$ of each anode structure backbone 134 will be in the range of about 0.1 mm to about 1 mm.

Depending upon the application, anode structure backbone 134 may be electrically conductive or insulating. For example, in one embodiment, the anode structure backbone 134 may be electrically conductive and may include anode current collector 136 for anode active material 132. In one such embodiment, anode structure backbone 134 includes an anode current collector 136 having a conductivity of at least about $10^3$ Siemens/cm. By way of further example, in one such embodiment, anode structure backbone 134 includes an anode current collector 136 having a conductivity of at least about $10^4$ Siemens/cm. By way of further example, in one such embodiment, anode structure backbone 134 includes an anode current collector 136 having a conductivity of at least about $10^5$ Siemens/cm. In other embodiments, anode structure backbone 134 is relatively nonconductive. For example, in one embodiment, anode structure backbone 134 has an electrical conductivity of less than 10 Siemens/cm. By way of further example, in one embodiment, anode structure backbone 134 has an electrical conductivity of less than 1 Siemens/cm. By way of further example, in one embodiment, anode structure backbone 134 has an electrical conductivity of less than $10^{-1}$ Siemens/cm.

In certain embodiments, anode structure backbone 134 may include any material that may be shaped, such as metals, semiconductors, organics, ceramics, and glasses. For example, in certain embodiments, materials include semiconductor materials such as silicon and germanium. Alternatively, however, carbon-based organic materials, or metals, such as aluminum, copper, nickel, cobalt, titanium, and tungsten, may also be incorporated into anode structure backbone 134. In one exemplary embodiment, anode structure backbone 134 comprises silicon. The silicon, for example, may be single crystal silicon, polycrystalline silicon, amorphous silicon, or a combination thereof.

In certain embodiments, the anode active material layer 132 may have a thickness of at least one micrometer. Typically, however, the anode active material layer 132 thickness typically will not exceed 200 micrometers. For example, in one embodiment, the anode active material layer 132 may have a thickness of about 1 to 50 micrometers. By way of further example, in one embodiment, the anode active material layer 132 may have a thickness of about 2 to about 75 micrometers. By way of further example, in one embodiment, the anode active material layer 132 may have a thickness of about 10 to about 100 micrometers. By way of further example, in one embodiment, the anode active material layer 132 may have a thickness of about 5 to about 50 micrometers.

In certain embodiments, the anode current collector 136 includes an ionically permeable conductor material that has sufficient ionic permeability to carrier ions to facilitate the movement of carrier ions from the separator 130 to the anode active material layer 132, and sufficient electrical conductivity to enable it to serve as a current collector. Being positioned between the anode active material layer 132 and the separator 130, the anode current collector 136 may facilitate more uniform carrier ion transport by distributing current from the anode current collector 136 across the surface of the anode active material layer 132. This, in turn, may facilitate more uniform insertion and extraction of carrier ions and thereby reduce stress in the anode active material layer 132 during cycling, since the anode current collector 136 distributes current to the surface of the anode active material layer 132 facing the separator 130, the reactivity of the anode active material layer 132 for carrier ions will be the greatest where the carrier ion concentration is the greatest.

The anode current collector 136 includes an ionically permeable conductor material that is both ionically and electrically conductive. Stated differently, the anode current collector 136 has a thickness, an electrical conductivity, and an ionic conductivity for carrier ions that facilitates the movement of carrier ions between an immediately adjacent anode active material layer 132 on one side of the ionically permeable conductor layer and an immediately adjacent separator layer 130 on the other side of the anode current collector 136 in an electrochemical stack or electrode assembly 106. On a relative basis, the anode current collector 136 has an electrical conductance that is greater than its ionic conductance when there is an applied current to store energy in the device 100 or an applied load to discharge the device 100. For example, the ratio of the electrical conductance to the ionic conductance (for carrier ions) of the anode current collector 136 will typically be at least 1,000:1, respectively, when there is an applied current to store energy in the device 100 or an applied load to discharge the device 100. By way of further example, in one such embodiment, the ratio of the electrical conductance to the ionic conductance (for carrier ions) of the anode current collector 136 is at least 5,000:1, respectively, when there is an applied current to store energy in the device 100 or an applied load to discharge the device 100. By way of further example, in one such embodiment, the ratio of the electrical conductance to the ionic conductance (for carrier ions) of the anode current collector 136 is at least 10,000:1, respectively, when there is an applied current to store energy in the device 100 or an applied load to discharge the device 100. By way of further example, in one such embodiment, the ratio of the electrical conductance to the ionic conductance (for carrier ions) of the anode current collector 136 layer is at least 50,000:1, respectively, when there is an applied current to store energy in the device 100 or an applied load to discharge the device 100. By way of further example, in one such embodiment, the ratio of the electrical conductance to the ionic conductance (for carrier ions) of the anode current collector 136 is at least 100,000:1, respectively, when there is an applied current to store energy in the device 100 or an applied load to discharge the device 100.

In one embodiment, and when there is an applied current to store energy in the device 100 or an applied load to discharge the device 100, such as when a secondary battery 102 is charging or discharging, the anode current collector 136 has an ionic conductance that is comparable to the ionic conductance of an adjacent separator layer 130. For example, in one embodiment, the anode current collector 136 has an ionic conductance (for carrier ions) that is at least 50% of the ionic conductance of the separator layer 130 (i.e., a ratio of 0.5:1, respectively) when there is an applied current to store energy in the device 100 or an applied load to discharge the device 100. By way of further example, in some embodiments, the ratio of the ionic conductance (for carrier ions) of the anode current collector 136 to the ionic conductance (for carrier ions) of the separator layer 130 is at least 1:1 when there is an applied current to store energy in the device 100 or an applied load to discharge the device 100. By way of further example, in some embodiments, the ratio of the ionic conductance (for carrier ions) of the anode current collector 136 to the ionic conductance (for carrier ions) of the separator layer 130 is at least 1.25:1 when there is an applied current to store energy in the device 100 or an applied load to discharge the device 100. By way of further example, in some embodiments, the ratio of the ionic conductance (for carrier ions) of the anode current collector 136 to the ionic conductance (for carrier ions) of the separator layer 130 is at least 1.5:1 when there is an applied current to store energy in the device 100 or an applied load to discharge the device 100. By way of further example, in some embodiments, the ratio of the ionic conductance (for carrier ions) of the anode current collector 136 to the ionic conductance (for carrier ions) of the separator layer 130 is at least 2:1 when there is an applied current to store energy in the device 100 or an applied load to discharge the device 100.

In one embodiment, the anode current collector 136 also has an electrical conductance that is substantially greater than the electrical conductance of the anode active material layer 132. For example, in one embodiment, the ratio of the electrical conductance of the anode current collector 136 to the electrical conductance of the anode active material layer 132 is at least 100:1 when there is an applied current to store energy in the device 100 or an applied load to discharge the device 100. By way of further example, in some embodiments, the ratio of the electrical conductance of the anode current collector 136 to the electrical conductance of the anode active material layer 132 is at least 500:1 when there is an applied current to store energy in the device 100 or an applied load to discharge the device 100. By way of further example, in some embodiments, the ratio of the electrical conductance of the anode current collector 136 to the electrical conductance of the anode active material layer 132 is at least 1000:1 when there is an applied current to store energy in the device 100 or an applied load to discharge the device 100. By way of further example, in some embodiments, the ratio of the electrical conductance of the anode current collector 136 to the electrical conductance of the anode active material layer 132 is at least 5000:1 when there is an applied current to store energy in the device 100 or an applied load to discharge the device 100. By way of further example, in some embodiments, the ratio of the electrical conductance of the anode current collector 136 to the electrical conductance of the anode active material layer 132 is at least 10,000:1 when there is an applied current to store energy in the device 100 or an applied load to discharge the device 100.

The thickness of the anode current collector layer 136 (i.e., the shortest distance between the separator 130 and, in one embodiment, the anodically active material layer between which the anode current collector layer 136 is sandwiched) in certain embodiments will depend upon the composition of the layer 136 and the performance specifications for the electrochemical stack. In general, when an anode current collector layer 136 is an ionically permeable conductor layer, it will have a thickness of at least about 300 Angstroms. For example, in some embodiments, it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the electrode current collector layer 136 will have a thickness in the range of about 0.1 to about 10 micrometers. By way of further example, in some embodiments, the anode current collector layer 136 will have a thickness in the range of about 0.1 to about 5 micrometers. By way of further example, in some embodiments, the anode current collector layer 136 will have a thickness in the range of about 0.5 to about 3 micrometers. In general, it is preferred that the thickness of the anode current collector layer 136 be approximately uniform. For example, in one embodiment, it is preferred that the anode current collector layer 136 have a thickness non-uniformity of less than about 25%. In certain embodiments, the thickness variation is even less. For example, in some embodiments, the anode current collector layer 136 has a thickness non-uniformity of less than about 20%. By way of further example, in some embodiments, the anode current collector layer 136 has a thickness non-uniformity of less than about 15%. In some embodiments the ionically permeable conductor layer has a thickness non-uniformity of less than about 10%.

In one embodiment, the anode current collector layer 136 is an ionically permeable conductor layer including an electrically conductive component and an ion conductive component that contribute to the ionic permeability and electrical conductivity. Typically, the electrically conductive component will include a continuous electrically conductive material (e.g., a continuous metal or metal alloy) in the form of a mesh or patterned surface, a film, or composite material comprising the continuous electrically conductive material (e.g., a continuous metal or metal alloy). Additionally, the ion conductive component will typically comprise pores, for example, interstices of a mesh, spaces between a patterned metal or metal alloy containing material layer, pores in a metal film, or a solid ion conductor having sufficient diffusivity for carrier ions. In certain embodiments, the ionically permeable conductor layer includes a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 7, anode current collector layer 136 is the sole anode current collector for electrode active material layer 132. Stated differently, anode structure backbone 134 may include an anode current collector. In certain other embodiments, however, anode structure backbone 134 may optionally not include an anode current collector.

Population of Cathode Structures

Referring again to FIG. 7, each member of the population of cathode structures 112 may also include a top 1068 adjacent to the first secondary growth constraint 158, a bottom 1070 adjacent to the second secondary growth constraint 160, and a lateral surface (not marked) surrounding a vertical axis ACES (not marked) parallel to the Z axis, the lateral surface connecting the top 1068 and the bottom 1070. The cathode structures 112 further include a length $L_C$, a width $W_C$, and a height $H_C$. The length $L_C$ being bounded by the lateral surface and measured along the X axis. The width $W_C$ being bounded by the lateral surface and measured along the Y axis, and the height $H_C$ being measured along the vertical axis ACES or the Z axis from the top 1068 to the bottom 1070.

The $L_C$ of the members of the cathode population 112 will vary depending upon the energy storage device 100 or the secondary battery 102 and their intended use(s). In general, however, the members of the cathode population 112 will typically have a $L_C$ in the range of about 5 mm to about 500 mm. For example, in one such embodiment, the members of the cathode population 112 have a $L_C$ of about 10 mm to about 250 mm. By way of further example, in one such embodiment, the members of the cathode population 112 have a $L_C$ of about 25 mm to about 100 mm.

The $W_C$ of the members of the cathode population 112 will also vary depending upon the energy storage device 100 or the secondary battery 102 and their intended use(s). In general, however, each member of the cathode population 112 will typically have a $W_C$ within the range of about 0.01 mm to 2.5 mm. For example, in one embodiment, the $W_C$ of each member of the cathode population 112 will be in the range of about 0.025 mm to about 2 mm. By way of further example, in one embodiment, the $W_C$ of each member of the cathode population 112 will be in the range of about 0.05 mm to about 1 mm.

The $H_C$ of the members of the cathode population 112 will also vary depending upon the energy storage device 100 or the secondary battery 102 and their intended use(s). In general, however, members of the cathode population 112 will typically have a $H_C$ within the range of about 0.05 mm to about 10 mm. For example, in one embodiment, the $H_C$ of each member of the cathode population 112 will be in the range of about 0.05 mm to about 5 mm. By way of further example, in one embodiment, the $H_C$ of each member of the cathode population 112 will be in the range of about 0.1 mm to about 1 mm.

In another embodiment, each member of the population of cathode structures 112 may include a cathode structure backbone 141 having a vertical axis $A_{CESB}$ parallel to the Z axis. The cathode structure backbone 141 may also include a layer of cathode active material 138 surrounding the cathode structure backbone 141 about the vertical axis $A_{CESB}$. Stated alternatively, the cathode structure backbone 141 provides mechanical stability for the layer of cathode active material 138, and may provide a point of attachment for the primary growth constraint system 151 and/or secondary growth constraint system 152. The cathode structure backbone 141 may also include a top 1072 adjacent to the first secondary growth constraint 158, a bottom 1074 adjacent to the second secondary growth constraint 160, and a lateral surface (not marked) surrounding the vertical axis $A_{CESB}$ and connecting the top 1072 and the bottom 1074. The cathode structure backbone 141 further includes a length $L_{CESB}$, a width $W_{CESB}$, and a height $H_{CESB}$. The length $L_{CESB}$ being bounded by the lateral surface and measured along the X axis. The width $W_{CESB}$ being bounded by the lateral surface and measured along the Y axis, and the height $H_{CESB}$ being measured along the Z axis from the top 1072 to the bottom 1074.

The $L_{CESB}$ of the cathode structure backbone 141 will vary depending upon the energy storage device 100 or the secondary battery 102 and their intended use(s). In general, however, the cathode structure backbone 141 will typically have a $L_{CESB}$ in the range of about 5 mm to about 500 mm. For example, in one such embodiment, the cathode structure backbone 141 will have a $L_{CESB}$ of about 10 mm to about 250 mm. By way of further example, in one such embodiment, the cathode structure backbone 141 will have a $L_{CESB}$ of about 20 mm to about 100 mm.

The $W_{CESB}$ of the cathode structure backbone 141 will also vary depending upon the energy storage device 100 or the secondary battery 102 and their intended use(s). In general, however, each cathode structure backbone 141 will typically have a $W_{CESB}$ of at least 1 micrometer. For example, in one embodiment, the $W_{CESB}$ of each cathode structure backbone 141 may be substantially thicker, but generally will not have a thickness in excess of 500 micrometers. By way of further example, in one embodiment, the $W_{CESB}$ of each cathode structure backbone 141 will be in the range of about 1 to about 50 micrometers.

The $H_{CESB}$ of the cathode structure backbone 141 will also vary depending upon the energy storage device 100 or the secondary battery 102 and their intended use(s). In general, however, the cathode structure backbone 141 will typically have a $H_{CESB}$ of at least about 50 micrometers, more typically at least about 100 micrometers. Further, in general, the cathode structure backbone 141 will typically have a $H_{CESB}$ of no more than about 10,000 micrometers, and more typically no more than about 5,000 micrometers. For example, in one embodiment, the $H_{CESB}$ of each cathode structure backbone 141 will be in the range of about 0.05 mm to about 10 mm. By way of further example, in one embodiment, the $H_{CESB}$ of each cathode structure backbone 141 will be in the range of about 0.05 mm to about 5 mm. By way of further example, in one embodiment, the $H_{CESB}$ of each cathode structure backbone 141 will be in the range of about 0.1 mm to about 1 mm.

Depending upon the application, cathode structure backbone 141 may be electrically conductive or insulating. For example, in one embodiment, the cathode structure backbone 141 may be electrically conductive and may include cathode current collector 140 for cathode active material 138. In one such embodiment, cathode structure backbone 141 includes a cathode current collector 140 having a conductivity of at least about $10^3$ Siemens/cm. By way of further example, in one such embodiment, cathode structure backbone 141 includes a cathode current collector 140 having a conductivity of at least about $10^4$ Siemens/cm. By way of further example, in one such embodiment, cathode structure backbone 141 includes a cathode current collector 140 having a conductivity of at least about $10^5$ Siemens/cm. In other embodiments, cathode structure backbone 141 is relatively nonconductive. For example, in one embodiment, cathode structure backbone 141 has an electrical conductivity of less than 10 Siemens/cm. By way of further example, in one embodiment, cathode structure backbone 141 has an electrical conductivity of less than 1 Siemens/cm. By way of further example, in one embodiment, cathode structure backbone 141 has an electrical conductivity of less than $10^{-1}$ Siemens/cm.

In certain embodiments, cathode structure backbone 141 may include any material that may be shaped, such as metals, semiconductors, organics, ceramics, and glasses. For example, in certain embodiments, materials include semiconductor materials such as silicon and germanium. Alternatively, however, carbon-based organic materials, or metals, such as aluminum, copper, nickel, cobalt, titanium, and tungsten, may also be incorporated into cathode structure backbone 141. In one exemplary embodiment, cathode structure backbone 141 comprises silicon. The silicon, for example, may be single crystal silicon, polycrystalline silicon, amorphous silicon, or a combination thereof.

In certain embodiments, the cathode active material layer 138 may have a thickness of at least one micrometer. Typically, however, the cathode active material layer 138 thickness will not exceed 200 micrometers. For example, in one embodiment, the cathode active material layer 138 may have a thickness of about 1 to 50 micrometers. By way of further example, in one embodiment, the cathode active material layer 138 may have a thickness of about 2 to about 75 micrometers. By way of further example, in one embodiment, the cathode active material layer 138 may have a thickness of about 10 to about 100 micrometers. By way of further example, in one embodiment, the cathode active material layer 138 may have a thickness of about 5 to about 50 micrometers.

In certain embodiments, the cathode current collector 140 includes an ionically permeable conductor that has sufficient ionic permeability to carrier ions to facilitate the movement of carrier ions from the separator 130 to the cathode active material layer 138, and sufficient electrical conductivity to enable it to serve as a current collector. Whether or not positioned between the cathode active material layer 138 and the separator 130, the cathode current collector 140 may facilitate more uniform carrier ion transport by distributing current from the cathode current collector 140 across the surface of the cathode active material layer 138. This, in turn, may facilitate more uniform insertion and extraction of carrier ions and thereby reduce stress in the cathode active material layer 138 during cycling, since the cathode current collector 140 distributes current to the surface of the cathode active material layer 138 facing the separator 130, the reactivity of the cathode active material layer 138 for carrier ions will be the greatest where the carrier ion concentration is the greatest.

The cathode current collector 140 includes an ionically permeable conductor material that is both ionically and electrically conductive. Stated differently, the cathode current collector 140 has a thickness, an electrical conductivity, and an ionic conductivity for carrier ions that facilitates the movement of carrier ions between an immediately adjacent cathode active material layer 138 on one side of the ionically permeable conductor layer and an immediately adjacent separator layer 130 on the other side of the cathode current collector 140 in an electrochemical stack or electrode assembly 106. On a relative basis, the cathode current collector 140 has an electrical conductance that is greater than its ionic conductance when there is an applied current to store energy in the device 100 or an applied load to discharge the device 100. For example, the ratio of the electrical conductance to the ionic conductance (for carrier ions) of the cathode current collector 140 will typically be at least 1,000:1, respectively, when there is an applied current to store energy in the device 100 or an applied load to discharge the device 100. By way of further example, in one such embodiment, the ratio of the electrical conductance to the ionic conductance (for carrier ions) of the cathode current collector 140 is at least 5,000:1, respectively, when there is an applied current to store energy in the device 100 or an applied load to discharge the device 100. By way of further example, in one such embodiment, the ratio of the electrical conductance to the ionic conductance (for carrier ions) of the cathode current collector 140 is at least 10,000:1, respectively, when there is an applied current to store energy in the device 100 or an applied load to discharge the device 100. By way of further example, in one such embodiment, the ratio of the electrical conductance to the ionic conductance (for carrier ions) of the cathode current collector 140 layer is at least 50,000:1, respectively, when there is an applied current to store energy in the device 100 or an applied load to discharge the device 100. By way of further example, in one such embodiment, the ratio of the electrical conductance to the ionic conductance (for carrier ions) of the cathode current collector 140 is at least 100,000:1, respectively, when there is an applied current to store energy in the device 100 or an applied load to discharge the device 100.

In one embodiment, and when there is an applied current to store energy in the device 100 or an applied load to discharge the device 100, such as when an energy storage device 100 or a secondary battery 102 is charging or discharging, the cathode current collector 140 has an ionic conductance that is comparable to the ionic conductance of an adjacent separator layer 130. For example, in one embodiment, the cathode current collector 140 has an ionic conductance (for carrier ions) that is at least 50% of the ionic conductance of the separator layer 130 (i.e., a ratio of 0.5:1, respectively) when there is an applied current to store energy in the device 100 or an applied load to discharge the device 100. By way of further example, in some embodiments, the ratio of the ionic conductance (for carrier ions) of the cathode current collector 140 to the ionic conductance (for carrier ions) of the separator layer 130 is at least 1:1 when there is an applied current to store energy in the device 100 or an applied load to discharge the device 100. By way of further example, in some embodiments, the ratio of the ionic conductance (for carrier ions) of the cathode current collector 140 to the ionic conductance (for carrier ions) of the separator layer 130 is at least 1.25:1 when there is an applied current to store energy in the device 100 or an applied load to discharge the device 100. By way of further example, in some embodiments, the ratio of the ionic conductance (for carrier ions) of the cathode current collector 140 to the ionic conductance (for carrier ions) of the separator layer 130 is at least 1.5:1 when there is an applied current to store energy in the device 100 or an applied load to discharge the device 100. By way of further example, in some embodiments, the ratio of the ionic conductance (for carrier ions) of the cathode current collector 140 to the ionic conductance (for (anode current collector layer) carrier ions) of the separator layer 130 is at least 2:1 when there is an applied current to store energy in the device 100 or an applied load to discharge the device 100.

In one embodiment, the cathode current collector 140 also has an electrical conductance that is substantially greater than the electrical conductance of the cathode active material layer 138. For example, in one embodiment, the ratio of the electrical conductance of the cathode current collector 140 to the electrical conductance of the cathode active material layer 138 is at least 100:1 when there is an applied current to store energy in the device 100 or an applied load to discharge the device 100. By way of further example, in some embodiments, the ratio of the electrical conductance of the cathode current collector 140 to the electrical conductance of the cathode active material layer 138 is at least 500:1 when there is an applied current to store energy in the device 100 or an applied load to discharge the device 100. By way of further example, in some embodiments, the ratio of the electrical conductance of the cathode current collector 140 to the electrical conductance of the cathode active material layer 138 is at least 1000:1 when there is an applied current to store energy in the device 100 or an applied load to discharge the device 100. By way of further example, in some embodiments, the ratio of the electrical conductance of the cathode current collector 140 to the electrical conductance of the cathode active material layer 138 is at least 5000:1 when there is an applied current to store energy in the device 100 or an applied load to discharge the device 100. By way of further example, in some embodiments, the ratio of the electrical conductance of the cathode current collector 140 to the electrical conductance of the cathode active material layer 138 is at least 10,000:1 when there is an applied current to store energy in the device 100 or an applied load to discharge the device 100.

The thickness of the cathode current collector layer 140 (i.e., the shortest distance between the separator 130 and, in one embodiment, the cathodic active material layer 138 between which the cathode current collector layer 140 is sandwiched) in certain embodiments will depend upon the composition of the layer 140 and the performance specifications for the electrochemical stack. In general, when an cathode current collector layer 140 is an ionically permeable conductor layer, it will have a thickness of at least about 300 Angstroms. For example, in some embodiments, it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the cathode current collector layer 140 will have a thickness in the range of about 0.1 to about 10 micrometers. By way of further example, in some embodiments, the cathode current collector layer 140 will have a thickness in the range of about 0.1 to about 5 micrometers. By way of further example, in some embodiments, the cathode current collector layer 140 will have a thickness in the range of about 0.5 to about 3 micrometers. In general, it is preferred that the thickness of the cathode current collector layer 140 be approximately uniform. For example, in one embodiment, it is preferred that the cathode current collector layer 140 have a thickness non-uniformity of less than about 25%. In certain embodiments, the thickness variation is even less. For example, in some embodiments, the cathode current collector layer 140 has a thickness non-uniformity of less than about 20%. By way of further example, in some embodiments, the cathode current collector layer 140 has a thickness non-uniformity of less than about 15%. In some embodiments, the cathode current collector layer 140 has a thickness non-uniformity of less than about 10%.

In one embodiment, the cathode current collector layer 140 is an ionically permeable conductor layer including an electrically conductive component and an ion conductive component that contributes to the ionic permeability and electrical conductivity. Typically, the electrically conductive component will include a continuous electrically conductive material (e.g., a continuous metal or metal alloy) in the form of a mesh or patterned surface, a film, or composite material comprising the continuous electrically conductive material (e.g., a continuous metal or metal alloy). Additionally, the ion conductive component will typically comprise pores, for example, interstices of a mesh, spaces between a patterned metal or metal alloy containing material layer, pores in a metal film, or a solid ion conductor having sufficient diffusivity for carrier ions. In certain embodiments, the ionically permeable conductor layer includes a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 7, cathode current collector layer 140 is the sole cathode current collector for cathode active material layer 138. Stated differently, cathode structure backbone 141 may include a cathode current collector 140. In certain other embodiments, however, cathode structure backbone 141 may optionally not include a cathode current collector 140.

In one embodiment, first secondary growth constraint 158 and second secondary growth constraint 160 each may include an inner surface 1060 and 1062, respectively, and an opposing outer surface 1064 and 1066, respectively, separated along the z-axis thereby defining a first secondary growth constraint 158 height $H_{158}$ and a second secondary growth constraint 160 height $H_{160}$. According to aspects of the disclosure, increasing the heights of either the first and/or second secondary growth constraints 158, 160, respectively, can increase the stiffness of the constraints, but can also require increased volume, thus causing a reduction in energy density for an energy storage device 100 or a secondary battery 102 containing the electrode assembly 106 and set of constraints 108. Accordingly, the thickness of the constraints 158, 160 can be selected in accordance with the constraint material properties, the strength of the constraint required to offset pressure from a predetermined expansion of an electrode 100, and other factors. For example, in one embodiment, the first and second secondary growth constraint heights $H_{158}$ and $H_{160}$, respectively, may be less than 50% of the height $H_{ES}$. By way of further example, in one embodiment, the first and second secondary growth constraint heights $H_{158}$ and $H_{160}$, respectively, may be less than 25% of the height $H_{ES}$. By way of further example, in one embodiment, the first and second secondary growth constraint heights $H_{158}$ and $H_{160}$, respectively, may be less than 10% of the height $H_{ES}$. By way of further example, in one embodiment, the first and second secondary growth constraint heights $H_{158}$ and $H_{160}$ may be may be less than about 5% of the height $H_{ES}$. In some embodiments, the first secondary growth constraint height $H_{158}$ and the second secondary growth constraint height $H_{160}$ may be different, and the materials used for each of the first and second secondary growth constraints 158, 160 may also be different.

In certain embodiments, the inner surfaces 1060 and 1062 may include surface features amenable to affixing the population of anode structures 110 and/or the population of cathode structures 112 thereto, and the outer surfaces 1064 and 1066 may include surface features amenable to the stacking of a plurality of constrained electrode assemblies 106 (i.e., inferred within FIG. 7, but not shown for clarity). For example, in one embodiment, the inner surfaces 1060 and 1062 or the outer surfaces 1064 and 1066 may be planar. By way of further example, in one embodiment, the inner surfaces 1060 and 1062 or the outer surfaces 1064 and 1066 may be non-planar. By way of further example, in one embodiment, the inner surfaces 1060 and 1062 and the outer surfaces 1064 and 1066 may be planar. By way of further example, in one embodiment, the inner surfaces 1060 and 1062 and the outer surfaces 1064 and 1066 may be non-planar. By way of further example, in one embodiment, the inner surfaces 1060 and 1062 and the outer surfaces 1064 and 1066 may be substantially planar.

As described elsewhere herein, modes for affixing the at least one secondary connecting member 166 embodied as anode structures 110 and/or cathode structures 112 to the inner surfaces 1060 and 1062 may vary depending upon the energy storage device 100 or secondary battery 102 and their intended use(s). As one exemplary embodiment shown in FIG. 7, the top 1052 and the bottom 1054 of the population of anode structures 110 (i.e., anode current collector 136, as shown) and the top 1068 and bottom 1070 of the population of cathode structures 112 (i.e., cathode current collector 140, as shown) may be affixed to the inner surface 1060 of the first secondary growth constraint 158 and the inner surface 1062 of the second secondary growth constraint 160 via a layer of glue 182. Alternatively, in certain embodiments only the anode current collectors 136, or only the cathode current collectors 140, may be affixed to serve as the at least one secondary connecting member 166, or another sub-structure of the anode and/or cathode structures may serve as the at least one secondary connecting member 166. Similarly, a top 1076 and a bottom 1078 of the first primary growth constraint 154, and a top 1080 and a bottom 1082 of the second primary growth constraint 156 may be affixed to the inner surface 1060 of the first secondary growth constraint 158 and the inner surface 1062 of the second secondary growth constraint 160 via a layer of glue 182.

Stated alternatively, in the embodiment shown in FIG. 7, the top 1052 and the bottom 1054 of the population of anode structures 110 include a height $H_{ES}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment. In addition, the top 1068 and the bottom 1070 of the population of cathode structures 112 include a height $H_{CES}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment.

Further, in another exemplary embodiment, a top 1056 and a bottom 1058 of the anode backbones 134, and a top 1072 and a bottom 1074 of the cathode backbones 141 may be affixed to the inner surface 1060 of the first secondary growth constraint 158 and the inner surface 1062 of the second secondary growth constraint 160 via a layer of glue 182 (not illustrated). Similarly, a top 1076 and a bottom 1078 of the first primary growth constraint 154, and a top 1080 and a bottom 1082 of the second primary growth constraint 156 may be affixed to the inner surface 1060 of the first secondary growth constraint 158 and the inner surface 1062 of the second secondary growth constraint 160 via a layer of glue 182 (not illustrated with respect to the embodiment described in this paragraph). Stated alternatively, the top 1056 and the bottom 1058 of the anode backbones 134 include a height $H_{ESB}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment. In addition, the top 1072 and the bottom 1074 of the cathode backbones 141 include a height $H_{CESB}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment.

Accordingly, in one embodiment, at least a portion of the population of anode 110 and/or cathode structures 112, and/or the separator 130 may serve as one or more secondary connecting members 166 to connect the first and second secondary growth constraints 158, 160, respectively, to one another in a secondary growth constraint system 152, thereby providing a compact and space-efficient constraint system to restrain growth of the electrode assembly 106 during cycling thereof. According to one embodiment, any portion of the anode 110 and/or cathode structures 112, and/or separator 130 may serve as the one or more secondary connecting members 166, with the exception of any portion of the anode 110 and/or cathode structure 112 that swells in volume with charge and discharge cycles. That is, that portion of the anode 110 and/or cathode structure 112, such as the anode active material 132, that is the cause of the volume change in the electrode assembly 106, typically will not serve as a part of the set of electrode constraints 108. In one embodiment, first and second primary growth constraints 154, 156, respectively, provided as a part of the primary growth constraint system 151 further inhibit growth in a longitudinal direction, and may also serve as secondary connecting members 166 to connect the first and second secondary growth constraints 158, 160, respectively, of the secondary growth constraint system 152, thereby providing a cooperative, synergistic constraint system (i.e., set of electrode constraints 108) for restraint of anode growth/swelling.

Secondary Battery

Referring now to FIG. 9, illustrated is an exploded view of one embodiment of a secondary battery 102. The secondary battery 102 includes battery enclosure 104 and a set of electrode assemblies 106a within the battery enclosure 104, each of the electrode assemblies 106 having a first longitudinal end surface 116, an opposing second longitudinal end surface 118 (i.e., separated from first longitudinal end surface 116 along the Y axis the Cartesian coordinate system shown), as described above. Each electrode assembly 106 includes a population of anode structures 110 and a population of cathode structures 112, stacked relative to each other within each of the electrode assemblies 106 in a stacking direction D; stated differently, the populations of anode 110 and cathode 112 structures are arranged in an alternating series of anodes 110 and cathodes 112 with the series progressing in the stacking direction D between first and second longitudinal end surfaces 116, 118, respectively (see, e.g., FIG. 2; as illustrated in FIG. 2 and FIG. 9, stacking direction D parallels the Y axis of the Cartesian coordinate system(s) shown), as described above. In addition, the stacking direction D within an individual electrode assembly 106 is perpendicular to the direction of stacking of a collection of electrode assemblies 106 within a set 106a (i.e., an electrode assembly stacking direction); stated differently, the electrode assemblies 106 are disposed relative to each other in a direction within a set 106a that is perpendicular to the stacking direction D within an individual electrode assembly 106 (e.g., the electrode assembly stacking direction is in a direction corresponding to the Z axis of the Cartesian coordinate system shown, whereas the stacking direction D within individual electrode assemblies 106 is in a direction corresponding to the Y axis of the Cartesian coordinate system shown).

While the set of electrode assemblies 106a depicted in the embodiment shown in FIG. 9 contains individual electrode assemblies 106 having the same general size, one or more of the individual electrode assemblies 106 may also and/or alternatively have different sizes in at least one dimension thereof, than the other electrode assemblies 106 in the set 106a. For example, according to one embodiment, the electrode assemblies 106 that are stacked together to form the set 106a provided in the secondary battery 102 may have different maximum widths $W_{EA}$ in the longitudinal direction (i.e., stacking direction D) of each assembly 106. According to another embodiment, the electrode assemblies 106 making up the stacked set 106a provided in the secondary battery 102 may have different maximum lengths $L_{EA}$ along the transverse axis that is orthogonal to the longitudinal axis. By way of further example, in one embodiment, each electrode assembly 106 that is stacked together to form the set of electrode assemblies 106a in the secondary battery 102 has a maximum width $W_{EA}$ along the longitudinal axis and a maximum length $L_{EA}$ along the transverse axis that is selected to provide an area of $L_{EA} \times W_{EA}$ that decreases along a direction in which the electrode assemblies 106 are stacked together to form the set of electrode assemblies 106a. For example, the maximum width $W_{EA}$ and maximum length $L_{EA}$ of each electrode assembly 106 may be selected to be less than that of an electrode assembly 106 adjacent thereto in a first direction in which the assemblies 106 are stacked, and to be greater than that of an electrode assembly 106 adjacent thereto in a second direction that is opposite thereto, such that the electrode assemblies 106 are stacked together to form a secondary battery 102 having a set of electrode assemblies 106a in a pyramidal shape. Alternatively, the maximum lengths $L_{EA}$ and maximum widths $W_{EA}$ for each electrode assembly 106 can be selected to provide different shapes and/or configurations for the stacked electrode assembly set 106a. The maximum vertical height $H_{EA}$ for one or more of the electrode assemblies 106 can also and/or alternatively be selected to be different from other assemblies 106 in the set 106a and/or to provide a stacked set 106a having a predetermined shape and/or configuration.

Tabs 190, 192 project out of the battery enclosure 104 and provide an electrical connection between the electrode assemblies 106 of set 106a and an energy supply or consumer (not shown). More specifically, in this embodiment tab 190 is electrically connected to tab extension 191 (e.g., using an electrically conductive glue), and tab extension 191 is electrically connected to the electrodes 110 comprised by each of the electrode assemblies 106. Similarly, tab 192 is electrically connected to tab extension 193 (e.g., using an electrically conductive glue), and tab extension 193 is electrically connected to the counter-electrodes 112 comprised by each of electrode assemblies 106.

Each electrode assembly 106 in the embodiment illustrated in FIG. 9 may have an associated primary growth constraint system 151 to restrain growth in the longitudinal direction (i.e., stacking direction D). Alternatively, in one embodiment, a plurality of electrode assemblies 106 making up a set 106a may share at least a portion of the primary growth constraint system 151. In the embodiment as shown, each primary growth constraint system 151 includes first and second primary growth constraints 154, 156, respectively, that may overlie first and second longitudinal end surfaces 116, 118, respectively, as described above; and first and second opposing primary connecting members 162, 164, respectively, that may overlie lateral surfaces 142, as described above. First and second opposing primary connecting members 162, 164, respectively, may pull first and second primary growth constraints 154, 156, respectively, towards each other, or alternatively stated, assist in restraining growth of the electrode assembly 106 in the longitudinal direction, and primary growth constraints 154, 156 may apply a compressive or restraint force to the opposing first and second longitudinal end surfaces 116, 118, respectively. As a result, expansion of the electrode assembly 106 in the longitudinal direction is inhibited during formation and/or cycling of the battery 102 between charged and discharged states. Additionally, primary growth constraint system 151 exerts a pressure on the electrode assembly 106 in the longitudinal direction (i.e., stacking direction D) that exceeds the pressure maintained on the electrode assembly 106 in either of the two directions that are mutually perpendicular to each other and are perpendicular to the longitudinal direction (e.g., as illustrated, the longitudinal direction corresponds to the direction of the Y axis, and the two directions that are mutually perpendicular to each other and to the longitudinal direction correspond to the directions of the X axis and the Z axis, respectively, of the illustrated Cartesian coordinate system).

Further, each electrode assembly 106 in the embodiment illustrated in FIG. 9 has an associated secondary growth constraint system 152 to restrain growth in the vertical direction (i.e., expansion of the electrode assembly 106, anodes 110, and/or cathodes 112 in the vertical direction (i.e., along the Z axis of the Cartesian coordinate system)). Alternatively, in one embodiment, a plurality of electrode assemblies 106 making up a set 106*a* share at least a portion of the secondary growth constraint system 152. Each secondary growth constraint system 152 includes first and second secondary growth constraints 158, 160, respectively, that may overlie corresponding lateral surfaces 142, respectively, and at least one secondary connecting member 166, each as described in more detail above. Secondary connecting members 166 may pull first and second secondary growth constraints 158, 160, respectively, towards each other, or alternatively stated, assist in restraining growth of the electrode assembly 106 in the vertical direction, and first and second secondary growth constraints 158, 160, respectively, may apply a compressive or restraint force to the lateral surfaces 142), each as described above in more detail. As a result, expansion of the electrode assembly 106 in the vertical direction is inhibited during formation and/or cycling of the battery 102 between charged and discharged states. Additionally, secondary growth constraint system 152 exerts a pressure on the electrode assembly 106 in the vertical direction (i.e., parallel to the Z axis of the Cartesian coordinate system) that exceeds the pressure maintained on the electrode assembly 106 in either of the two directions that are mutually perpendicular to each other and are perpendicular to the vertical direction (e.g., as illustrated, the vertical direction corresponds to the direction of the Z axis, and the two directions that are mutually perpendicular to each other and to the vertical direction correspond to the directions of the X axis and the Y axis, respectively, of the illustrated Cartesian coordinate system).

Further still, each electrode assembly 106 in the embodiment illustrated in FIG. 9 may have an associated primary growth constraint system 151—and an associated secondary growth constraint system 152—to restrain growth in the longitudinal direction and the vertical direction, as described in more detail above. Furthermore, according to certain embodiments, the anode and/or cathode tabs 190, 192, respectively, and tab extensions 191, 193 can serve as a part of the tertiary growth constraint system 155. For example, in certain embodiments, the tab extensions 191, 193 may extend along the opposing transverse surface regions 144, 146 to act as a part of the tertiary constraint system 155, such as the first and second tertiary growth constraints 157, 159. The tab extensions 191, 193 can be connected to the primary growth constraints 154, 156 at the longitudinal ends 117, 119 of the electrode assembly 106, such that the primary growth constraints 154, 156 serve as the at least one tertiary connecting member 165 that places the tab extensions 191, 193 in tension with one another to compress the electrode assembly 106 along the transverse direction, and act as first and second tertiary growth constraints 157, 159, respectively. Conversely, the tabs 190, 192 and/or tab extensions 191, 193 can also serve as the first and second primary connecting members 162, 164, respectively, for the first and second primary growth constraints 154, 156, respectively, according to one embodiment. In yet another embodiment, the tabs 190, 192 and/or tab extensions 191, 193 can serve as a part of the secondary growth constraint system 152, such as by forming a part of the at least one secondary connecting member 166 connecting the secondary growth constraints 158, 160. Accordingly, the tabs 190, 192 and/or tab extensions 191, 193 can assist in restraining overall macroscopic growth of the electrode assembly 106 by either serving as a part of one or more of the primary and secondary constraint systems 151, 152, respectively, and/or by forming a part of a tertiary growth constraint system 155 to constrain the electrode assembly 106 in a direction orthogonal to the direction being constrained by one or more of the primary and secondary growth constraint systems 151, 152, respectively.

To complete the assembly of the secondary battery 102, battery enclosure 104 is filled with a non-aqueous electrolyte (not shown) and lid 104*a* is folded over (along fold line, FL) and sealed to upper surface 104*b*. When fully assembled, the sealed secondary battery 102 occupies a volume bounded by its exterior surfaces (i.e., the displacement volume), the secondary battery enclosure 104 occupies a volume corresponding to the displacement volume of the battery (including lid 104*a*) less its interior volume (i.e., the prismatic volume bounded by interior surfaces 104*c*, 104*d*, 104*e*, 104*f*, 104*g* and lid 104*a*) and each growth constraint 151, 152 of set 106*a* occupies a volume corresponding to its respective displacement volume. In combination, therefore, the battery enclosure 104 and growth constraints 151, 152 occupy no more than 75% of the volume bounded by the outer surface of the battery enclosure 104 (i.e., the displacement volume of the battery). For example, in one such embodiment, the growth constraints 151, 152 and battery enclosure 104, in combination, occupy no more than 60% of the volume bounded by the outer surface of the battery enclosure 104. By way of further example, in one such embodiment, the constraints 151, 152 and battery enclosure 104, in combination, occupy no more than 45% of the volume bounded by the outer surface of the battery enclosure 104. By way of further example, in one such embodiment, the constraints 151, 152 and battery enclosure 104, in combination, occupy no more than 30% of the volume bounded by the outer surface of the battery enclosure 104. By way of further example, in one such embodiment, the constraints 151, 152 and battery enclosure 104, in combination, occupy no more than 20% of the volume bounded by the outer surface of the battery enclosure.

For ease of illustration in FIG. 9, secondary battery 102 includes only one set 106*a* of electrode assemblies 106 and the set 106*a* includes only six electrode assemblies 106. In practice, the secondary battery 102 may include more than one set of electrode assemblies 106*a*, with each of the sets 106*a* being disposed laterally relative to each other (e.g., in a relative direction lying within the X-Y plane of the Cartesian coordinate system of FIG. 9) or vertically relative to each other (e.g., in a direction substantially parallel to the Z axis of the Cartesian coordinate system of FIG. 9). Additionally, in each of these embodiments, each of the sets of electrode assemblies 106*a* may include one or more electrode assemblies 106. For example, in certain embodiments, the secondary battery 102 may comprise one, two, or more sets of electrode assemblies 106*a*, with each such set 106a including one or more electrode assemblies 106 (e.g., 1, 2, 3, 4, 5, 6, 10, 15, or more electrode assemblies 106 within each such set 106a) and, when the battery 102 includes two or more such sets 106a, the sets 106a may be laterally or vertically disposed relative to other sets of electrode assemblies 106a included in the secondary battery 102. In each of these various embodiments, each individual electrode assembly 106 may have its own growth constraint (s), as described above (i.e., a 1:1 relationship between electrode assemblies 106 and constraints 151, 152), two more electrode assemblies 106 may have a common growth constraint(s) 151, 152, as described above (i.e., a set of constraints 108 for two or more electrode assemblies 106), or two or more electrode assemblies 106 may share components of a growth constraint(s) 151, 152 (i.e., two or more electrode assemblies 106 may have a common compression member (e.g., second secondary growth constraint 158) and/or tension members 166, for example, as in the fused embodiment, as described above).

Other Battery Components

In certain embodiments, the set of electrode constraints 108, including a primary growth constraint system 151 and a secondary growth constraint system 152, as described above, may be derived from a sheet 2000 having a length $L_1$, width $W_1$, and thickness $t_1$, as shown for example in FIG. 9. More specifically, to form a primary growth constraint system 151, a sheet 2000 may be wrapped around an electrode assembly 106 and folded at folded at edges 2001 to enclose the electrode assembly 106. Alternatively, in one embodiment, the sheet 2000 may be wrapped around a plurality of electrode assemblies 106 that are stacked to form an electrode assembly set 106a. The edges of the sheet may overlap each other, and are welded, glued, or otherwise secured to each other to form a primary growth constraint system 151 including first primary growth constraint 154 and second primary growth constraint 156, and first primary connecting member 162 and second primary connecting member 164. In this embodiment, the primary growth constraint system 151 has a volume corresponding to the displacement volume of sheet 2000 (i.e., the multiplication product of $L_1$, $W_1$ and $t_1$). In one embodiment, the at least one primary connecting member is stretched in the stacking direction D to place the member in tension, which causes a compressive force to be exerted by the first and second primary growth constraints. Alternatively, the at least one secondary connecting member can be stretched in the second direction to place the member in tension, which causes a compressive force to be exerted by the first and second secondary growth constraints. In an alternative embodiment, instead of stretching the connecting members to place them in tension, the connecting members and/or growth constraints or other portion of one or more of the primary and secondary growth constraint systems may be pre-tensioned prior to installation over and/or in the electrode assembly. In another alternative embodiment, the connecting members and/or growth constraints and/or other portions of one or more of the primary and secondary growth constraint systems are not initially under tension at the time of installation into and/or over the electrode assembly, but rather, formation of the battery causes the electrode assembly to expand and induce tension in portions of the primary and/or secondary growth constraint systems such as the connecting members and/or growth constraints. (i.e., self-tensioning).

Sheet 2000 may comprise any of a wide range of compatible materials capable of applying the desired force to the electrode assembly 106. In general, the primary growth constraint system 151 will typically comprise a material that has an ultimate tensile strength of at least 10,000 psi (>70 MPa), that is compatible with the battery electrolyte, does not significantly corrode at the floating or anode potential for the battery 102, and does not significantly react or lose mechanical strength at 45° C., and even up to 70° C. For example, the primary growth constraint system 151 may comprise any of a wide range of metals, alloys, ceramics, glass, plastics, or a combination thereof (i.e., a composite). In one exemplary embodiment, primary growth constraint system 151 comprises a metal such as stainless steel (e.g., SS 316, 440 C or 440 C hard), aluminum (e.g., aluminum 7075-T6, hard H18), titanium (e.g., 6Al-4V), beryllium, beryllium copper (hard), copper ($O_2$ free, hard), nickel; in general, however, when the primary growth constraint system 151 comprises metal it is generally preferred that it be incorporated in a manner that limits corrosion and limits creating an electrical short between the anodes 110 and cathodes 112. In another exemplary embodiment, the primary growth constraint system 151 comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the primary growth constraint system 151 comprises a glass such as Schott D263 tempered glass. In another exemplary embodiment, the primary growth constraint system 151 comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the primary growth constraint system 151 comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the primary growth constraint system 151 comprises fibers such as Kevlar 49 Aramid Fiber, S Glass Fibers, Carbon Fibers, Vectran UM LCP Fibers, Dyneema, Zylon.

Thickness ($t_1$) of the primary growth constraint system 151 will depend upon a range of factors including, for example, the material(s) of construction of the primary growth constraint system 151, the overall dimensions of the electrode assembly 106, and the composition of a battery anode and cathode. In some embodiments, for example, the primary growth constraint system 151 will comprise a sheet having a thickness in the range of about 10 to about 100 micrometers. For example, in one such embodiment, the primary growth constraint system 151 comprises a stainless steel sheet (e.g., SS316) having a thickness of about 30 μm. By way of further example, in another such embodiment, the primary growth constraint system 151 comprises an aluminum sheet (e.g., 7075-T6) having a thickness of about 40 μm. By way of further example, in another such embodiment, the primary growth constraint system 151 comprises a zirconia sheet (e.g., Coorstek YZTP) having a thickness of about 30 μm. By way of further example, in another such embodiment, the primary growth constraint system 151 comprises an E Glass UD/Epoxy 0 deg sheet having a thickness of about 75 μm. By way of further example, in another such embodiment, the primary growth constraint system 151 comprises 12 μm carbon fibers at >50% packing density.

Without being bound to any particular theory, methods for gluing, as described herein, may include gluing, soldering, bonding, sintering, press contacting, brazing, thermal spraying joining, clamping, or combinations thereof. Gluing may include joining the materials with conductive materials such as conducting epoxies, conducting elastomers, mixtures of insulating organic glue filled with conducting metals, such as nickel filled epoxy, carbon filled epoxy etc. Conductive pastes may be used to join the materials together and the joining strength could be tailored by temperature (sintering), light (UV curing, cross-linking), chemical curing (catalyst based cross linking). Bonding processes may include wire bonding, ribbon bonding, ultrasonic bonding. Welding processes may include ultrasonic welding, resistance welding, laser beam welding, electron beam welding, induction welding, and cold welding. Joining of these materials can also be performed by using a coating process such as a thermal spray coating such as plasma spraying, flame spraying, arc spraying, to join materials together. For example, a nickel or copper mesh can be joined onto a nickel bus using a thermal spray of nickel as a glue.

Members of the anode 110 and cathode structure 112 populations can include an electroactive material capable of absorbing and releasing a carrier ion such as lithium, sodium, potassium, calcium, magnesium or aluminum ions. In some embodiments, members of the anode structure 110 population include an anodically active electroactive material (sometimes referred to as a negative electrode) and members of the cathode structure 112 population include a cathodically active electroactive material (sometimes referred to as a positive electrode). In each of the embodiments and examples recited in this paragraph, negative electrode active material may be a particulate agglomerate electrode or a monolithic electrode.

Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy thereof.

Exemplary cathode active materials include any of a wide range of cathode active materials. For example, for a lithium-ion battery, the cathode active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $L_1(Ni_xCo_yAl_z)O_2$, $LiFePO_4$, $Li_2MnO_4$, $V_2O_5$, molybdenum oxysulfides, phosphates, silicates, vanadates and combinations thereof.

In one embodiment, the anode active material is microstructured to provide a significant void volume fraction to accommodate volume expansion and contraction as lithium ions (or other carrier ions) are incorporated into or leave the negative electrode active material during charging and discharging processes. In general, the void volume fraction of the anode active material is at least 0.1. Typically, however, the void volume fraction of the negative electrode active material is not greater than 0.8. For example, in one embodiment, the void volume fraction of the negative electrode active material is about 0.15 to about 0.75. By way of the further example, in one embodiment, the void volume fraction of the anode active material is about 0.2 to about 0.7. By way of the further example, in one embodiment, the void volume fraction of the anode active material is about 0.25 to about 0.6.

Depending upon the composition of the microstructured anode active material and the method of its formation, the microstructured anode active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the anode active material contains voids having openings at the lateral surface of the anode active material through which lithium ions (or other carrier ions) can enter or leave the anode active material; for example, lithium ions may enter the anode active material through the void openings after leaving the cathode active material. In another embodiment, the void volume comprises closed voids, that is, the anode active material contains voids that are enclosed by anode active material. In general, open voids can provide greater interfacial surface area for the carrier ions whereas closed voids tend to be less susceptible to solid electrolyte interface while each provides room for expansion of the negative electrode active material upon the entry of carrier ions. In certain embodiments, therefore, it is preferred that the anode active material comprise a combination of open and closed voids.

In one embodiment, anode active material comprises porous aluminum, tin or silicon or an alloy thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anode active material will generally have a porosity fraction of at least about 0.1, but less than 0.8 and have a thickness of about 1 to about 100 micrometers. For example, in one embodiment, anode active material comprises porous silicon, has a thickness of about 5 to about 100 micrometers, and has a porosity fraction of about 0.15 to about 0.75. By way of further example, in one embodiment, anode active material comprises porous silicon, has a thickness of about 10 to about 80 micrometers, and has a porosity fraction of about 0.15 to about 0.7. By way of further example, in one such embodiment, anode active material comprises porous silicon, has a thickness of about 20 to about 50 micrometers, and has a porosity fraction of about 0.25 to about 0.6. By way of further example, in one embodiment, anode active material comprises a porous silicon alloy (such as nickel silicide), has a thickness of about 5 to about 100 micrometers, and has a porosity fraction of about 0.15 to about 0.75.

In another embodiment, anode active material comprises fibers of aluminum, tin or silicon, or an alloy thereof. Individual fibers may have a diameter (thickness dimension) of about 5 nm to about 10,000 nm and a length generally corresponding to the thickness of the anode active material. Fibers (nanowires) of silicon may be formed, for example, by chemical vapor deposition or other techniques known in the art such as vapor liquid solid (VLS) growth and solid liquid solid (SLS) growth. Additionally, the anode active material will generally have a porosity fraction of at least about 0.1, but less than 0.8 and have a thickness of about 1 to about 200 micrometers. For example, in one embodiment, anode active material comprises silicon nanowires, has a thickness of about 5 to about 100 micrometers, and has a porosity fraction of about 0.15 to about 0.75. By way of further example, in one embodiment, anode active material comprises silicon nanowires, has a thickness of about 10 to about 80 micrometers, and has a porosity fraction of about 0.15 to about 0.7. By way of further example, in one such embodiment, anode active material comprises silicon nanowires, has a thickness of about 20 to about 50 micrometers, and has a porosity fraction of about 0.25 to about 0.6. By way of further example, in one embodiment, anode active material comprises nanowires of a silicon alloy (such as nickel silicide), has a thickness of about 5 to about 100 micrometers, and has a porosity fraction of about 0.15 to about 0.75.

In one embodiment, each member of the anode 110 population has a bottom, a top, and a longitudinal axis ($A_E$) extending from the bottom to the top thereof and in a direction generally perpendicular to the direction in which the alternating sequence of anode structures 110 and cathode structures 112 progresses. Additionally, each member of the anode 110 population has a length ($L_A$) measured along the longitudinal axis ($A_E$) of the anode, a width ($W_A$) measured in the direction in which the alternating sequence of anode structures and cathode structures progresses, and a height ($H_A$) measured in a direction that is perpendicular to each of the directions of measurement of the length ($L_A$) and the width ($W_A$). Each member of the anode population also has a perimeter ($P_A$) that corresponds to the sum of the length(s) of the side(s) of a projection of the electrode in a plane that is normal to its longitudinal axis. Exemplary values for the length $L_A$, width $W_A$ and height $H_A$ are discussed in greater detail above According to one embodiment, the members of the anode population include one or more first anode members having a first height, and one or more second anode members having a second height that is other than the first. For example, in one embodiment, the one or more first anode members may have a height selected to allow the anode members to contact a portion of the secondary constraint system in the vertical direction (Z axis). For example, the height of the one or more first anode members may be sufficient such that the first anode members extend between and contact both the first and second secondary growth constraints 158, 160 along the vertical axis, such as when at least one of the first anode members or a substructure thereof serves as a secondary connecting member 166. Furthermore, according to one embodiment, one or more second anode members may have a height that is less than the one or more first anode members, such that for example the one or more second anode members do not fully extend to contact both of the first and second secondary growth constraints 158, 160. In yet another embodiment, the different heights for the one or more first anode members and one or more second anode members may be selected to accommodate a predetermined shape for the electrode assembly 106, such as an electrode assembly shape having a different heights along one or more of the longitudinal and/or transverse axis, and/or to provide predetermined performance characteristics for the secondary battery.

The perimeter ($P_A$) of the members of the anode population will similarly vary depending upon the energy storage device and its intended use. In general, however, members of the anode population will typically have a perimeter ($P_A$) within the range of about 0.025 mm to about 25 mm. For example, in one embodiment, the perimeter ($P_A$) of each member of the anode population will be in the range of about 0.1 mm to about 15 mm. By way of further example, in one embodiment, the perimeter ($P_A$) of each member of the anode population will be in the range of about 0.5 mm to about 10 mm.

In general, members of the anode population have a length ($L_A$) that is substantially greater than each of its width ($W_A$) and its height ($H_A$). For example, in one embodiment, the ratio of $L_A$ to each of $W_A$ and $H_A$ is at least 5:1, respectively (that is, the ratio of $L_A$ to $W_A$ is at least 5:1, respectively and the ratio of $L_A$ to $H_A$ is at least 5:1, respectively), for each member of the anode population. By way of further example, in one embodiment the ratio of $L_A$ to each of $W_A$ and $H_A$ is at least 10:1. By way of further example, in one embodiment, the ratio of $L_A$ to each of $W_A$ and $H_A$ is at least 15:1. By way of further example, in one embodiment, the ratio of $L_A$ to each of $W_A$ and $H_A$ is at least 20:1, for each member of the anode population.

Additionally, it is generally preferred that members of the anode population have a length ($L_A$) that is substantially greater than its perimeter ($P_A$), for example, in one embodiment, the ratio of $L_A$ to $P_A$ is at least 1.25:1, respectively, for each member of the anode population. By way of further example, in one embodiment the ratio of $L_A$ to $P_A$ is at least 2.5:1, respectively, for each member of the anode population. By way of further example, in one embodiment, the ratio of $L_A$ to $P_A$ is at least 3.75:1, respectively, for each member of the anode population.

In one embodiment, the ratio of the height ($H_A$) to the width ($W_A$) of the members of the anode population is at least 0.4:1, respectively. For example, in one embodiment, the ratio of $H_A$ to $W_A$ will be at least 2:1, respectively, for each member of the anode population. By way of further example, in one embodiment the ratio of $H_A$ to $W_A$ will be at least 10:1, respectively. By way of further example, in one embodiment the ratio of $H_A$ to $W_A$ will be at least 20:1, respectively. Typically, however, the ratio of $H_A$ to $W_A$ will generally be less than 1,000:1, respectively. For example, in one embodiment the ratio of $H_A$ to $W_A$ will be less than 500:1, respectively. By way of further example, in one embodiment the ratio of $H_A$ to $W_A$ will be less than 100:1, respectively. By way of further example, in one embodiment the ratio of $H_A$ to $W_A$ will be less than 10:1, respectively. By way of further example, in one embodiment the ratio of $H_A$ to $W_A$ will be in the range of about 2:1 to about 100:1, respectively, for each member of the anode population.

Each member of the cathode population has a bottom, a top, and a longitudinal axis ($A_{CE}$) extending from the bottom to the top thereof and in a direction generally perpendicular to the direction in which the alternating sequence of anode structures and cathode structures progresses. Additionally, each member of the cathode population has a length ($L_C$) measured along the longitudinal axis ($A_{CE}$), a width ($W_C$) measured in the direction in which the alternating sequence of anode structures and cathode structures progresses, and a height ($H_C$) measured in a direction that is perpendicular to each of the directions of measurement of the length ($L_C$) and the width ($W_C$). Each member of the cathode population also has a perimeter (Pc) that corresponds to the sum of the length(s) of the side(s) of a projection of the cathode in a plane that is normal to its longitudinal axis.

According to one embodiment, the members of the cathode population include one or more first cathode members having a first height, and one or more second cathode members having a second height that is other than the first. For example, in one embodiment, the one or more first cathode members may have a height selected to allow the cathode members to contact a portion of the secondary constraint system in the vertical direction (Z axis). For example, the height of the one or more first cathode members may be sufficient such that the first cathode members extend between and contact both the first and second secondary growth constraints 158, 160 along the vertical axis, such as when at least one of the first cathode members or a substructure thereof serves as a secondary connecting member 166. Furthermore, according to one embodiment, one or more second cathode members may have a height that is less than the one or more first cathode members, such that for example the one or more second cathode members do not fully extend to contact both of the first and second secondary growth constraints 158, 160. In yet another embodiment, the different heights for the one or more first cathode members and one or more second cathode members may be selected to accommodate a predetermined shape for the electrode assembly 106, such as an electrode assembly shape having a different heights along one or more of the longitudinal and/or transverse axis, and/or to provide predetermined performance characteristics for the secondary battery.

The perimeter (Pc) of the members of the cathode population will also vary depending upon the energy storage device and its intended use. In general, however, members of the cathode population will typically have a perimeter (Pc) within the range of about 0.025 mm to about 25 mm. For example, in one embodiment, the perimeter (Pc) of each member of the cathode population will be in the range of about 0.1 mm to about 15 mm. By way of further example, in one embodiment, the perimeter (Pc) of each member of the cathode population will be in the range of about 0.5 mm to about 10 mm.

In general, each member of the cathode population has a length ($L_C$) that is substantially greater than width ($W_C$) and substantially greater than its height ($H_C$). For example, in one embodiment, the ratio of $L_C$ to each of $W_C$ and $H_C$ is at least 5:1, respectively (that is, the ratio of $L_C$ to $W_C$ is at least 5:1, respectively and the ratio of $L_C$ to $H_C$ is at least 5:1, respectively), for each member of the cathode population. By way of further example, in one embodiment the ratio of $L_C$ to each of $W_C$ and $H_C$ is at least 10:1 for each member of the cathode population. By way of further example, in one embodiment, the ratio of $L_C$ to each of $W_C$ and $H_C$ is at least 15:1 for each member of the cathode population. By way of further example, in one embodiment, the ratio of $L_C$ to each of $W_C$ and $H_C$ is at least 20:1 for each member of the cathode population.

Additionally, it is generally preferred that members of the cathode population have a length ($L_C$) that is substantially greater than its perimeter (Pc); for example, in one embodiment, the ratio of $L_C$ to Pc is at least 1.25:1, respectively, for each member of the cathode population. By way of further example, in one embodiment the ratio of $L_C$ to Pc is at least 2.5:1, respectively, for each member of the cathode population. By way of further example, in one embodiment, the ratio of $L_C$ to Pc is at least 3.75:1, respectively, for each member of the cathode population.

In one embodiment, the ratio of the height ($H_C$) to the width ($W_C$) of the members of the cathode population is at least 0.4:1, respectively. For example, in one embodiment, the ratio of $H_C$ to $W_E$ will be at least 2:1, respectively, for each member of the cathode population. By way of further example, in one embodiment the ratio of $H_C$ to $W_C$ will be at least 10:1, respectively, for each member of the cathode population. By way of further example, in one embodiment the ratio of $H_C$ to $W_C$ will be at least 20:1, respectively, for each member of the cathode population. Typically, however, the ratio of $H_C$ to $W_C$ will generally be less than 1,000:1, respectively, for each member of the cathode population. For example, in one embodiment the ratio of $H_C$ to $W_C$ will be less than 500:1, respectively, for each member of the cathode population. By way of further example, in one embodiment the ratio of $H_C$ to $W_C$ will be less than 100:1, respectively. By way of further example, in one embodiment the ratio of $H_C$ to $W_C$ will be less than 10:1, respectively. By way of further example, in one embodiment the ratio of $H_C$ to $W_C$ will be in the range of about 2:1 to about 100:1, respectively, for each member of the cathode population.

In one embodiment the anode current conductor layer 136 comprised by each member of the anode population has a length $L_{NC}$ that is at least 50% of the length $L_{NE}$ of the member comprising such anode current collector. By way of further example, in one embodiment the anode current conductor layer 136 comprised by each member of the anode population has a length $L_{NC}$ that is at least 60% of the length $L_{NE}$ of the member comprising such anode current collector. By way of further example, in one embodiment the anode current conductor layer 136 comprised by each member of the anode population has a length $L_{NC}$ that is at least 70% of the length $L_{NE}$ of the member comprising such anode current collector. By way of further example, in one embodiment the anode current conductor layer 136 comprised by each member of the anode population has a length $L_{NC}$ that is at least 80% of the length $L_{NE}$ of the member comprising such anode current collector. By way of further example, in one embodiment the anode current conductor 136 comprised by each member of the anode population has a length $L_{NC}$ that is at least 90% of the length $L_{NE}$ of the member comprising such anode current collector.

In one embodiment, the cathode current conductor 140 comprised by each member of the cathode population has a length $L_{PC}$ that is at least 50% of the length $L_{PE}$ of the member comprising such cathode current collector. By way of further example, in one embodiment the cathode current conductor 140 comprised by each member of the cathode population has a length $L_{PC}$ that is at least 60% of the length $L_{PE}$ of the member comprising such cathode current collector. By way of further example, in one embodiment the cathode current conductor 140 comprised by each member of the cathode population has a length $L_{PC}$ that is at least 70% of the length $L_{PE}$ of the member comprising such cathode current collector. By way of further example, in one embodiment the cathode current conductor 140 comprised by each member of the cathode population has a length $L_{PC}$ that is at least 80% of the length $L_{PE}$ of the member comprising such cathode current collector. By way of further example, in one embodiment the cathode current conductor 140 comprised by each member of the cathode population has a length $L_{PC}$ that is at least 90% of the length $L_{PE}$ of the member comprising such cathode current collector.

In one embodiment, being positioned between the anode active material layer and the separator, anode current collector 136 may facilitate more uniform carrier ion transport by distributing current from the anode current collector across the surface of the anode active material layer. This, in turn, may facilitate more uniform insertion and extraction of carrier ions and thereby reduce stress in the anode active material during cycling, since anode current collector 136 distributes current to the surface of the anode active material layer facing the separator, the reactivity of the anode active material layer for carrier ions will be the greatest where the carrier ion concentration is the greatest. In yet another embodiment, the positions of the anode current collector 136 and the anode active material layer may be reversed.

According to one embodiment, each member of the cathode structure population has a cathode current collector 140 that may be disposed, for example, between the cathode backbone and the cathode active material layer. Furthermore, one or more of the anode current collector 136 and cathode electrode current collector 140 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector 140 comprises gold or an alloy thereof such as gold silicide. By way of further example, in one embodiment, cathode current collector 140 comprises nickel or an alloy thereof such as nickel silicide.

In an alternative embodiment, the positions of the cathode current collector layer and the cathode electrode active material layer may be reversed, for example such that that the cathode electrode current collector layer is positioned between the separator layer and the cathode active material layer. In such embodiments, the cathode electrode current collector 140 for the immediately adjacent cathode active material layer comprises an ionically permeable conductor having a composition and construction as described in connection with the anode current collector layer; that is, the cathode current collector layer comprises a layer of an ionically permeable conductor material that is both ionically and electrically conductive. In this embodiment, the cathode electrode current collector layer has a thickness, an electrical conductivity, and an ionic conductivity for carrier ions that facilitates the movement of carrier ions between an immediately adjacent cathode electrode active material layer on one side of the cathode electrode current collector layer and an immediately adjacent separator layer on the other side of the cathode electrode current collector layer in an electrochemical stack.

Electrically insulating separator layers 130 may surround and electrically isolate each member of the anode structure 110 population from each member of the cathode structure 112 population. Electrically insulating separator layers 130 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the anode and cathode populations. In certain embodiments, for example, and ignoring the porosity of the microporous separator material, at least 70 vol % of electrically insulating separator material between a member of the anode structure 110 population and the nearest member(s) of the cathode structure 112 population (i.e., an "adjacent pair") for ion exchange during a charging or discharging cycle is a microporous separator material; stated differently, microporous separator material constitutes at least 70 vol % of the electrically insulating material between a member of the anode structure 110 population and the nearest member of the cathode 112 structure population. By way of further example, in one embodiment, and ignoring the porosity of the microporous separator material, microporous separator material constitutes at least 75 vol % of the electrically insulating separator material layer between adjacent pairs of members of the anode structure 110 population and members of the cathode structure 112 population, respectively. By way of further example, in one embodiment, and ignoring the porosity of the microporous separator material, the microporous separator material constitutes at least 80 vol % of the electrically insulating separator material layer between adjacent pairs of members of the anode structure 110 population and members of the cathode structure 112 population, respectively. By way of further example, in one embodiment, and ignoring the porosity of the microporous separator material, the microporous separator material constitutes at least 85 vol % of the electrically insulating separator material layer between adjacent pairs of members of the anode structure 110 population and members of the cathode structure 112 population, respectively. By way of further example, in one embodiment, and ignoring the porosity of the microporous separator material, the microporous separator material constitutes at least 90 vol % of the electrically insulating separator material layer between adjacent pairs of members of the anode structure 110 population and member of the cathode structure 112 population, respectively. By way of further example, in one embodiment, and ignoring the porosity of the microporous separator material, the microporous separator material constitutes at least 95 vol % of the electrically insulating separator material layer between adjacent pairs of members of the anode structure 110 population and members of the cathode structure 112 population, respectively. By way of further example, in one embodiment, and ignoring the porosity of the microporous separator material, the microporous separator material constitutes at least 99 vol % of the electrically insulating separator material layer between adjacent pairs of members of the anode structure 110 population and members of the cathode structure 112 population, respectively.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1\times10^{-4}$ S/cm. By way of further example, in one embodiment, the particulate material has a conductivity for carrier ions of less than $1\times10^{-5}$ S/cm. By way of further example, in one embodiment, the particulate material has a conductivity for carrier ions of less than $1\times10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

Microporous separator materials may be deposited, for example, by electrophoretic deposition of a particulate separator material in which particles are coalesced by surface energy such as electrostatic attraction or van der Waals forces, slurry deposition (including spin or spray coating) of a particulate separator material, screen printing, dip coating, and electrostatic spray deposition. Binders may be included in the deposition process; for example, the particulate material may be slurry deposited with a dissolved binder that precipitates upon solvent evaporation, electrophoretically deposited in the presence of a dissolved binder material, or co-electrophoretically deposited with a binder and insulating particles etc. Alternatively, or additionally, binders may be added after the particles are deposited into or onto the electrode structure; for example, the particulate material may be dispersed in an organic binder solution and dip coated or spray-coated, followed by drying, melting, or cross-linking the binder material to provide adhesion strength.

In an assembled energy storage device, the microporous separator material is permeated with a non-aqueous electrolyte suitable for use as a secondary battery electrolyte. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Furthermore, according to one embodiment, components of the secondary battery 102 including the microporous separator 130 and other anode 110 and/or cathode 112 structures comprise a configuration and composition that allow the components to function, even in a case where expansion of anode active material 132 occurs during charge and discharge of the secondary battery 102. That is, the components may be structured such that failure of the components due to expansion of the electrode active material 132 during charge/discharge thereof is within acceptable limits.

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. A secondary battery for cycling between a charged state and a discharged state, the secondary battery comprising a battery enclosure, an electrode assembly, carrier ions, and a non-aqueous liquid electrolyte within the battery enclosure,
   the electrode assembly comprising a population of anode structures, a population of cathode structures, and an electrically insulating microporous separator material electrically separating members of the population of anode structures and the population of cathode structures,
   the population of anode structures and the population of cathode structures are arranged in an alternating sequence in a longitudinal direction, each member of the population of anode structures has a first cross-sectional area, $A_1$, when the secondary battery is in the charged state and a second cross-sectional area, $A_2$, when the secondary battery is in the discharged state,
   each member of the population of cathode structures has a first cross-sectional area, $C_1$, when the secondary battery is in the charged state and a second cross-sectional area, $C_2$, when the secondary battery is in the discharged state, and the first cross-sectional area and the second cross-sectional area of the members of the population of anode structures and of the population of cathode structures, are measured in a first longitudinal plane parallel to the longitudinal direction;
   the electrode assembly further comprising a set of electrode constraints that at least partially restrains growth of the electrode assembly in the longitudinal direction upon cycling of the secondary battery between the charged state and discharged state; and
   each member of the population of cathode structures comprises a layer of a cathode active material comprising filler particles that are compressible and elastic, and each member of the population of anode structures comprises a layer of an anode active material having a capacity to accept more than one mole of carrier ion per mole of anode active material when the secondary battery is charged from the discharged state to the charged state,
   $A_1$ being greater than $A_2$ for each of the members of a subset of the population of anode structures and $C_1$ is less than $C_2$ for each of the members of a subset of the population of cathode structures, and a difference $C_2-C_1$ does not exceed a difference $A_1-A_2$ during the cycling of the secondary battery.

2. The secondary battery of claim 1, wherein the charged state is at least 75% of a rated capacity of the secondary battery, and the discharged state is less than 25% of the rated capacity of the secondary battery.

3. The secondary battery of claim 1, wherein a ratio $C_2$ to $C_1$ for each member of the subset of the population of cathode structures is at least 1.1:1.

4. The secondary battery of claim 1, wherein the subset of the population of anode structures has (a) a first median cross-sectional area $MA_{A1}$ when the secondary battery is in the charged state and (b) a second median cross-sectional area $MA_{A2}$ when the secondary battery is in the discharged state, and the subset of the population of cathode structures has a first median cross-sectional area $MA_{C1}$ (c) when the secondary battery is in the charged state and (d) a second median cross-sectional area $MA_{C2}$ when the secondary battery is in the discharged state, wherein $MA_{A1}$ is greater than $MA_{A2}$ and $MA_{C1}$ is less than $MA_{C2}$.

5. The secondary battery of claim 1, wherein at least one member of the subset of the population of anode structure has (a) a first median cross-sectional area $ML_{A1}$ when the secondary battery is in the charged state, and (b) a second median cross-sectional area $ML_{A2}$ when the secondary battery is in the discharged state, and at least one member of the subset of the population of cathode structure has (c) a first median cross-sectional area $ML_{C1}$ when the secondary battery is in the charged state, and (d) a second median cross-sectional area $ML_{C2}$ when the secondary battery is in the discharged state, wherein $ML_{A1}$, $ML_{A2}$, $ML_{C1}$ and $ML_{C2}$, are measured in a plurality of longitudinal planes parallel to the longitudinal direction for each member, and
   wherein $ML_{A1}$ is greater than $ML_{A2}$ for each of the members of the subset of the population of anode structures and $ML_{C1}$ is less than $ML_{C2}$ for each of the members of the subset of the population of cathode structures.

6. The secondary battery of claim 1, wherein members of the population of cathode structures comprise a layer of cathode active material that is porous, and wherein the layer of cathode active material has a first porosity $P_1$ when the secondary battery is in a charged state, and a second porosity $P_2$ when the secondary battery is in a discharged state, the first porosity $P_1$ being less than the second porosity $P_2$.

7. The secondary battery of claim 1, wherein the cathode active material of members of the population of cathode structures comprise particles of cathode active materials dispersed in a matrix.

8. The secondary battery of claim 7, wherein the cathode active material comprises particles of the cathode active material selected from the group consisting of transition metal oxides, transition metal sulfides, transition metal nitrides, lithium-transition metal oxides, lithium-transition metal sulfides, and lithium-transition metal nitrides, dispersed in the matrix, the matrix comprising a polymeric material.

9. The secondary battery of claim 1, wherein the set of electrode constraints comprises:
   a primary constraint system comprising first and second primary growth constraints and at least one primary connecting member,
   the first and second primary growth constraints separated from each other in the longitudinal direction and the at least one primary connecting member connecting the first and second primary growth constraints, wherein the primary constraint system at least partially restrains growth of the electrode assembly in the longitudinal direction upon cycling of the secondary battery.

10. The secondary battery of claim 9, wherein the set of electrode constraints further comprises:
a secondary constraint system comprising first and second secondary growth constraints separated in a second direction and connected by at least one secondary connecting member,
wherein the secondary constraint system at least partially restrains growth of the electrode assembly in a second direction upon cycling of the secondary battery, the second direction being orthogonal to the longitudinal direction.

11. A secondary battery for cycling between a charged state and a discharged state, the secondary battery comprising a battery enclosure, an electrode assembly, carrier ions, and a non-aqueous liquid electrolyte within the battery enclosure,
the electrode assembly comprising a population of anode structures, a population of cathode structures, and an electrically insulating microporous separator material electrically separating members of the population of anode structures and the population of cathode structures,
the population of anode structures and population of cathode structures are arranged in an alternating sequence in a longitudinal direction, each member of the population of anode structures has a first cross-sectional area, $A_1$, when the secondary battery is in the charged state and a second cross-sectional area, $A_2$, when the secondary battery is in the discharged state,
each member of the population of cathode structures has a first cross-sectional area, $C_1$, when the secondary battery is in the charged state and a second cross-sectional area, $C_2$, when the secondary battery is in the discharged state, and the first cross-sectional area and the second cross-sectional area of the members of the population of anode structures and of the population of cathode structures, are measured in a first longitudinal plane that is parallel to the longitudinal direction;
the electrode assembly further comprising a set of electrode constraints that at least partially restrains growth of the electrode assembly in the longitudinal direction upon cycling of the secondary battery between the charged state and the discharged state;
each member of the population of cathode structures comprising a layer of a cathode active material comprising filler particles, and each member of the population of anode structures comprises a layer of an anode active material having a capacity to accept more than one mole of carrier ion per mole of anode active material when the secondary battery is charged from a discharged state to a charged state,
a ratio $C_2$ to $C_1$ for each of the members of a subset of the population of cathode structures being at least 1.1 to 1 (1.1:1),
$A_1$ being greater than $A_2$ for each of the members of a subset of the population of anode structures and $C_1$ is less than $C_2$ for each of the members of the subset of the population of cathode structures, and a difference $C_2-C_1$ does not exceed a difference $A_1-A_2$ during cycling of the secondary battery.

12. The secondary battery of claim 11, wherein the charged state is at least 75% of a rated capacity of the secondary battery, and the discharged state is less than 25% of the rated capacity of the secondary battery.

13. The secondary battery of claim 11, wherein the filler particles of the layer of the cathode active material are compressible and elastic.

14. The secondary battery of claim 11, wherein the subset of the population of anode structures has (a) a first median cross-sectional area $MA_{A1}$ when the secondary battery is in the charged state and (b) a second median cross-sectional area $MA_{A2}$ when the secondary battery is in the discharged state, and the subset of the population of cathode structure has (c) a first median cross-sectional area $MA_{C1}$ when the secondary battery is in the charged state and (d) a second median cross-sectional area $MA_{C2}$ when the secondary battery is in the discharged state, wherein $MA_{A1}$ is greater than $MA_{A2}$ and $MA_{C1}$ is less than $MA_{C2}$.

15. The secondary battery of claim 11, wherein at least one member of the subset of the population of anode structures has (a) a first median cross-sectional area $ML_{A1}$ when the secondary battery is in the charged state, and (b) a second median cross-sectional area $ML_{A2}$ when the secondary battery is in the discharged state, and at least one member of the subset of the population of cathode structure has (c) a first median cross-sectional area $ML_{C1}$ when the secondary battery is in the charged state, and (d) a second median cross-sectional area $ML_{C2}$ when the secondary battery is in the discharged state, where $ML_{A1}$, $ML_{A2}$, $ML_{C1}$ and $ML_{C2}$, are measured in a plurality of longitudinal planes parallel to the longitudinal direction for each member, and
wherein $ML_{A1}$ is greater than $ML_{A2}$ for each of the members of the subset of the population of anode structures and $ML_{C1}$ is less than $ML_{C2}$ for each of the members of the subset of the population of cathode structures.

16. The secondary battery of claim 11, wherein members of the population of cathode structures comprise a layer of cathode active material that is porous, and wherein the layer of cathode active material has a first porosity $P_1$ when the secondary battery is in a charged state, and a second porosity $P_2$ when the secondary battery is in a discharged state, the first porosity $P_1$ being less than the second porosity $P_2$.

17. The secondary battery of claim 11, wherein the cathode active material layers of members of the population of cathode structures comprise particles of cathode active materials dispersed in a matrix.

18. The secondary battery of claim 17, wherein the cathode active material comprises particles of cathode active material selected from the group consisting of transition metal oxides, transition metal sulfides, transition metal nitrides, lithium-transition metal oxides, lithium-transition metal sulfides, and lithium-transition metal nitrides, dispersed in the matrix, the matrix comprising a polymeric material.

19. The secondary battery of claim 11, wherein the set of electrode constraints comprises:
a primary constraint system comprising first and second primary growth constraints and at least one primary connecting member,
the first and second primary growth constraints separated from each other in the longitudinal direction and the at least one primary connecting member connecting the first and second primary growth constraints, wherein the primary constraint system at least partially restrains growth of the electrode assembly in the longitudinal direction upon cycling of the secondary battery.

20. The secondary battery of claim 19, wherein the set of electrode constraints further comprises:
a secondary constraint system comprising first and second secondary growth constraints separated in a second direction and connected by at least one secondary connecting member, wherein the secondary constraint system at least partially restrains growth of the electrode assembly in a second direction upon cycling of the secondary battery, the second direction being orthogonal to the longitudinal direction.

* * * * *

UNITED STATES PATENT AND TRADEMARK OFFICE
CERTIFICATE OF CORRECTION

| | |
|---|---|
| PATENT NO. | : 12,418,050 B2 |
| APPLICATION NO. | : 18/399062 |
| DATED | : September 16, 2025 |
| INVENTOR(S) | : Robert S. Busacca et al. |

It is certified that error appears in the above-identified patent and that said Letters Patent is hereby corrected as shown below:

In the Claims

Claim 7, Column 128, Line 46, delete "comprise" and replace with --comprises--

Claim 17, Column 130, Line 39, delete "layers"

Claim 17, Column 130, Line 40, delete "comprise" and replace with --comprises--

Signed and Sealed this
Twenty-first Day of October, 2025

John A. Squires
*Director of the United States Patent and Trademark Office*